US012230902B2

(12) United States Patent
Zbinden et al.

(10) Patent No.: US 12,230,902 B2
(45) Date of Patent: Feb. 18, 2025

(54) DATA COMMUNICATION SYSTEM

(71) Applicant: SAMTEC, INC., New Albany, IN (US)

(72) Inventors: Eric Zbinden, Santa Clara, CA (US); Jignesh H. Shah, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 0 days.

(21) Appl. No.: 17/936,013

(22) Filed: Sep. 28, 2022

(65) Prior Publication Data

US 2023/0014513 A1 Jan. 19, 2023

Related U.S. Application Data

(63) Continuation of application No. 16/764,142, filed as application No. PCT/US2018/060923 on Nov. 14, 2018, now Pat. No. 11,495,899.

(60) Provisional application No. 62/704,025, filed on Oct. 9, 2018, provisional application No. 62/727,227, filed on Sep. 5, 2018, provisional application No. 62/726,833, filed on Sep. 4, 2018, provisional application No. 62/614,626, filed on Jan. 8, 2018, (Continued)

(51) Int. Cl.

| | |
|---|---|
| ***H01R 12/71*** | (2011.01) |
| ***H01R 12/72*** | (2011.01) |
| ***H01R 13/187*** | (2006.01) |

(52) U.S. Cl.

CPC ......... *H01R 12/714* (2013.01); *H01R 12/724* (2013.01); *H01R 13/187* (2013.01)

(58) Field of Classification Search

CPC .............. H01R 13/6658; H01R 13/187; H01R 23/7073; H01R 23/7068; H01R 12/714; H01R 12/724; F21V 29/004

USPC ......................................... 439/76.1, 79, 487

See application file for complete search history.

(56) References Cited

U.S. PATENT DOCUMENTS

| | | |
|---|---|---|
| 4,609,240 A | 9/1986 | Pistor |
| 4,640,032 A | 2/1987 | Lewis |
| 4,924,179 A | 5/1990 | Sherman |

(Continued)

FOREIGN PATENT DOCUMENTS

| | | |
|---|---|---|
| CN | 1329721 A | 1/2002 |
| CN | 1559084 A | 12/2004 |

(Continued)

OTHER PUBLICATIONS

Abot et al, Precise Monitoring of Damage Evolution in Laminated Composite Materials using Integrated Carbon Nanotube Fiber Sensors: Experimental Results and Validation; Conference: American Society for Composites, Sep. 2016, 14 pages.

(Continued)

*Primary Examiner* — Gary F Paumen

(74) *Attorney, Agent, or Firm* — BakerHostetler

(57) ABSTRACT

A data communication system can include a low-profile electrical connector that is sized to be mounted onto a PCB in a gap between the PCB and a heat sink that overhangs from an IC that is mounted to the PCB. The data communication system further includes an electrical cable that extends from the electrical connector to an optical transceiver. A cable management laminate can route the electrical cables along a predetermined path. The data communication system can be disposed in a system tray that is configured to force air over the heat sink. The airflow over the heat sink can be adjustable.

40 Claims, 25 Drawing Sheets

Related U.S. Application Data provisional application No. 62/586,135, filed on Nov. 14, 2017.

(56) References Cited

U.S. PATENT DOCUMENTS

| | | | |
|---|---|---|---|
| 5,435,757 | A | 7/1995 | Fedder et al. |
| 5,441,424 | A | 8/1995 | Morlion et al. |
| 5,487,673 | A | 1/1996 | Hurtarte |
| 5,509,827 | A | 4/1996 | Huppenthal et al. |
| 5,564,931 | A | 10/1996 | Fabian et al. |
| 5,567,166 | A | 10/1996 | Lemke |
| 5,781,759 | A | 7/1998 | Kashiwabara |
| 5,823,796 | A | 10/1998 | Bethurum |
| 6,068,500 | A | 5/2000 | Kantner |
| 6,071,016 | A | 6/2000 | Ichino et al. |
| 6,097,086 | A | 8/2000 | Crane et al. |
| 6,186,106 | B1 | 2/2001 | Glovatsky et al. |
| 6,203,376 | B1 | 3/2001 | Magajne et al. |
| 6,231,363 | B1 | 5/2001 | Kosmala |
| 6,574,115 | B2 | 6/2003 | Asano et al. |
| 6,688,776 | B2 | 2/2004 | Simmons et al. |
| 6,702,590 | B2 | 3/2004 | Zaderej et al. |
| 6,726,504 | B2 | 4/2004 | Fuerst et al. |
| 6,738,259 | B2 | 5/2004 | Le et al. |
| 6,797,882 | B1 | 9/2004 | Crane et al. |
| 6,971,887 | B1 | 12/2005 | Trobough |
| 6,990,733 | B2 | 1/2006 | Lopata et al. |
| 7,004,644 | B1 | 2/2006 | Johnson |
| 7,118,293 | B2 | 10/2006 | Nagasaka et al. |
| 7,183,646 | B2 | 2/2007 | Crane, Jr. et al. |
| 7,320,426 | B2 | 1/2008 | Shue et al. |
| 7,384,275 | B2 | 6/2008 | Ngo |
| 7,503,793 | B2 | 3/2009 | Morello |
| 7,719,843 | B2 | 5/2010 | Dunham |
| 8,007,316 | B2 | 8/2011 | Costello |
| 8,036,500 | B2 | 10/2011 | McColloch |
| 8,083,553 | B2 | 12/2011 | Manter et al. |
| 8,173,490 | B2 | 5/2012 | Eckhardt et al. |
| 8,335,411 | B2 | 12/2012 | Kuznia et al. |
| 8,353,708 | B2 | 1/2013 | Hsu |
| 8,553,102 | B2 | 10/2013 | Yamada |
| 8,724,944 | B2 | 5/2014 | Kuznia et al. |
| 8,787,711 | B2 | 7/2014 | Zbinden et al. |
| 8,867,869 | B2 | 10/2014 | Steijer et al. |
| 9,118,151 | B2 | 8/2015 | Tran et al. |
| 9,442,255 | B2 | 9/2016 | Pommer et al. |
| 9,465,176 | B2 | 10/2016 | Pommer et al. |
| 9,606,307 | B2 | 3/2017 | Matsumaru et al. |
| 9,647,762 | B2 | 5/2017 | Arvelo et al. |
| 9,766,418 | B2 | 9/2017 | Lewallen et al. |
| 9,791,647 | B2 | 10/2017 | Steijer et al. |
| 9,835,811 | B2 | 12/2017 | Zbinden et al. |
| 9,841,572 | B2 | 12/2017 | Zbinden et al. |
| 10,074,920 | B2 | 9/2018 | Tran et al. |
| 10,910,748 | B2 | 2/2021 | Mason et al. |
| 10,931,047 | B2 | 2/2021 | Lee et al. |
| 11,146,002 | B2 | 10/2021 | Ellis et al. |
| 11,476,603 | B2 | 10/2022 | Buck et al. |
| 11,495,899 | B2 * | 11/2022 | Zbinden ............... H01R 13/187 |
| 2002/0153977 | A1 | 10/2002 | McDonough et al. |
| 2003/0036304 | A1 | 2/2003 | Soubh |
| 2004/0094328 | A1 | 5/2004 | Fjelstad et al. |
| 2004/0155328 | A1 | 8/2004 | Kline |
| 2004/0245610 | A1 | 12/2004 | Zhong et al. |
| 2005/0093127 | A1 | 5/2005 | Fjelstad et al. |
| 2006/0001163 | A1 | 1/2006 | Kolbehdari et al. |
| 2006/0040523 | A1 | 2/2006 | Renfro et al. |
| 2006/0091507 | A1 | 5/2006 | Fjelstad et al. |
| 2006/0133821 | A1 | 6/2006 | Wang et al. |
| 2006/0215963 | A1 | 9/2006 | Hamano |
| 2006/0228922 | A1 | 10/2006 | Morriss |
| 2007/0001277 | A1 | 1/2007 | Ichikawa |
| 2007/0015416 | A1 | 1/2007 | Gutierrez et al. |
| 2007/0040626 | A1 | 2/2007 | Blair et al. |
| 2008/0095506 | A1 | 4/2008 | McColloch |
| 2008/0150571 | A1 | 6/2008 | Miller et al. |
| 2008/0277769 | A1 | 11/2008 | Cotte et al. |
| 2009/0023330 | A1 | 1/2009 | Stoner et al. |
| 2009/0148108 | A1 | 6/2009 | Fukutomi |
| 2010/0062656 | A1 | 3/2010 | Lynch et al. |
| 2010/0075536 | A1 | 3/2010 | Kubo |
| 2010/0188828 | A1 | 7/2010 | Takao |
| 2010/0195304 | A1 | 8/2010 | Takao |
| 2010/0258952 | A1 | 10/2010 | Fjelstad |
| 2011/0201213 | A1 | 8/2011 | Dabov et al. |
| 2012/0129382 | A1 | 5/2012 | Regnier et al. |
| 2013/0040483 | A1 | 2/2013 | Ngo et al. |
| 2013/0088829 | A1 | 4/2013 | Co |
| 2013/0115500 | A1 | 5/2013 | McClure et al. |
| 2013/0181360 | A1 | 7/2013 | Kim et al. |
| 2013/0215563 | A1 | 8/2013 | Behziz et al. |
| 2013/0309809 | A1 | 11/2013 | Eckhardt et al. |
| 2014/0056592 | A1 | 2/2014 | McColloch et al. |
| 2014/0057487 | A1 | 2/2014 | May |
| 2014/0098969 | A1 | 4/2014 | Oliveira |
| 2014/0193160 | A1 | 7/2014 | Yagisawa et al. |
| 2015/0111410 | A1 | 4/2015 | Gingrich et al. |
| 2015/0234437 | A1 | 8/2015 | Gallina et al. |
| 2016/0218455 | A1 | 7/2016 | Sayre et al. |
| 2018/0120906 | A1 | 5/2018 | Reed et al. |
| 2018/0217341 | A1 | 8/2018 | Smith et al. |
| 2019/0182958 | A1 | 6/2019 | Searls et al. |
| 2019/0319380 | A1 | 10/2019 | Lloyd et al. |
| 2019/0372251 | A1 | 12/2019 | Huang et al. |
| 2020/0212631 | A1 | 7/2020 | Buck et al. |
| 2021/0091496 | A1 | 3/2021 | Cartier, Jr. et al. |
| 2021/0194164 | A1 | 6/2021 | Epitaux et al. |
| 2021/0265785 | A1 | 8/2021 | Mongold et al. |
| 2021/0289617 | A1 | 9/2021 | Mellitz et al. |

FOREIGN PATENT DOCUMENTS

| | | | |
|---|---|---|---|
| CN | 1559164 | A | 12/2004 |
| CN | 1925234 | A | 3/2007 |
| CN | 101120491 | A | 2/2008 |
| CN | 101882717 | A | 11/2010 |
| CN | 102082376 | A | 6/2011 |
| CN | 103168396 | A | 6/2013 |
| CN | 103337749 | A | 10/2013 |
| CN | 211530225 | U | 9/2020 |
| EP | 1065758 | A2 | 1/2001 |
| JP | 5605323 | B2 | 10/2014 |
| KR | 10-1269784 | B1 | 5/2013 |
| TW | I221197 | B | 9/2004 |
| TW | I329398 | B | 8/2010 |
| TW | M409564 | U | 8/2011 |
| TW | I444120 | B | 7/2014 |
| TW | 201519522 | A | 5/2015 |
| TW | I525882 | B | 3/2016 |
| TW | I577085 | B | 4/2017 |
| TW | 201732493 | A | 9/2017 |
| TW | 202033079 | A | 9/2020 |
| TW | M611526 | U | 5/2021 |
| TW | 202239297 | A | 10/2022 |
| WO | 2016/053501 | A1 | 4/2016 |
| WO | 2017/024244 | A1 | 2/2017 |
| WO | 2020/014597 | A2 | 1/2020 |

OTHER PUBLICATIONS

Amphenol TCS Expands the XCede Platform with 85 ohm Connectors and High Speed cable Solutions, ENP Newswire, Feb. 26, 2009.

Anandtech, SuperComputing 15: Intel's Knights Landing/Xeon Phi Silicon on Display, online article Ian Cutress dated Nov. 19, 2015, 8 pages, https://www.anandtech.com/show/9802/supercomputing-15-intels-knights-landing-xeon-phi-silicon-on-display.

Icrontic, Tech Tips: Rounded Cables, Supplied by Koolcases, published in Tech Nov. 20, 2002; 8 pages.

Intel Xeon Phi Processor: Your Path to Deeper Insight, Product Brief, Dec. 13, 2016, 4 pages.

(56) References Cited

OTHER PUBLICATIONS

Intel Xeon Phi Processors, Product Specification List dated Dec. 31, 2016, https://ark.intel.com/content/www/us/en/ark/products/series/75557/intel-xeon-phi-processors.html.
The Next Platform, Intel Knights Landing Yields Big Bang for the Buck Jump, online article by Timothy Prickett Morgan dated Jun. 20, 2016, 13 pages, https://www.nextplatform.com/2016/06/20/intel-knights-landing-yields-big-bang-buck-jump/.
Wig et al., U.S. Appl. No. 61/714,871, filed Oct. 17, 2012.

* cited by examiner

DATA COMMUNICATION SYSTEM

CROSS-REFERENCE TO RELATED APPLICATIONS

This is a continuation of U.S. patent application Ser. No. 16/764,142 filed May 14, 2020, which is the National Stage Application of International Patent Application No. PCT/US2018/060923, filed Nov. 14, 2018, which claims priority to U.S. Patent Application Ser. No. 62/586,135 filed Nov. 14, 2017, U.S. Patent Application Ser. No. 62/614,626 filed Jan. 8, 2018, U.S. Patent Application Ser. No. 62/726,833 filed Sep. 4, 2018, U.S. Patent Application Ser. No. 62/727,227 filed Sep. 5, 2018, and U.S. Patent Application Ser. No. 62/704,025 filed Oct. 9, 2018, the disclosure of each of which is hereby incorporated by reference as if set forth in its entirety herein.

BACKGROUND

Conventional electrical cable connectors include an electrically insulative connector housing and a plurality of electrical signal contacts that are supported by the connector housing. The electrical signal contacts define mating ends configured to mate with respective electrical signal contacts, and mounting ends that are configured to be mounted to a printed circuit board (PCB). The electrical cables can further be mated with a complementary data communication device, so as to put the data communication device in electrical communication with the electrical connector. In some architectures, the data communication device is configured as an optical transceiver. Further, an integrated circuit can be mounted to the PCB. The PCB can include electrical traces that place the electrical connector in communication with the integrated circuit.

System constraints are demanding high data transfer speeds in architectures where space is at a premium on the PCB. Thus, it is further desirable to provide electrical connectors that are sized to occupy less real estate on the PCB. Further, it can be desirable to route the electrical cables along a desired predetermined path.

SUMMARY

One aspect of the present disclosure includes a low-profile connector that is configured to mate with at least one electrical cable. The electrical connector can be mounted to a printed circuit board (PCB) that defines at least one electrical trace in electrical communication with an integrated circuit (IC). When the electrical connector is mated with the electrical cable and mounted to the PCB, the electrical cable is placed in electrical communication with the IC. The low-profile connector can include a shroud and an electrical contact positioned at least partially within the shroud. The electrical contact is configured to be biased against a contact trace, pad or terminal of the PCB. An electrical cable can be electrically connected or mated to the compressible electrical contact, wherein the height of the shroud is at least 0.5 mm and less than 3 mm. The shroud can be electrically conductive. The electrical cable can be configured as a twin axial cable including a pair of electrical signal conductors, or a coaxial cable including a single electrical signal conductor. The electrical connector can include a biasing member which can be configured as a spring or spring finger configured to independently or in tandem apply a force to the connector housing, and thus to the electrical contact. The electrical contact can move in at least one direction within the shroud. The low-profile connector may further include forward ground arms or ground walls positioned on either side of the electrical contact. The electrical contact can include a pair of electrical contacts configured as a differential signal conductor pair. A dielectric spacer can be positioned between the differential signal conductor pair and an adjacent differential signal conductor pair. The height of the shroud can between at least 0.5 mm and 2 mm.

In another example, an electrical connector can be configured as a floating link between a host board and a PCB. The electrical connector can include a differential signal conductor pair, an overmolded connector housing and a flexible signal blade. The electrical connector can further include a ground shield. A plurality of the electrical connectors can each independently be held in place on a host board by a shroud and can translate or rotate as needed to accommodate mechanical tolerances to ensure electrical contact with electrical signal conductors of an electrical cable. Each electrical connector can define a height, as measured from a surface of a host PCB to the uppermost surface of the electrical connector, that can be greater than 0.5 mm and less than 3 mm, such as 2 mm±0.5 mm or any value between 0.5 mm and 3 mm.

In another example, a compression connector can establish electrical communication between the electrical cable and an integrated circuit (IC). Each compression connector can have a height, as measured from a surface of a host PCB to the uppermost surface of a compression connector housing, that can be greater than 0.5 mm and less than 3 mm, such as 2 mm±0.5 mm or any value between 0.5 mm and 3 mm such that a heat sink can be positioned on top of the IC.

In another aspect of the present disclosure, a tray can carry a baffle. The baffle can have two opposed ends, one of the two ends defining a taper defined by two converging curved lines. The baffle is generally closed to moving or forced air. Heat sink fins can protrude from the baffle. The two converging curved lines can be curved more or less to achieve a desired airflow over and past the baffle.

DETAILED DESCRIPTION

Figure 1:
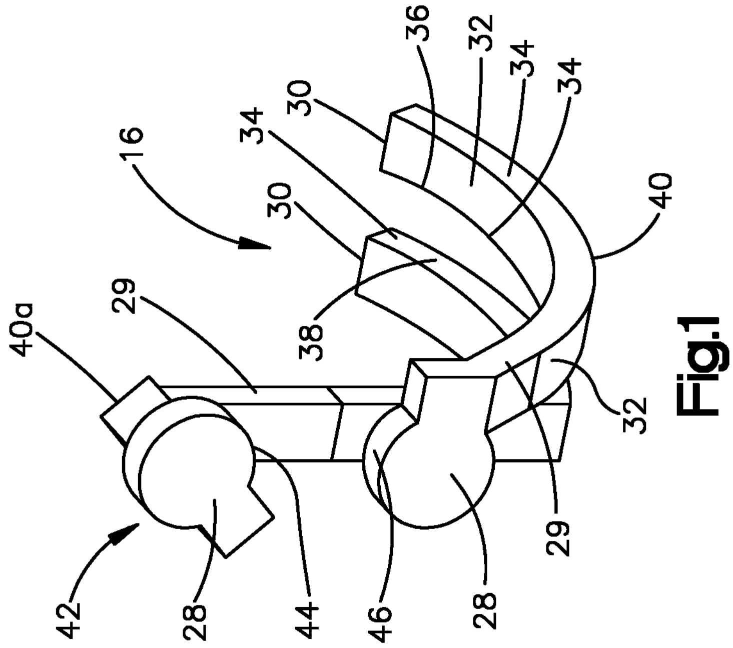
FIG. 1 is a partial assembly view of a low-profile electrical connector illustrated in FIG. 5, showing a perspective view of first and second electrical contacts that define a differential signal pair of the electrical connector.
Figure 8:
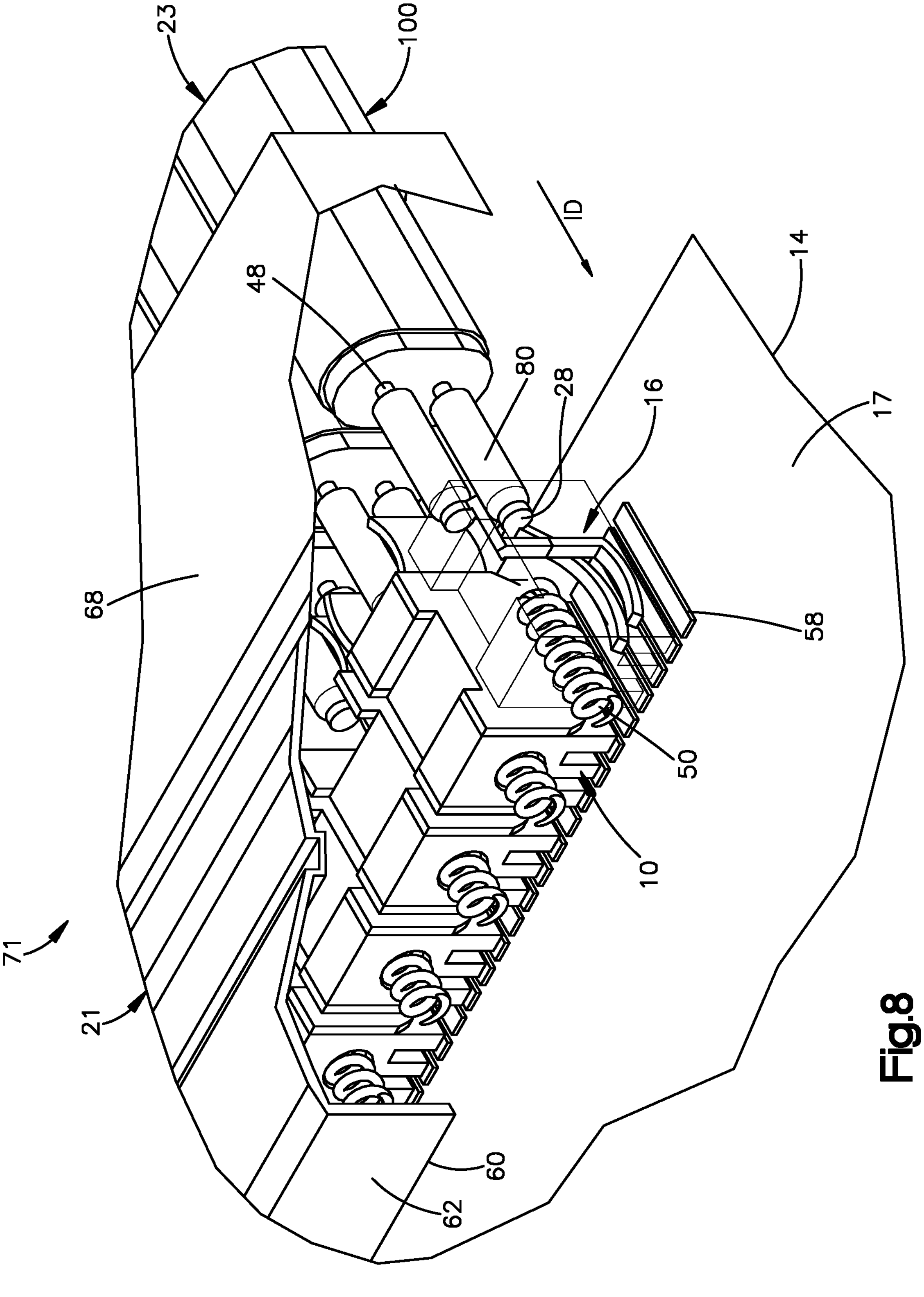
FIG. 8 is a partially transparent partial perspective view of the mated low-profile electrical connectors illustrated in FIG. 7.

As shown in FIG. 1, a differential signal pair 16 of a low-profile electrical connector 15 (see FIG. 5) includes a first electrical signal contact 40 and a second electrical signal contact 40*a*. Each of the signal contacts 40 and 40*a* can include a mating end that is configured to mate with a respective complementary electrical device, thereby placing the signal contacts 40 and 40*a* in electrical communication with the respective complementary electrical device. The mating ends can define a respective cable contact pad 28 configured to contact a respective electrical signal conductor (FIG. 8). The electrical signal conductors 48 can be of a twin axial cable 100 in one example (see FIG. 8). The electrical signal contacts 40 and 40*a* can further include respective mounting ends that are configured to be mounted to a substrate 14. For instance, the mounting ends can define respective flexible signal blades 30 configured to contact the substrate 14. The flexible signal blades 30 can be flexible toward and away from the underlying substrate 14. For instance, the flexible signal blade 30 can be configured to be compressed against the substrate 14. The substrate 14 can configured as a printed circuit board, such as a host board 12 (see FIG. 9A). Each electrical signal contact 40 and 40*a* of the differential signal pair 16 can be made from an electrically conductive material, such as beryllium copper. Because the electrical signal contacts 40 and 40*a* define a differential signal pair 16, the electrical signal contacts 40 and 40*a* can be referred to as differential signal contacts.

Each electrical signal contact 40 and 40*a* of the differential signal pair 16 can each define opposed broadsides 32 and opposed edges 34. The edges 34 can be longer than the broadsides in a plane that intersects the respective signal contact along a direction perpendicular to the signal contact. A portion of a first opposed edge 36 of a first signal contact 40 of the differential signal pair 16 can be positioned adjacent and face a portion of a second opposed edge 38 of the second signal contact 40*a* of the differential signal pair 16. Thus, the differential signal pair 16 can be referred to as an edge coupled differential signal pair. That is, the first and second electrical signal contacts 40 and 40*a* of the differential signal pair 16 can be positioned edge-to-edge. It should be further appreciated that while the electrical connector is shown including the first and second electrical signal contacts 40 and 40*a* as defining a differential signal pair, the first and second electrical signal contacts 40 and 40*a* can alternatively be single ended. Further, the electrical connector can include only a single electrical signal contact in certain examples. Alternatively still, the electrical connector can include only any number of electrical signal contacts as desired.

In one example, each of the first and second electrical signal contacts 40 and 40*a* can define a compressible, flexible signal blade 30. The signal blade 30 can define a curved shape. In one example, the curve shape can define an arcuate shape. Each of the first and second electrical signal contacts 40 and 40*a* can also define a respective mating end 42. Each mating end 42 can be configured to mate with a complementary electrical device. For instance, each mating end 42 can define a cable contact pad 28 that is configured to contact a respective electrical signal conductor of an electrical cable, which can be configured as a twin axial electrical cable. Alternatively, each mating end 42 can mate with respective signal conductors of respective coaxial cables.

In one example, the cable contact pads 28 of the first and second electrical signal contacts 40 and 40*a* can be coplanar with each other. The first and second electrical contacts 40 and 40*a* can include intermediate regions 29 that extend from the signal blade 30 to the contact pads 28. The intermediate region 29 of the second electrical signal contact 40*a* can be longer than the intermediate region 29 of the first electrical signal contact 40, such that the cable contact pads 28 of the first and second electrical signal contacts 40 and 40*a* can be spaced from each other along a direction that is perpendicular to the underlying substrate when the electrical connector is mounted to the underlying substrate 14. The cable contact pads 28 can each define a respective first pad edge 44 and a second pad edge 46. The first and second pad edges 44 and 46 can be positioned edge-to-edge, such that the first and second pad edges 44 and 46 face each other. The cable contact pads 28 may be spaced apart from one another, with one cable contact pad 28 being spaced farther away from its respective flexible signal blade 30 a first distance, and the other cable contact pad 28 spaced from its respective flexible signal blade 30 a second distance that is less than the first distance.

Figure 2:
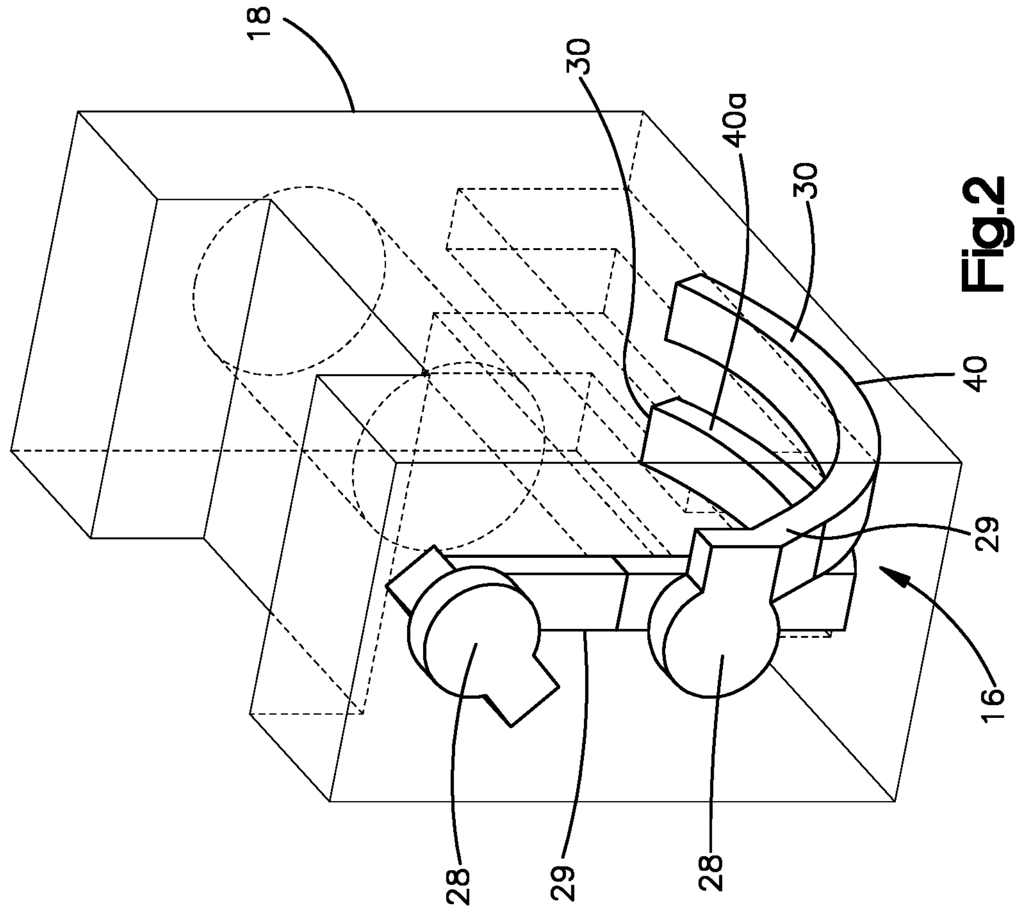
FIG. 2 is a partial assembly view of the electrical connector as illustrated in FIG. 1, but including a dielectric connector housing of the electrical connector supporting the first and second electrical contacts illustrated in FIG. 1.

Referring now to FIG. 2, the differential signal pair 16 can be supported by a dielectric connector housing 18. For instance, the differential signal pair 16 can be fixedly supported in the connector housing 18. In particular, the signal contacts 40 and 40*a* of the differential signal pair 16 can supported in the connector housing 18. In one example, the signal contacts 40 and 40*a* of the differential signal pair 16 can be insert molded into the connector housing 18. Thus, the connector housing 18 can be referred to as an overmolded connector housing 18. Further, it should be appreciated that the connector housing 18 can define a single monolithic connector housing 18 that supports the at least one signal contact, such as the first and second signal contacts 40 and 40*a*. In one example, the connector housing 18 does not support any other signal contacts other than the first and second signal contacts 40 and 40*a* of the differential signal pair. Thus, in some examples, no other signal contacts extend through the connector housing 18 other than the first and second signal contacts 40 and 40*a*.

The mating end and mounting end of the at least one signal contact can each extend out from the connector housing 18. For instance, the mating end can extend out from a mating interface of the connector housing, and the mounting end can extend out from the mounting interface of the connector housing 18. Thus, the cable contact pads 28 and the signal blades 30 can extend out from respective ends of the connector housing 18. The respective ends can be oriented perpendicular to each other. In this regard, the signal contacts 40 and 40*a* can be referred to as right angle contacts. The electrical connector 15 can thus be referred to as a right angle connector. It should be appreciated that the signal contact signal contacts 40 and 40*a* can be supported by the electrically insulative connector housing 18 in any suitable manner as desired.

Figure 6:
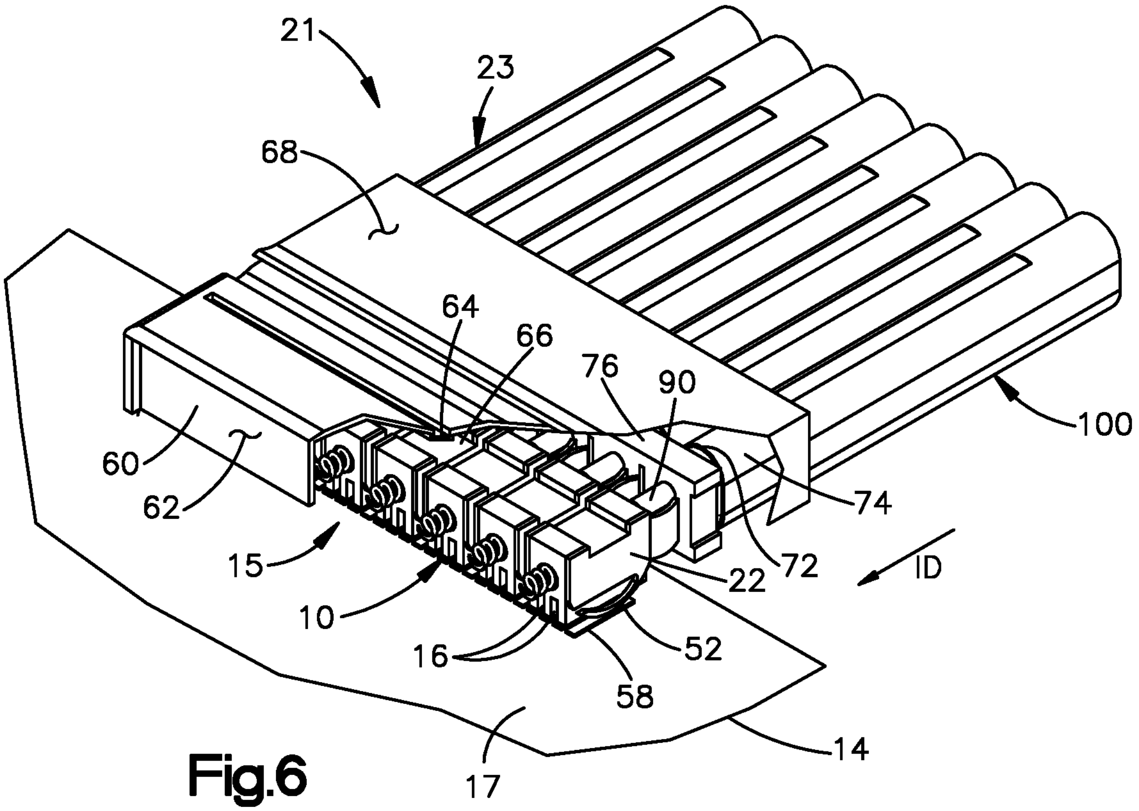
FIG. 6 is a perspective view of a plurality of the low-profile electrical connectors as illustrated in FIG. 5, mated with a plurality of electrical cables.

During operation, the connector housing 18 and the flexible signal blades 30 can be slidable back and forth on respective electrical contact members 58 (FIG. 6) of the substrate 14. The contact members 58 can be configured as electrical traces, pads or terminals 58 (FIG. 6). Alternatively, the connector housing 18 and flexible signal blades 30 can translate in perpendicular longitudinal, lateral, and transverse directions with respect to a mounting surface 17 of the substrate 14. Thus, the electrical connector 15 can be referred to as a floating link 10. The longitudinal and lateral directions can define the plane of the mounting surface of the substrate 14 to which the electrical connector 15 is configured to be mounted. The longitudinal direction can define an insertion direction or mating direction of the electrical connector 15 to at least one electrical cable. The transverse direction can be oriented perpendicular to the substrate, and can define a height of the electrical connector 15. The connector housing 18 and flexible signal blades 30 can translate along the respective contact members 58 such that the cable contact pads 28 are in contact with respective electrical signal conductors 48 (FIG. 8), such as by an electrical connection, a physical connection or both. The electrical signal conductors 48 can be defined by an electrical cable 100, which can be configured as a twin axial cable (see FIG. 11). Alternatively, the electrical signal conductors 48 can be defined by respective coaxial cables.

Figure 4:
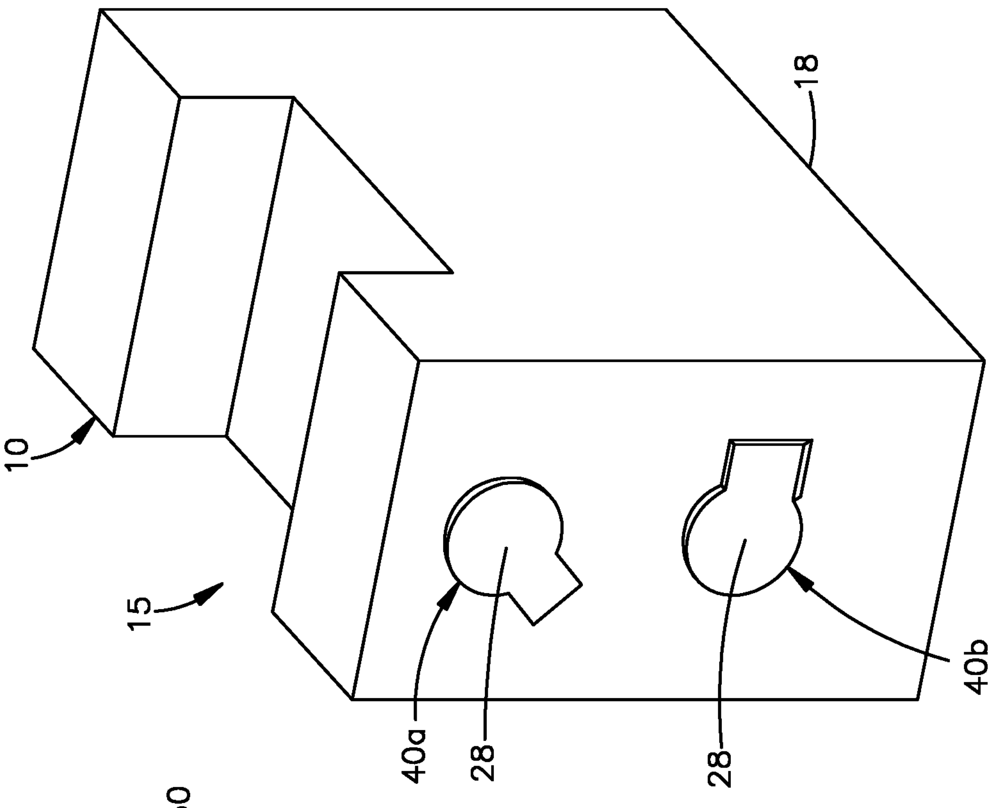
FIG. 4 is a partial assembly view of the electrical connector as illustrated in FIG. 3, but showing the dielectric connector housing solid.
Figure 3:
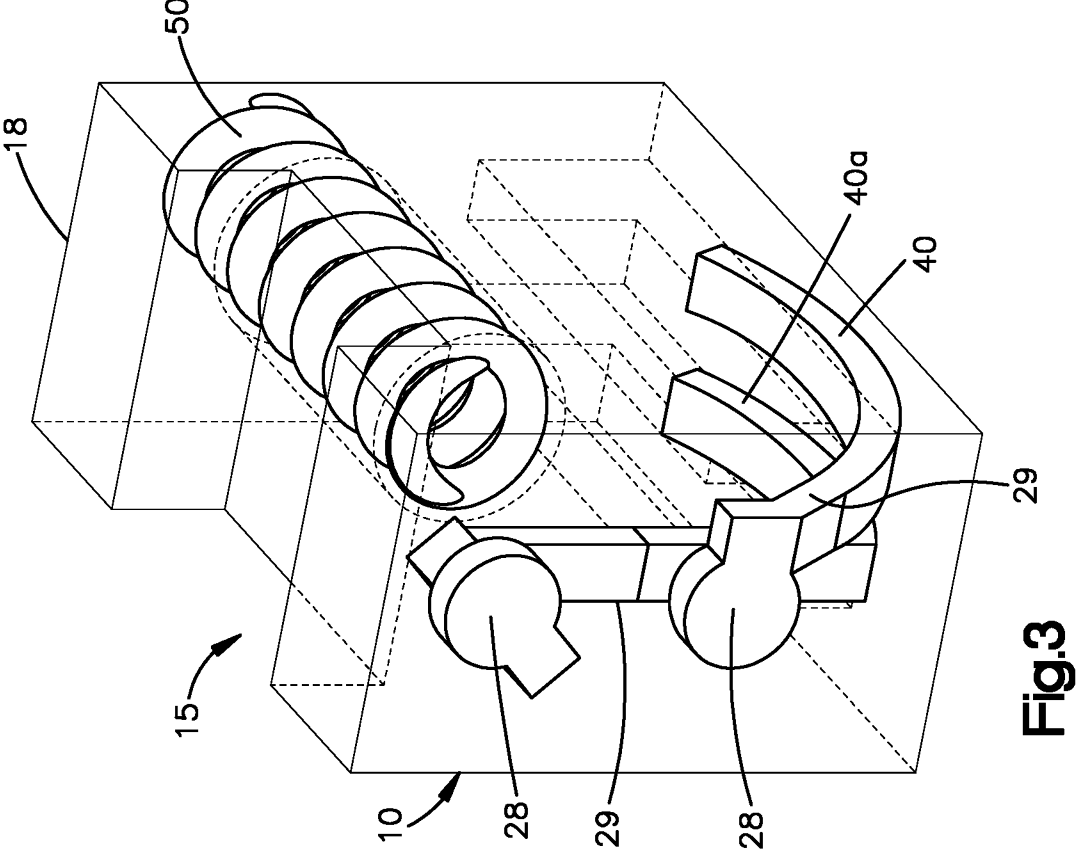
FIG. 3 is a partial assembly view of the electrical connector as illustrated in FIG. 2, but including a biasing member that bears against the dielectric connector housing, and showing the dielectric connector housing as transparent for the purposes of illustration.

Referring to FIGS. 3-4, the electrical connector 15 can include the connector housing 18 and at least one electrical signal contact 40 that is configured to be placed in contact with an electrical signal conductor of an electrical cable in the manner described herein. In one example, the electrical connector 15 can include the first and second electrical signal contacts 40 and 40*a* arranged so as to define the differential signal pair 16 as described above. The electrical connector 15 can include a biasing member 50 that is configured to apply a mating force to the cable contact pads 28 that biases the cable contact pads 28 into contact with the respective electrical signal conductors 48 as described above. In one example, the biasing member 50 can be configured as a coil spring. The biasing member 50 can be seated against a support surface of the connector housing 18. In one example, a first portion of the biasing member 50 can extend into the connector housing 18, such that a second portion of the biasing member 50 can extend out from the connector housing 18. In one example, the biasing member 50 can extend from the connector housing in a rearward direction. The biasing member 50 can apply a restorative contact force, and biases the electrical connector 15 in a direction opposite to an insertion direction ID or mating direction of the twin axial cable conductors 48 (FIG. 8). The direction opposite the insertion direction ID or mating direction of the twin axial cable conductors can be referred to as a forward direction that is opposite the rearward direction. In this regard, the forward direction can be defined by a direction from the electrical connector 15 toward the at least one electrical cable 100.

As the electrical connectors 15 are mated and unmated with the respective electrical cables 100, the biasing member 50 can apply a reaction force to the contact pad 28 to counter the force that the signal conductor 48 applies to the contact pad 28. The blades 30 of each electrical connector 15 can be configured to slide along the traces 58 in the longitudinal direction with respect to at least one other electrical connector 15, thereby accommodating dimensional tolerance between adjacent channels, which can include a respective electrical cable 100, electrical contact member 58, and an electrical connector 15 that is mated to the electrical cable 100 and mounted to the electrical contact member 58 (and thus also in electrical communication with a complementary electrical device such as an integrated circuit).

Figure 5:
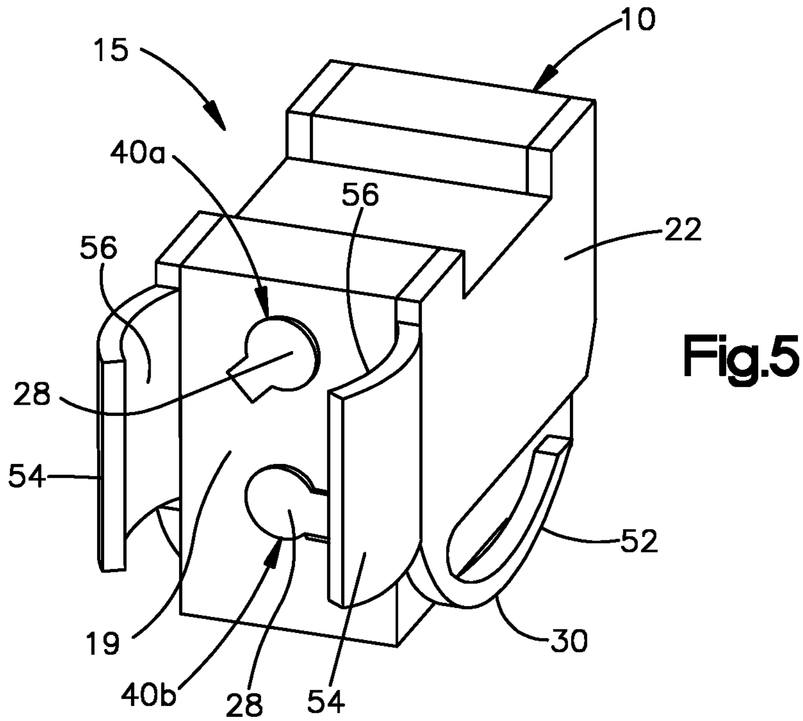
FIG. 5 is an assembly view of the electrical connector as illustrated in FIG. 4, including a ground shield that receives the dielectric connector housing.

Referring now to FIG. 5, the electrical connector 15 can further include a ground or reference shield 22. The ground shield 22 can be supported by the connector housing 18. In particular, the connector housing 18 can be inserted into the ground shield 22, such that the ground shield 22 extends about an outer surface of the connector housing 18. The ground shield 22 also has a compressible shield mounting end 52 that defines a curved or arcuate shape. The shield mounting end 52 can be configured to be placed against a respective contact member 58 of the underlying substrate 14 so as to mount the electrical connector 15 to the underlying substrate 14.

The ground shield 22 may also ground mating ends that are configured to mate with a respective ground shield or drain wire of the electrical cable. The ground mating ends can be defined by respective flexible forward arms 54 of the ground shield that extend in a forward direction from a front surface 19 of the connector housing 18. The forward direction can be oriented opposite the rearward direction. The forward direction can extend toward the electrical cables, including the twin axial cables and the respective electrical signal conductors. Conversely, the rearward direction can extend away from the electrical cables, including the twin axial cables and the respective electrical signal conductors. The cable contact pads 28 can also extend out from the connector housing 18 so as to be configured to be placed in electrical contact with respective electrical signal conductors. The forward arms 54 can extend forward from the front surface 19 to a location spaced forward of the cable contact pads 28. The forward arms 54 can define respective forward arm broadsides 56 that face one another and define a gap therebetween. The forward arms 54 can be configured to provide electromagnetic shielding of signal conductors of adjacent electrical cables that are mated to adjacent electrical connectors 15.

Figure 7:
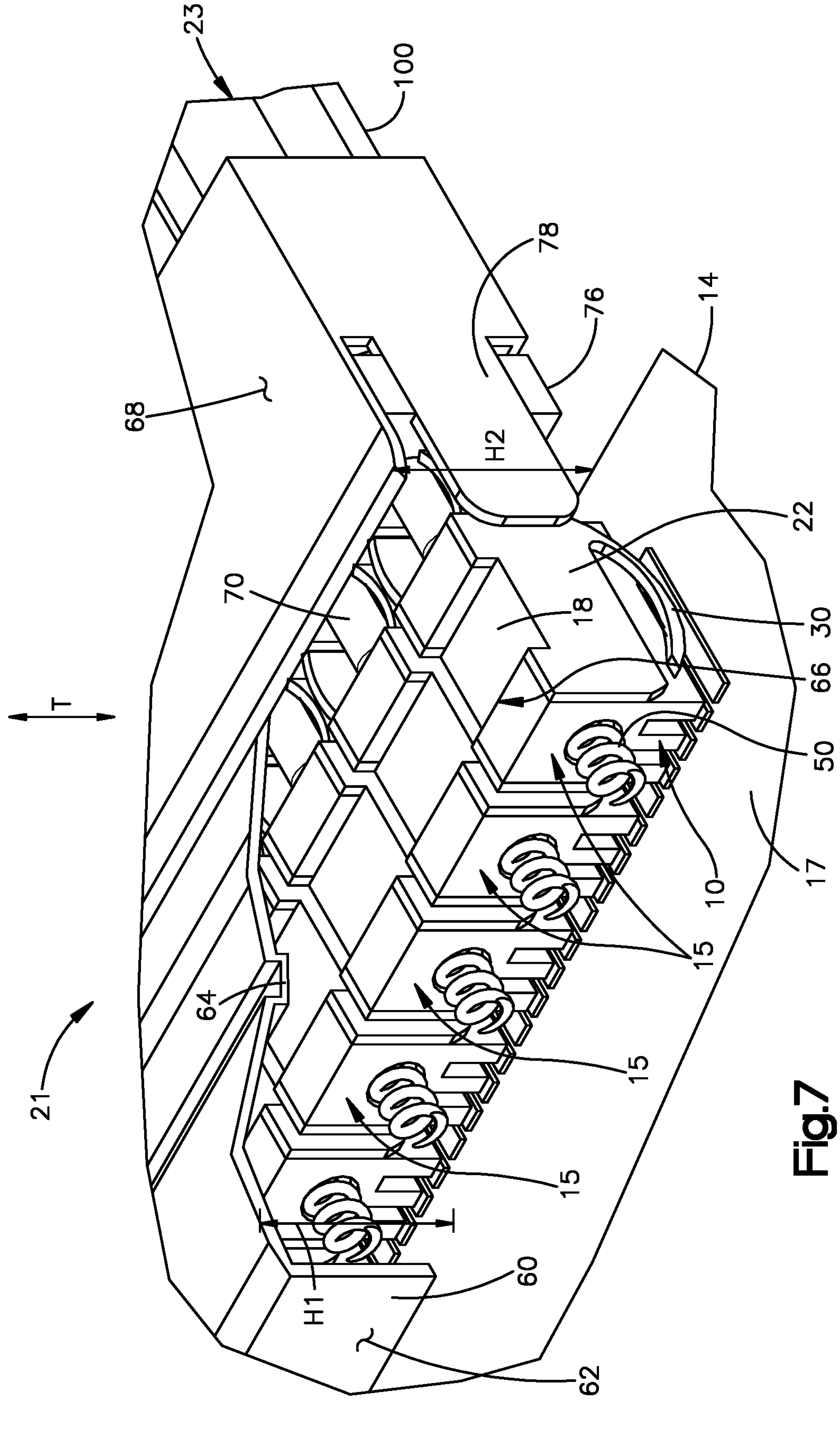
FIG. 7 is an enlarged partial perspective view of the mated low-profile electrical connectors illustrated in FIG. 6.

Referring now to FIGS. 6-8, the electrical connector 15 can include the connector housing 18 and at least one electrical signal contact, such as the first and second electrical signal contacts 40 and 40*a*, supported by the connector housing 18. The electrical connector 15 is configured to mate with a respective at least one electrical signal conductor of an electrical cable so as to define a data communication system 71. In one example, the data communication system 71 can include at least one electrical connector 15 that supports the first and second electrical signal contacts 40 and 40*a* in electrical contact with respective different electrical signal conductors 48 of an electrical cable 100. The electrical signal conductors 48 can be defined by a twin axial cable. Alternatively, the electrical signal conductors 48 can be defined by respective individual coaxial cables. In one example, the at least one electrical connector 15 can include a plurality of electrical connectors 15 arranged in a row. Each electrical connector 15 can similarly include a single row of electrical signal contacts 40 and 40*a*, and no other rows of electrical contacts 40 and 40*a* other than the single row. Thus, the electrical connectors 15 can be referred to as single row connectors.

Referring now to FIGS. 22A-22E generally, the data communication system 71 can include at least one electrical connector 15 and at least one electrical signal conductor 48 of an electrical cable mated to the electrical connector 15. The at least one electrical connector 15 can include a plurality of electrical connectors 15. The data communication system can further include the underlying substrate 14, and an integrated circuit (IC) 75 that is mounted to the substrate 14. The IC 75 can be configured as any suitable IC as desired. For instance, the IC 75 can be an application specific integrated circuit (ASIC) or any alternative IC as desired. In one example, the IC 75 can be configured as a field-programmable gate array (FPGA) chip. Alternatively, the IC 75 can be configured as a processor or switch chip. One or more electrical traces of the underlying substrate can place the electrical connector 15 in electrical communication with the integrated circuit 75. That is, the electrical traces can extend from a respective contact member 58 to the integrated circuit 75 so as to route electrical signals between the electrical connector and the integrated circuit. The data communication system can further include an optical transceiver 77 (see FIG. 23A). The electrical cables 100 can extend from the optical transceiver 77 to the electrical connector 15, thereby placing the electrical connector in electrical communication with the optical transceiver 77. The optical transceiver 77 can be configured as a QSFP transceiver, a QSFP-DD transceiver, or any suitable alternatively constructed transceiver as desired.

Referring again to FIGS. 6-8, each electrical connector 15 can be supported independently of the other electrical connectors 15. Thus, each electrical connector 15 can be movable or floatable with respect to the others of the electrical connectors 15. The flexible signal blades 30 (FIG. 5) of the differential signal conductor pair 16 and the shield mounting ends 52 of the ground shields 22 of the electrical connectors 15 are biased against corresponding contact members 58 of the substrate 14. In particular, the electrical connector 15 can include a first shroud 60 that maintains the flexible signal blades 30 and the shield mounting ends 52 against respective ones of the contact members 58 of the substrate 14. The flexible signal blades 30 can allow the electrical connectors 15 to move toward and away from the substrate 14 as desired, which can allow the electrical connector 15 to accommodate certain variations, such as in the planarity of the substrate and height variations of the contact members 58. In this regard, the first shroud 60 can be referred to as a second biasing member of the electrical connector 15 that can be separate from the biasing member 50, which can be referred to as a first biasing member. The first shroud 60 can bias the electrical housing 15 and supported signal contacts 40 and 40*a* toward the substrate 14. Alternatively, the first shroud 60 can be monolithic with the biasing member 50. Thus, the electrical connector can include at least one biasing member configured to bias the connector housing 15 and the supported at least one electrical signal contact 40 toward complementary electrical device and toward the substrate 14.

The contact members 58 that establish an electrical connection with the shield mounting ends 52 can be referred to as ground contact members. The contact members 58 that establish an electrical connection with the flexible signal blades 30 can be referred to as signal contact members. In one example, a plurality of the electrical connectors 15 can include a single common first shroud 66. Alternatively, each of the plurality of electrical connectors 15 can include its own first shroud 60 separate from the others of the plurality of electrical connectors 15.

In one example, the connector housings 18 can be biased against the first shroud 60 by the flexible signal blades 30 (FIG. 2) of the differential signal conductor pair 16 and the compressible shield mounting ends 52 of the ground shields 22. Otherwise stated, the first shroud 60 can contact the electrical connectors 15 and bias the flexible signal blades 30 and the compressible shield mounting ends 52 against respective ones of the contact members 58 of the underlying substrate 14. The first shroud 60 can be fixed with respect to the underlying substrate 14. The first shroud 60 can be made of electrically conductive plastic. Alternatively, the first shroud 60 can be made of metal. Alternatively, the first shroud 60 can be made of an electrically conductive lossy material.

As described above, the cable contact pads 28 (FIG. 5) of the respective electrical connectors 15 can be biased against the respective signal conductors 48. For instance, the cable contact pads 28 can be butt coupled against respective twin axial cable conductors 48 (FIG. 8). In particular, the coil spring 50 can compress against a wall 62 of the first shroud 60, thereby biasing the respective electrical connectors 15 toward the respective electrical signal conductors 48. The wall 62 can extend up from the underlying substrate 14 when the electrical connectors 15 are mounted to the underlying substrate 14. Thus, the spring can have a first end that bears against the wall 62, and a second end that is seated against the connector housing 18.

The first shroud 60 can be electrically connected, physically connected, or both to the ground shield 22 of one or more electrical connectors 15, or electrically isolated from the ground shield 22. The first shroud 60, and in particular an upper wall of the shroud that is disposed above the electrical connector 15, may define a first engagement member, such as a protrusion 64, that engages a second engagement member, such as a corresponding depression 66 defined by an electrical connector 15, to resist rotation of the electrical connector 15 with respect to the first shroud about an axis that defines the insertion direction ID. The protrusion 64 can apply a downward force that biases the electrical connector 15 toward the underlying substrate 14. For instance, the protrusion 64 can interfere with the connector housing 18 so as to limit motion of the electrical connector 15 relative to the substrate 14 along the longitudinal direction. In one example, the protrusion 64 can contact an upper surface of the electrical connector 15. In particular, the protrusion 64 can bear directly against the connector housing 18. Alternatively, the protrusion 64 can bear against an intermediate structure that, in turn, bears against the connector housing 18. It should thus be appreciated that the connector housing 18 can be disposed between the upper wall of the first shroud 60 and the substrate 14.

Further, in some examples, an electrically insulative spacer can be positioned between adjacent ones of the electrical connector 15. The protrusion 64 and the depression 66 can also engage one another to create a biasing force that urges each respective electrical connector 15 against the contact members 58 of the underlying substrate 14. The contact members 58 can be arranged in a repeating S-S-G-G-S-S or S-S-G-S-S configuration, whereby "S" represents a signal contact member, and "G" represents a ground contact member. Thus, at least one ground contact member can be disposed between adjacent pair of signal contact members. For instance, a pair of adjacent ground contact members can be disposed between adjacent pair of signal contact members. Alternatively, a single ground contact member can be disposed between an adjacent pair of signal contact members. For instance, the ground shield 22 can include only a single ground mating end and ground mounting end.

The data communication system 71 can include a second shroud 68 that supports the electrical cables 100 so as to define an electrical cable connector 23. The electrical connector 15 is configured to mate with the electrical cable connector 23 to define a cable connector assembly 21. Alternatively, the electrical connector 15 can mate with the respective at least one signal conductor of at least one unsupported electrical cable so as to define the cable connector assembly 21. The cable contact pads 28 of the electrical cable connector 23 are mated with respective electrical signal conductors 48 of at least one electrical cable 100. The signal conductors 48 can be defined by a pair of coaxial cables. Alternatively, the signal conductors 48 can be defined by a twin axial cable.

When the electrical connector 15 is mated with the cable connector 23, the first shroud 60 is configured to engage the second shroud 68, thereby retaining the electrical signal conductors 48 as mated to the respective at least one electrical connector 15. In one example, the first and second shrouds 60 and 68 can releasably lock with each other. The connector housing 18, and thus the electrical signal contacts 40 and 40*a*, can be disposed beneath the shrouds 60 and 68. That is, the connector housing 18, and thus the electrical signal contacts 40 and 40*a*, between the substrate 14 and the shrouds 60 and 68. Otherwise stated, the first and second shrouds 60 and 68 can extend over the connector housing 18, and thus the electrical signal contacts 40 and 40*a*. As described above, the signal conductors 48 can be defined by a twin axial cable. The twin axial cable can include first and second twin axial cable conductors 48, a cable shield wrap or braid 72, a cable ground bus 74, and an outermost dielectric insulator 76 that surrounds the conductors 48, the shield wrap or braid 72 and the cable ground bus 74. Further, the twin axial cable can further include respective dielectric insulators that surround respective ones of the cable conductors 48 so as to electrically isolate the cable conductors 48 from each other. The cable ground bus 74 can electrically connect to, or common, the cable shield wraps or braids 72 of the twin axial cables 100 together. The twin axial cable conductors 48 of each twin axial cable 100 can be rotated so the twin axial cable conductors 48 are stacked on top of each other along a direction that is perpendicular to the mounting surface of the underlying substrate 14. The second shroud 68 can include a rearwardly projecting second shroud arm 78 that extends along a side of one of the electrical connectors 15 when the electrical connector 15 is mated with the respective electrical cable.

Referring now to FIG. 8, in one example the electrical cables 100 can include intermediate signal interfaces 80 individually attached to the electrical signal conductors 48. The first shroud 60 and the second shroud 68 are configured to releasably mate and releasably lock together when the electrical connector 15 is mated with the at least one electrical cable 100. When the first and second shrouds 60 and 68 are locked together, an insertion force in the insertion direction ID biases the intermediate signal interface 80 and corresponding twin axial signal conductors 48 against the cable contact pads 28, thereby mating the electrical connector 15 to the twin axial cable. The biasing member 50 is configured to provide a restoring force in a direction generally opposite to the insertion direction ID, thereby maintaining physical contact between the electrical signal conductors 48 and the respective cable contact pads 28, thereby maintaining electrical contact between the differential signal pair 16 of the electrical connector 15 and the twin axial signal conductors 48. When the first and second shields 60 and 68 are locked together, the electrical connector 15 can be secured to the electrical cables 100 in the manner described above, thereby placing the electrical cables in electrical communication with the underlying substrate 14.

Referring again to FIG. 7, the electrical connector 15 can advantageously be configured as a low-profile connector. In one example, when the electrical connector 15 is mounted to the underlying substrate 14, the height of the electrical connector 15, and all low-profile electrical connectors described herein, can be at least 0.5 mm and less than 3 mm, such as 2 mm±0.5 mm or any value between 0.5 mm and 3 mm, including 0.5 mm and 3 mm. That is, in one example, the electrical connector 15 can have a height of no more than substantially 3.5 mm. The height H1 of the electrical connector 15 can be defined from the highest location of the first shroud 60 to the mounting surface of the underlying substrate 14 that carries the electrical contact members 58. Thus, the height H1 of the electrical connector 15 can be defined by the height of the first shroud 60. Otherwise stated, the height of the electrical connector 15 can be defined by the distance along a direction perpendicular to the mounting surface of the underlying substrate 14 to an uppermost surface of the electrical connector 15. The uppermost surface of the electrical connector 15 can be defined by the first shroud 60, though alternative designs of the electrical connector 15 are contemplated. Alternatively, when the electrical connector 15 is not mounted to the underlying substrate 14, the height can be measured from a lowermost contact surface of the flexible signal blades 30, and thus of the mounting ends 52, to an uppermost location of the electrical connector 15 along a transverse direction T. The contact surface of the flexible signal blades 30, and thus of the mounting end, can contact the contact members 58 of the underlying substrate 14.

As illustrated in FIGS. 22A-22E, the data communication system 71 can include the IC 75 mounted to the underlying substrate 14. The data communication system 71 can further include a heat sink 79 in thermal contact, or otherwise in thermal communication, with the IC 75 (which includes the IC package as understood by one having ordinary skill in the art). The heat sink 79 can sit on top of the IC 75, such that the IC 75 is disposed between the substrate 14 and the heat sink 79 along the transverse direction T. The heat sink 79 can include one or more heat dissipation members 81 which can be configured as pins or fins or the like. The heat sink 79 can be configured as a conventional heat sink 79 that defines an overhang 87 that projects out from the IC 75 along a direction angularly offset with respect to the transverse direction T. The overhang 87 can define a bottom surface that faces the substrate 14. In one example, the bottom surface can be substantially planar. In other examples, the bottom surface can define one or more channels. The angularly offset direction is typically perpendicular to the transverse direction T. Thus, the heat sink 79 can define a gap 85 that extends from the substrate 14 to the overhang 87 along the transverse direction T. Accordingly, the gap 85 can be aligned with both the overhang 87 and the substrate 14 along the transverse direction T. In one example, the height of the gap 85 along the transverse direction T can be between substantially 1 mm and substantially 5 mm. For instance, the height of the gap 85 can be substantially 1.5 mm, substantially 2 mm, substantially 2.5 mm, substantially 3 mm, substantially 3.5 mm, substantially 4 mm, substantially 4.5 mm, substantially 5 mm, or any suitable alternative height as desired.

Thus, it should be appreciated that the height of the low-profile electrical connector 15 can advantageously be less than the height of the gap 85. The height of the low-profile electrical connector 15 can be measured along the transverse direction T. Thus, the electrical connector 15 can be sized to be mounted to the substrate 14, such that at least a portion of the connector housing 18, and thus at least a portion of the electrical connector 15, is disposed in the gap 85. Thus, at least a portion of the electrical connector 15 can be aligned with both the substrate 14 and the heat sink 79 along the transverse direction T. The portion of the electrical connector 15 can include the connector housing 18 and the first shroud 60. Advantageously, it should be appreciated that the combination of the IC 75, the heat sink 79, and the electrical connector 15 can occupy a reduced footprint on the underlying substrate 14 with respect to a data communication system whose electrical connector is not sized to fit in the gap 85. In one example, the electrical connector 15 can be mounted to the substrate 14 such that an entirety of the connector housing 18 can be disposed in the gap 85. Further, an entirety of the electrical connector 15 can be mounted to the underlying substrate 14 and disposed in the gap 85. It should be appreciated that a method can include the step of mounting the electrical connector to the substrate 14, such that at least a portion of the electrical connector 15 is disposed in the gap 85. The method can further include the step of mating the electrical connector 15 with the electrical cable in the manner described herein. The gap 85 can extend from the substantially planar bottom surface or planar portion of the bottom surface of the overhang 87 to the substrate 14. Alternatively, the gap can extend from a channel of the overhang 87 to the substrate 14.

Further, the cable connector assembly 21 can advantageously define a low profile. In one example, when the electrical connector 15 is mounted to the underlying substrate 14 and mated with the electrical cable connector, the cable connector assembly 21 can define a height H2. The height H2 of the electrical cable connector 23 can be at least 0.5 mm and less than 3 mm, such as 2 mm±0.5 mm or any value between 0.5 mm and 3 mm, including 0.5 mm and 3 mm. That is, in one example, the cable connector assembly 21 can have a height of no more than substantially 3.5 mm. The height H2 of the electrical cable connector 23 can be defined from the highest location of the second shroud 68 to the mounting surface of the underlying substrate 14. Otherwise stated, the height H2 of the electrical cable connector 23 can be defined by the distance along the transverse direction T from the mounting surface of the underlying substrate 14 to an uppermost surface of the electrical cable connector 23. In one example, the uppermost surface of the electrical cable connector 23 can be defined by the second shroud, though it should be appreciated that other designs of the electrical cable connector 23 are contemplated. The height of the cable connector assembly 21 can be the greater of H1 and H2.

The height H2 of the electrical cable connector 23 can advantageously be less than the height of the gap 85. Thus, the electrical cable connector 23 can be sized to be mounted to the substrate 14, such that at least a portion of the electrical cable connector 23 is disposed in the gap 85. Thus, at least a portion of the electrical cable connector 23 can be aligned with both the substrate 14 and the heat sink 79 along the transverse direction T. The portion of the electrical cable connector 23 can include the second shroud 68. Advantageously, it should be appreciated that the combination of the IC 75, the heat sink 79, the electrical connector 15, and the electrical cable connector 23 can occupy a reduced footprint on the underlying substrate 14 with respect to a data communication system whose electrical cable connector is not sized to fit in the gap 85.

It should further be appreciated that a portion of the cable connector assembly 21 can be disposed in the gap 85. Thus, at least a portion of the cable connector assembly 21 can be aligned with both the substrate 14 and the heat sink 79 along the transverse direction T. The portion of the cable connector assembly 21 can include at least a portion of the electrical connector 15 and a portion of the electrical cable connector 23. For instance, the portion of the electrical cable connector 23 can be defined by or otherwise include the second shroud 68. In one example, the portion of the cable connector assembly 21 can include an entirety of the electrical connector 15 and the portion of the electrical cable connector 23. Alternatively still, the portion of the cable connector assembly can include an entirety of the electrical connector 15 and an entirety of the portion of the electrical cable connector 23. The portion of the cable connector assembly can further include the electrical cables. The electrical cables can be configured as coaxial cables or twin axial cables as described above. The electrical cables can have any suitable height as desired. In one example, the electrical cables can have a height between substantially 1 mm and substantially 4 mm. In one example, the height of the twin axial cables can be substantially 1.5 mm.

Figure 9A:
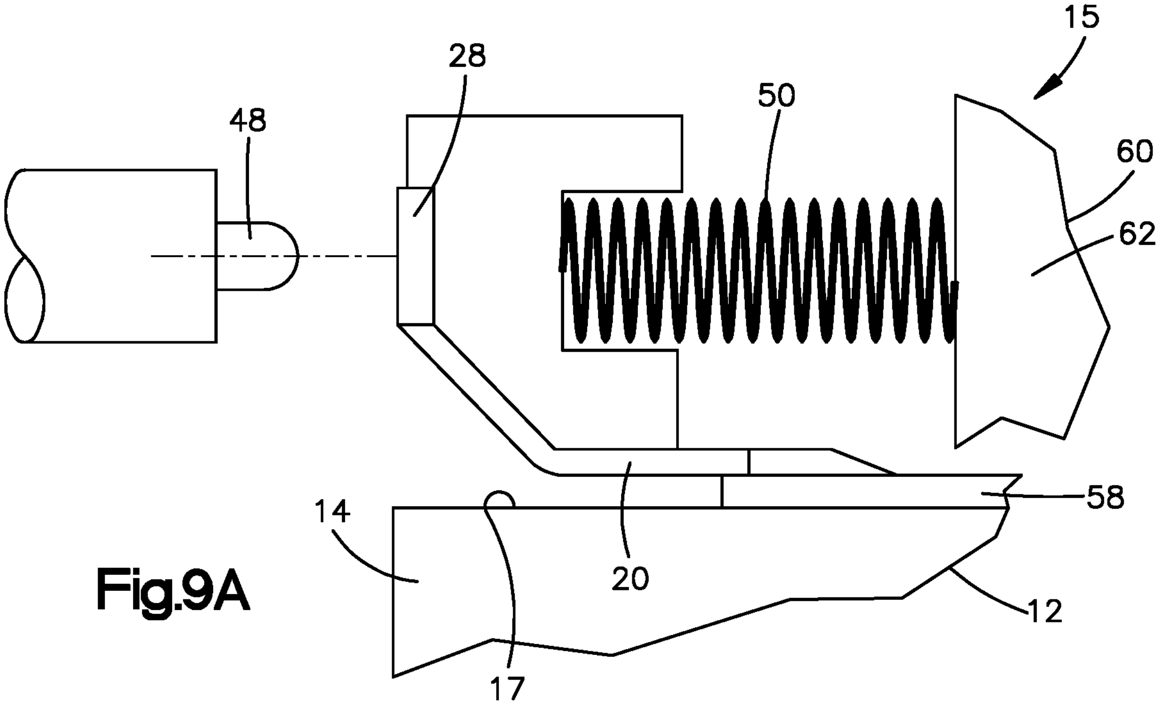
FIG. 9A is a schematic sectional side elevation view of the electrical connector illustrated in FIG. 5, shown in a relaxed position.
Figure 9B:
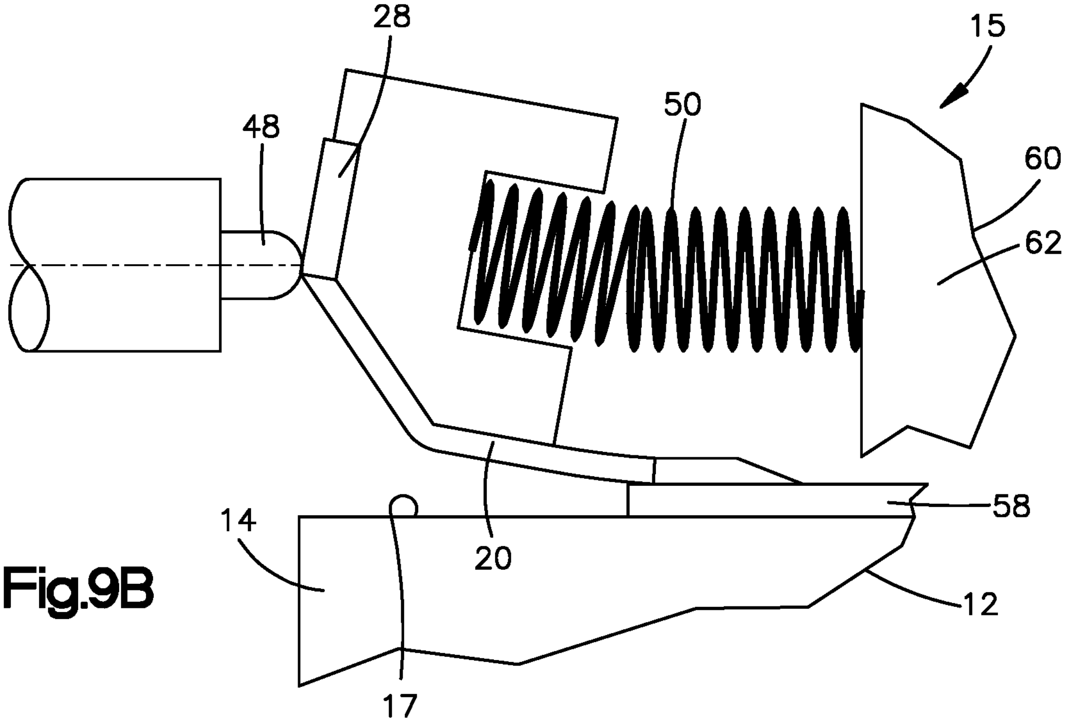
FIG. 9B is a schematic sectional side elevation view of the electrical connector illustrated in FIG. 9A, shown mated with an electrical cable and in a deflected position.
Figure 10:
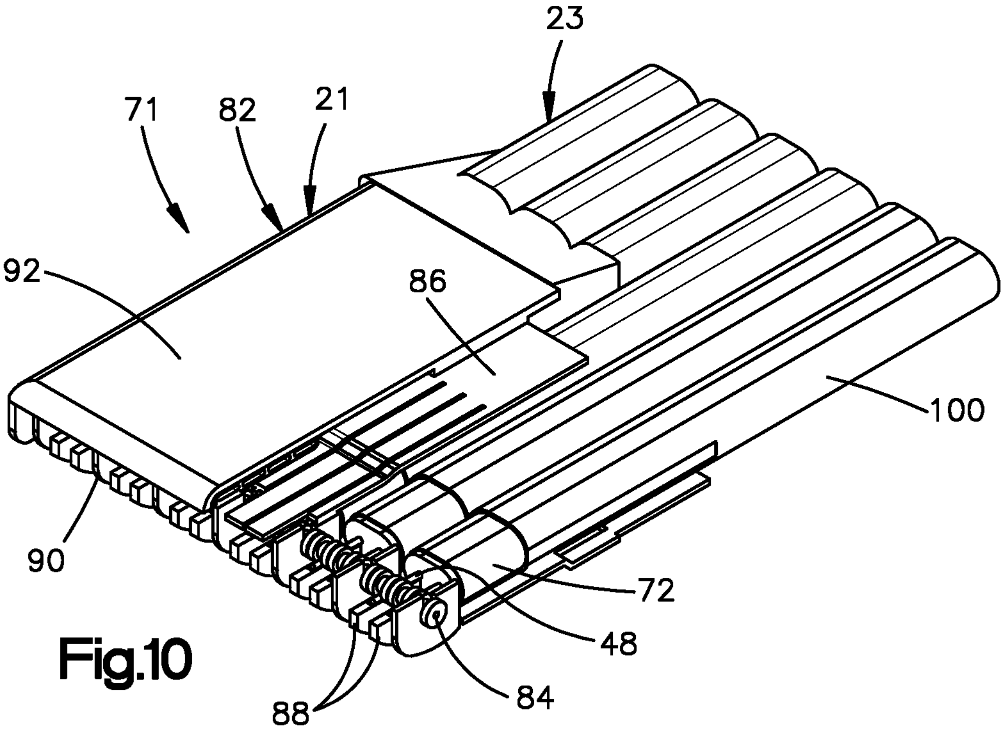
FIG. 10 is a perspective view of a low-profile electrical connector constructed in accordance with another example, showing portions removed for illustrative purposes.

Referring now to FIG. 9A, in one example, the electrical connector 15 can be hard attached to the contact members 58 of the underlying substrate 14 so as to mount the electrical connector 15 to the substrate 14. In one example, the electrical connector 15 can be soldered to the respective contact members 58. For instance, the spring contacts 20 of the differential signal pair 16 and the compressible shield mounting ends 52 of the ground shield 22 can be soldered to the contact members 58. As illustrated in FIG. 9B, after the electrical connector 15 has been mounted to the contact members 58, the spring contacts 20 and compressible shield mounting ends 52 can undergo one or both of elastic deformation and plastic deformation as twin axial cable signal conductors 48 are forced against the cable contact pads 28. The biasing member 50 that bears against the wall 62 of the first shroud 60 can provide a restoring force. Further, the biasing member 50 can angularly deflect as the signal conductors 48 are forced against the contact pads 28. Otherwise stated, the biasing member 50 provides a restoring force or counterforce against a force applied to the electrical connector 15 by the signal conductors 48 against the cable contact pads 28.

Referring to FIGS. 1-9 generally, when the electrical connector 15 includes first and second signal contacts 40 and 40*a*, the mating ends of the signal contacts can be spaced from each other along the transverse direction. Thus, one of the mating ends can be spaced from the other of the mating ends in a direction toward the underlying substrate 14 when the electrical connector is mounted to the underlying substrate 14. In one example, the mating ends can be aligned with each other along the transverse direction. Thus, the signal conductors can similarly be spaced from each other along the transverse direction. In particular, one of the signal conductors can be spaced from the other of the signal conductors in a direction toward the underlying substrate 14 when the electrical connector is mated to the signal conductors and mounted to the underlying substrate 14. In one example, the signal conductors can be aligned with each other along the transverse direction.

Alternatively, the mating ends of the signal contacts can be spaced from each other along the lateral direction. Thus, one of the mating ends can be spaced from the other of the mating ends in a direction parallel to the underlying substrate 14 when the electrical connector is mounted to the underlying substrate 14. In one example, the mating ends can be aligned with each other along the lateral direction. Thus, the signal conductors can similarly be spaced from each other along the lateral direction. In particular, one of the signal conductors can be spaced from the other of the signal conductors in a direction parallel to the underlying substrate 14 when the electrical connector is mated to the signal conductors and mounted to the underlying substrate 14. In one example, the signal conductors can be aligned with each other along the lateral direction.

Alternatively still, the mating ends of the signal contacts can be spaced from each other along an angled direction. The angled direction can define a non-perpendicular angle with each of the transverse direction T and the lateral direction A. The non-perpendicular angle can be disposed in a plane that is defined by the transverse direction T and the lateral direction A. In one example, the mating ends can be aligned with each other along the angled direction. Thus, the signal conductors can similarly be spaced from each other along the angled direction when the electrical connector is mated to the signal conductors and mounted to the underlying substrate 14. In one example, the signal conductors can be aligned with each other along the angled direction.

Further, the electrical signal contacts 40 and 40*a* and the signal conductors 100 can be designed to maintain a predetermined impedance, or minimize deviations from the predetermined impedance. In one example, the predetermined impedance can be substantially 80 Ohms, substantially 100 Ohms, or any suitable alternative impedance as desired. The impedance of substantially 80 Ohms or substantially 100 Ohms can be particularly applicable for differential signal pairs, though it should be appreciated that the predetermined impedance for differential signal pairs can vary as desired. Further, impedance of 80 Ohms or 100 Ohms can also be used when the at least one electrical contact of the electrical connector is single ended. In another example, the predetermined impedance can be substantially 50 Ohms, or any suitable alternative impedance as desired. The impedance of substantially 50 Ohms can be particularly applicable for single ended contacts, though it should be appreciated that the predetermined impedance for single ended contacts can vary as desired. Further, impedance of substantially 50 Ohms can also be used for differential signal contacts. In this regard, it should be appreciated that the impedance values described above are by way of example only.

Referring now to FIGS. 10-13, a low-profile electrical connector 82 constructed in accordance with another example is configured to mate with the at least one electrical cable 100. In particular, the electrical connector 82 can include electrical signal contacts 88 that can define a respective plurality of differential signal pairs. Electrical contacts that define a differential signal pair can be referred to as differential signal contacts. The electrical connector 82 can further include a dielectric spacer 84 that is configured to be positioned between adjacent ones of the differential signal pair of the electrical connector 82. In this regard, as described above with respect to the electrical connector 15, the data communication system 71 can include the electrical connectors 82.

The electrical connector 82 can further include a first or articulated ground shield 86 that is configured to bias the signal contacts 88 against respective contact members 58 of the underlying substrate 14. The electrical connector 82 can further include a second ground shield 108, and at least one ground wall 90 that is in electrical communication with the second ground shield 108. As is described in more detail below, the ground shield and the at least one ground wall 90 can be in physical contact with each other. The ground wall 90 can be configured to contact a corresponding ground contact member of the underlying substrate. The electrical connector 82 can further include a cover or shroud 92. The electrical connector 82 can be attached directly to the underlying substrate 14 via mounting hardware such as a bracket with fasteners, or by being received in a shroud that biases the electrical signal contacts 88 and the ground walls 90 against the contact members 58 of the underlying substrate 14.

Figure 11:
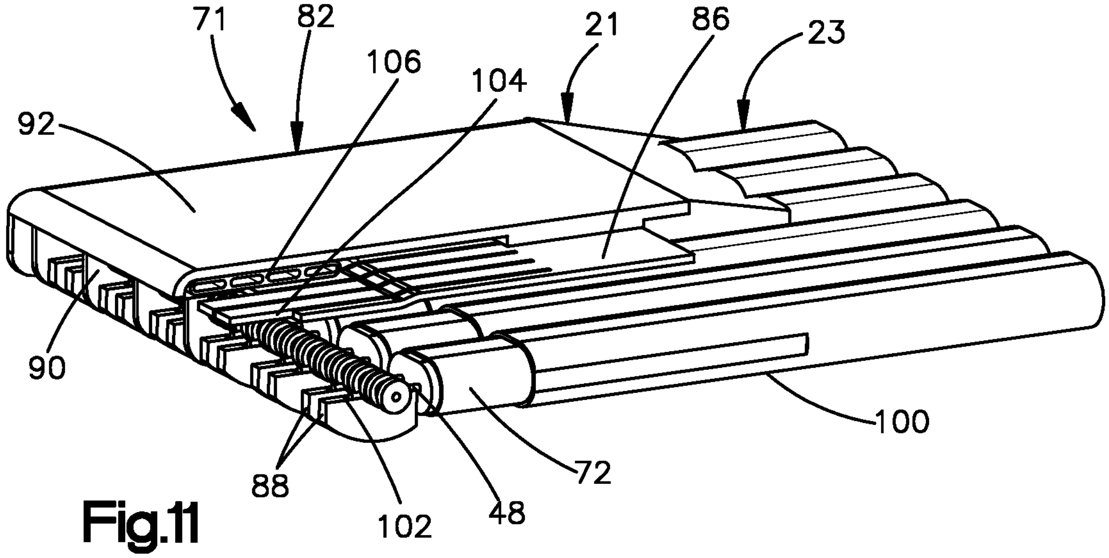
FIG. 11 is a perspective sectional view of the low-profile electrical connector illustrated in FIG. 10.
Figure 12:
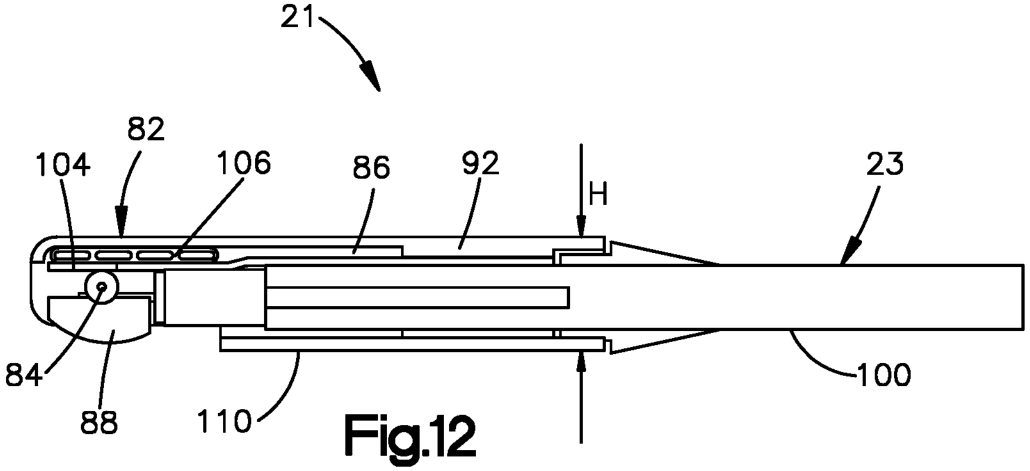
FIG. 12 is a sectional side elevation view of the low-profile electrical connector illustrated in FIG. 10.

Referring now to FIGS. 11 and 12, the electrical cable 100 can be configured as a twin axial cable or one or more coaxial cables. The twin axial cable can include a pair of electrical signal conductors 48, an electrical insulator surrounding the twin axial cable conductors 48, and an electrically conductive cable shield wrap or braid 72. As described above with respect to the electrical connector 15, the electrical signal conductors 48 can be electrically and physically attached to respective ones of the electrical signal contacts 88. In one example, the electrical signal contacts 88 can each define a groove 102 that receives a corresponding one of the twin axial cable conductors 48. The electrically dielectric spacer 84 can be generally cylindrical in cross-section, though it should be appreciated that the dielectric spacer 84 can define any suitable alternative shape as desired. The dielectric spacer 84 can define ridges and recesses that are spaced apart from each other and alternatingly arranged, and configured to prevent the differential signal contacts 88 from physically or electrically contacting one another or the ground walls 90.

The first ground shield 86 can include a biasing member configured as one or more spring fingers 104 that is configured to apply a mounting force to the differential signal contacts 88. For instance, the spring fingers can be configured to bias the dielectric spacer 84 against the differential signal contacts 88, which in turn biases the differential signal contacts 88 against respective contact members 58 of the underlying substrate 14. Thus, the spring fingers 104 can define biasing members that provide a force that urges the differential signal contacts 88 toward the respective contact members 58. While the dielectric spacer 84 is shown separate from the spring fingers 104, it should be appreciated that the dielectric spacer 84 can alternatively be carried by the spring fingers 104. The first ground shield 86 can be further configured to electrically contact the cable shield wrap or braid 72. The spring fingers 104 can also be configured to bias the dielectric spacer 84, and thus the differential signal contacts 88, toward the underlying substrate 14.

The electrical connector 82 can further include a first elastic electrically conductive ground gasket 106 that is configured to provide electrical ground/reference continuity between the articulated ground shield 86 and the cover 92 of the electrical connector 82. The cover 92 can be formed from an electrically conductive plastic, metal, or electrically conductive lossy material. As described above with respect to the electrical connector 15, the electrical connector 82 can define a height that can be at least 0.5 mm and less than 3 mm, such as 2 mm 0.5 mm or any value between 0.5 mm and 3 mm, including 0.5 mm and 3 mm.

Figure 13:
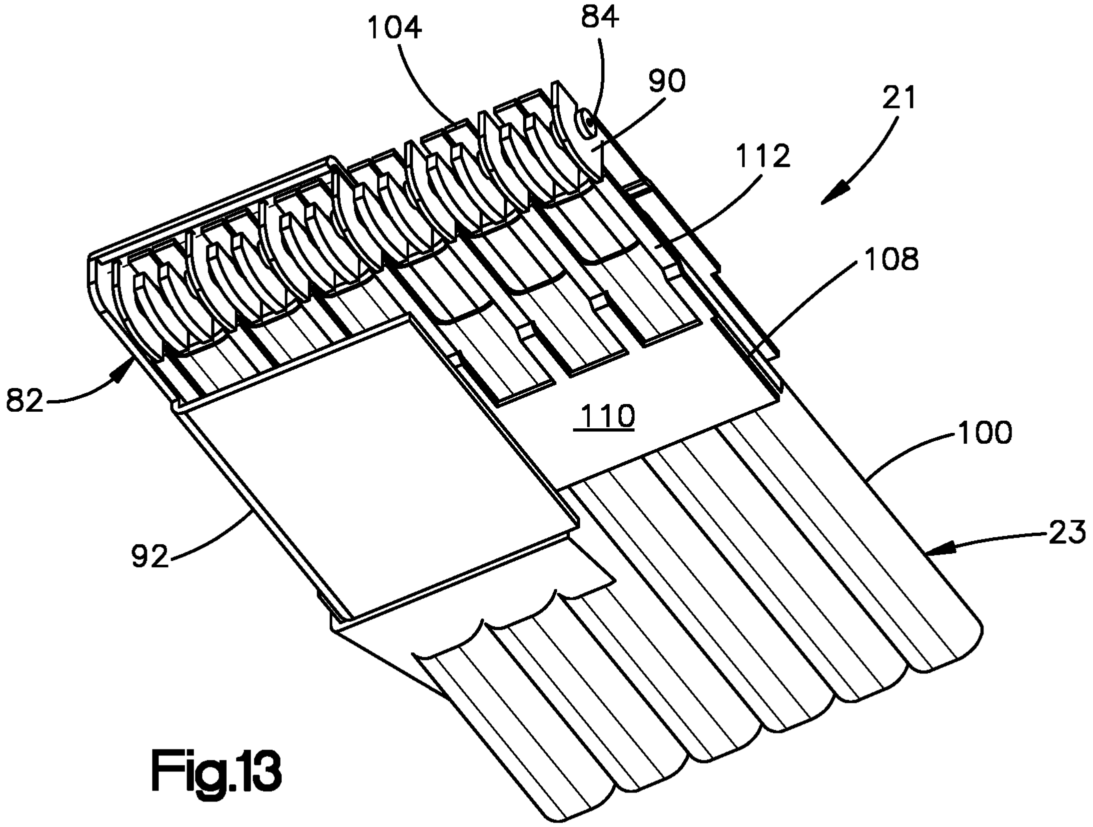
FIG. 13 is a perspective view of the low-profile electrical connector illustrated in FIG. 10, showing portions removed for illustrative purposes.

Referring now to FIG. 13, the electrical connector 82 can further include a second or lower ground shield 108 that is opposite the first ground shield 86. In this regard, the first ground shield 86 can be referred to as an upper ground shield. The second ground shield 108 can be a forked ground shield that includes a base section 110 and cantilevered arms 112 that each extend independently from the base section 110. The cantilevered arms 112 can extend in the forward direction from the base section 110. The electrical connector 82 can further include a second elastic ground gasket that can be positioned between the cover 92 and the lower fork ground shield 108. The cantilevered arms 112 may be electrically connected to the ground walls 90. For instance, the cantilevered arms 112 can be placed in contact with the ground walls 90. Alternatively, the cantilevered arms 112 can be monolithic with the ground walls 90.

It should be appreciated that the electrical connector can define at least one electrical ground cage around the signal contacts. For instance, one or more up to all of the ground wall 90, the base section 110, the first ground shield 86, the cover 92, and the gasket 106 all be grounded, and can combine so as to define at least one electrical ground cage around the signal contacts 88. The electrical ground cage can be configured as a Faraday cage that provides shielding to the signal contacts 88 and to the interface between the signal contacts 88 and the signal conductors of the electrical cable.

Figure 14:
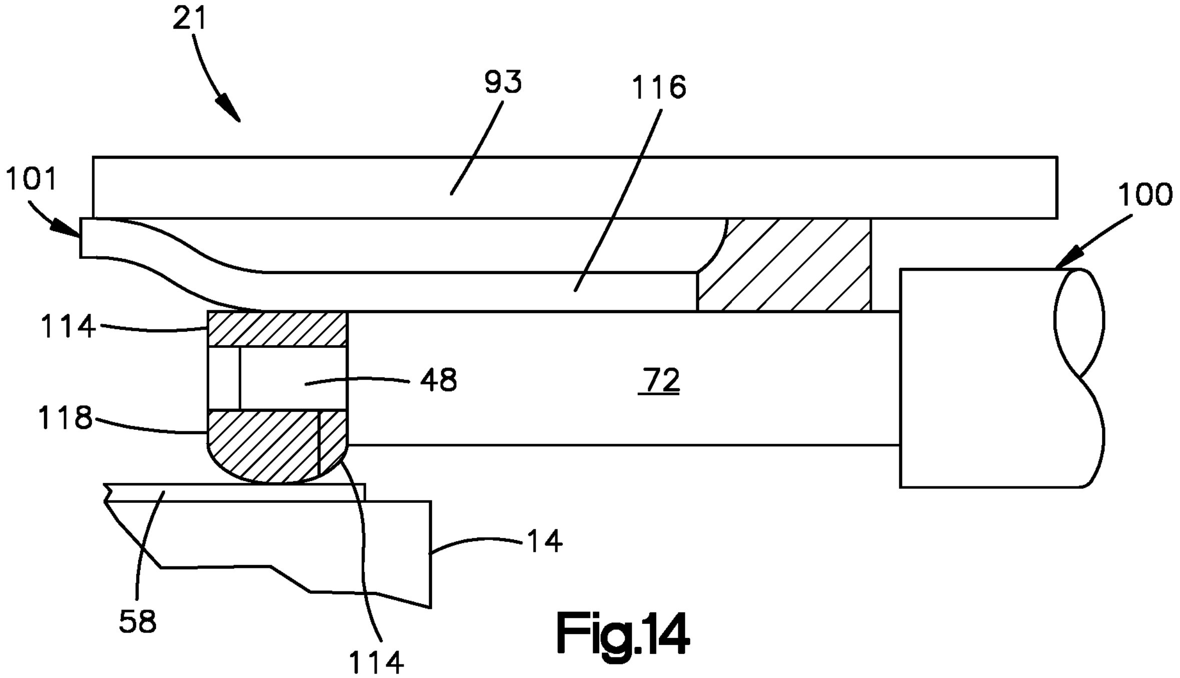
FIG. 14 is a schematic sectional side elevation view of a low-profile electrical connector constructed in accordance with another example.

Referring now to FIG. 14, a low-profile electrical connector 101 can be constructed in accordance with another example so as to place the electrical signal conductors 48 in electrical communication with respective contact members 58 of the underlying substrate 14 when the electrical connector is mated with the electrical cable 100 so as to define the cable connector assembly 21. For instance, the electrical connector 101 can include at least one electrically conductive contact or spacer 118 that can be interposed between a respective at least one signal conductor 48 and the respective at least one contact member 58. Thus, the contact or spacer 118 can placed the signal conductor in electrical communication with the contact member 58. In one example, the electrically conductive spacer 118 can be welded or soldered to the respective at least one contact member 58. In one example, the electrically conductive spacer 118 can be solder.

The electrical connector 101 can further include a cover or shroud 93 and a biasing member 116 that is braced against the cover. The biasing member 116 can be configured as a cantilevered or leaf spring. The biasing member 116 can be electrically conductive. The biasing member 116 can bear against the cable shield wrap or braid 72 of the electrical cable 100, or otherwise bear against the electrical cable 100. The electrical cable 100, including the signal conductor and cable shield wrap or braid 72 can bend elastically and/or plastically, for instance under the force provided by the biasing member 116.

The biasing member 116 can be positioned between the cover 92 and the electrical cable 100, and in particular the cable shield wrap or braid 72. In this regard, the biasing member 116 can also be referred to as a ground beam that is in electrical communication with the cable shield wrap or braid 72. The ground beam can be in contact with the cover 93 at least at one location. For instance, the ground beam can be in contact with the cover 93 at a plurality of locations, such as two locations, that are spaced apart from each other along the length of the ground beam. Thus, the ground beam can define a reliable ground reference, while minimizing the formation of antennas. Further, the biasing force of the cover 93 against the ground beam at more than one location can allow the ground beam to have a thin construction, while maintaining an appropriate biasing force, thereby contributing to the low profile of the electrical connector 101.

The electrical connector 101 can further include an electrically insulative spacer 114 positioned between the biasing member 116 and the respective signal conductor 48. The biasing member 116 can provide a force that urges the electrically insulative spacer 114 against the signal conductor 48. The force, in turn, can bias the signal conductor 48 against the electrically conductive spacer 118, which biases the electrically conductive spacer against the respective signal contact member 58. Thus, the biasing member 116 can provide a force that places the signal conductor 48 in electrical communication with the respective signal contact member 58. In one example, the electrically insulative spacer 114 can be attached to the signal conductor 48. It should be appreciated that in one example, the force applied by the biasing member 116 can be separate from the signal conductor 48. Thus, the biasing force that urges the electrically conductive spacer 118 against the signal contact member 58 is not defined by the stiffness of the spacer 118, the signal conductor 48, or the cable shield wrap or braid 72. Rather, the biasing force is provided by the biasing member 116 that is separate from each of the spacer 18, the signal conductor 48, and the cable shield wrap or braid 72. Further, the biasing member 116 can be elongate along a length that can at least partially overlap the cable 100 in a plane that is defined by the lateral direction and the transverse direction. In one example, a majority of the length of the biasing member 116 can overlap the cable 100. Thus, the length of the biasing member 116 that extends out from the cable 100 is minimized, thereby minimizing the occupied real estate on the substrate 114.

Figure 15:
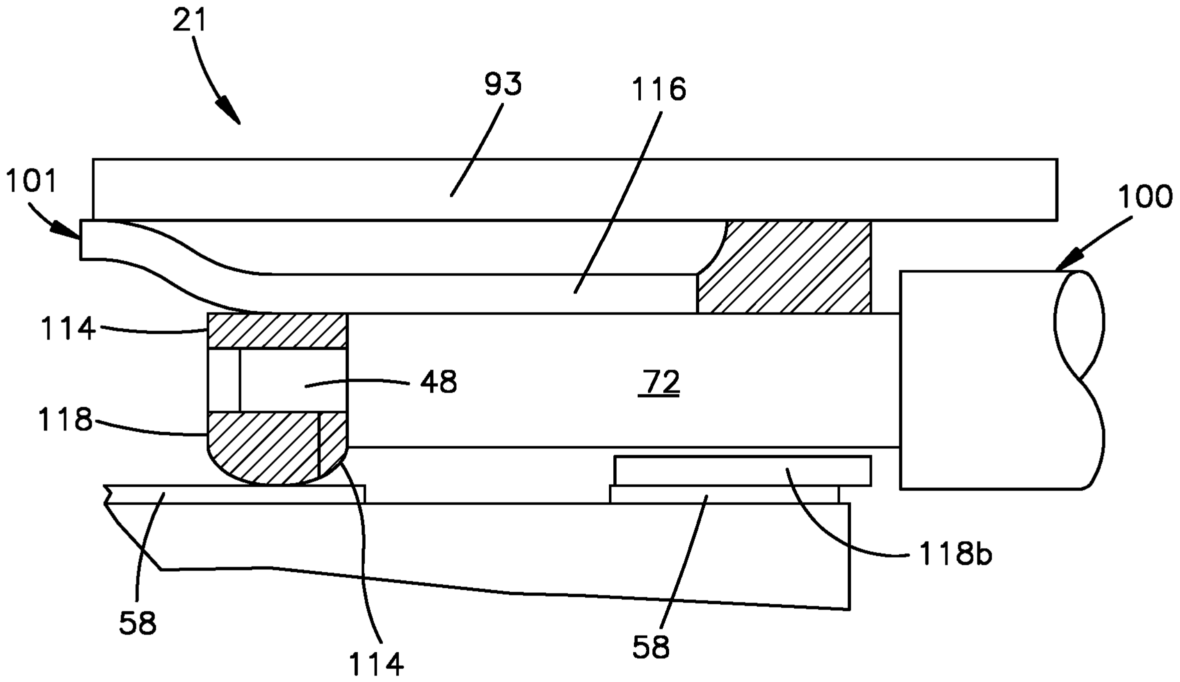
FIG. 15 is a further schematic sectional side elevation view of the low-profile electrical connector illustrated in FIG. 14.
Figures 16A, 16B:
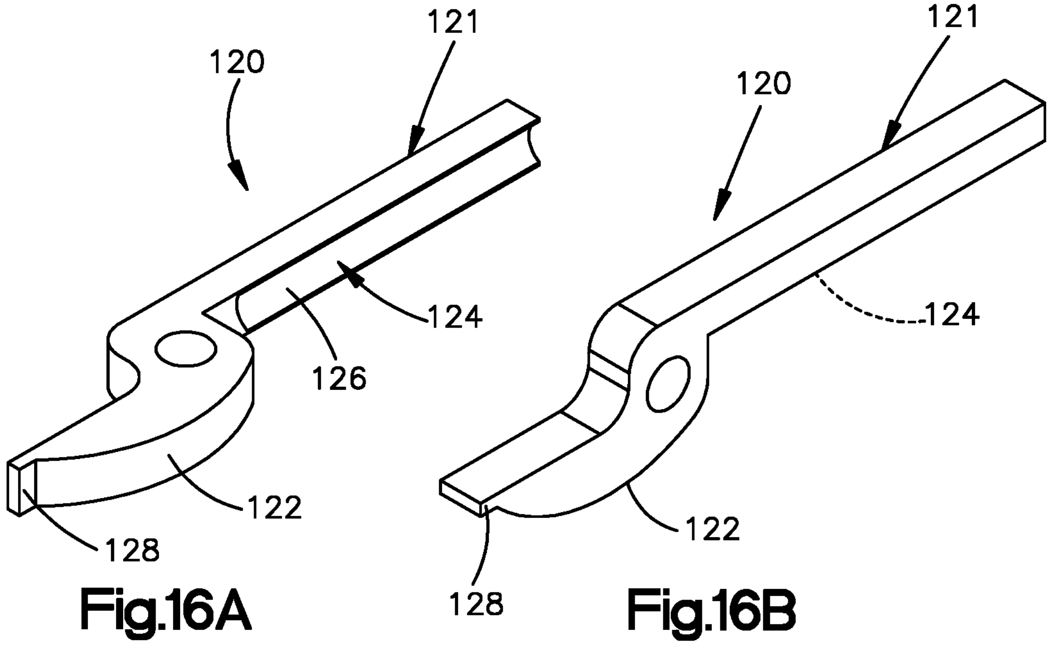
FIG. 16A is a perspective view of an electrical signal contact of a low-profile electrical connector illustrated in FIG. 17 and constructed in accordance with still another example.
FIG. 16B is another perspective view of the electrical signal contact illustrated in FIG. 16A.

As illustrated in FIG. 15, the cable shield wrap or braid 72 of the twin axial cable 100 can also be placed in electrical communication with a respective ground contact member 58 on the mounting surface of the underlying substrate 14. In particular, a second electrically conductive spacer 118*b* can be disposed between the wrap or braid 72 and the ground contact member 58. The biasing member 116 can apply a force that biases the wrap or braid 72 against the respective ground contact member 58. Alternatively, the electrically conductive spacer 118*b* can be configured as a drain wire of the electrical cable 100. It should be appreciated that the geometry of the components illustrated in FIG. 10-15 and the other examples described and shown herein are for illustrative purposes, and one having ordinary skill in the art will appreciate that the geometries can be varied as desired, for instance to minimize impedance discontinuities in the electrical connector as desired. The geometries can be varied without departing from the aspects of the present disclosure as described herein.

As illustrated in FIGS. 14-15, and as described above, the biasing member 116 can bear against the cover 93 and can apply a biasing force to the electrically insulative spacer which, in turn urges the electrical signal conductor 48 of the electrical cable 100 in electrical communication with the signal contact member 58. For instance, the electrical cable 100 can undergo one or both of elastic and plastic deformation when the signal conductor is urged in electrical communication with the signal contact member 58. Further, the biasing member 116 can contact the cover 93 at first and second contact locations. Thus, the cover can bear against the biasing member 116 at first and second contact locations. The first and second contact locations can be spaced from each other along the longitudinal direction. For example, the first contact location can be adjacent and aligned with the electrical cable 110 along the transverse direction T. The second contact location can be spaced from the electrical cable 110. Thus, because the biasing member 116 is supported a plurality of locations, such as at two ends, the biasing member 116 can be made thin along the transverse direction T, while maintaining an appropriate biasing force, along with the cover 93. Further, the biasing member 116 can define a reliable ground reference, while minimizing the formation of antennas. The biasing member 116 can define one or more fingers as desired.

Referring now to FIGS. 16A-21 generally, an alternatively constructed low-profile electrical connector 101 can include an electrically conductive signal contact 120. The signal contact 120 can be configured as a signal pin 121 (FIGS. 16A-16B) that can be mated with a respective one of the signal conductors 48. Each signal pin 121 can define a mounting end that defines a contact surface 122 configured to mount to a respective signal contact member 58 of the underlying substrate 14, and a mating end that defines a cable engagement surface 124 configured to contact a respective electrical signal conductor 48. The contact surface 122 and the cable engagement surface 124 can be disposed opposite each other. In this regard, the electrically conductive signal contact 120 can be referred to as a vertical signal contact. The cable engagement surface 124 can be configured to receive the respective signal conductor 48. In one example, the cable engagement surface 124 can define a groove 126 sized to receive the signal conductor 48. The groove 126 can be configured as a pin groove 126 or any suitable alternatively constructed groove.

Figure 17:
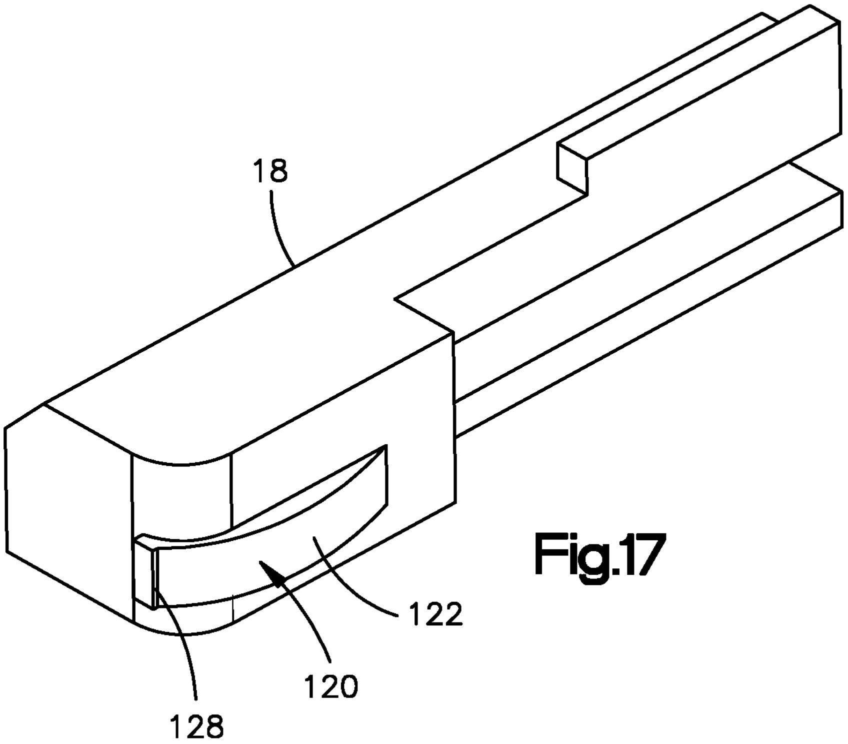
FIG. 17 is a perspective view of the electrical connector including a dielectric connector housing supporting the electrical signal contact illustrated in FIG. 16A.

The electrical connector 101 can include the signal contact 120 can be supported by an electrically insulative connector housing 18 (see FIG. 17). For instance, each signal contact 120 can be insert molded into the electrically insulative connector housing 18. Thus, the connector housing 18 can be referred to as an overmolded body. The electrically insulative connector housing 18 can be configured as a plastic body. It should be appreciated that the signal contact 120 can be supported by the electrically insulative connector housing 18 in any suitable manner as desired. The signal contacts 120 can include tabs 128 that extend to a sacrificial carrier strip 130 (see FIG. 18), which can be removed during singulation of the signal contacts 120. The mating end and the mounting end can each protrude out from the connector housing 18.

Figure 18:
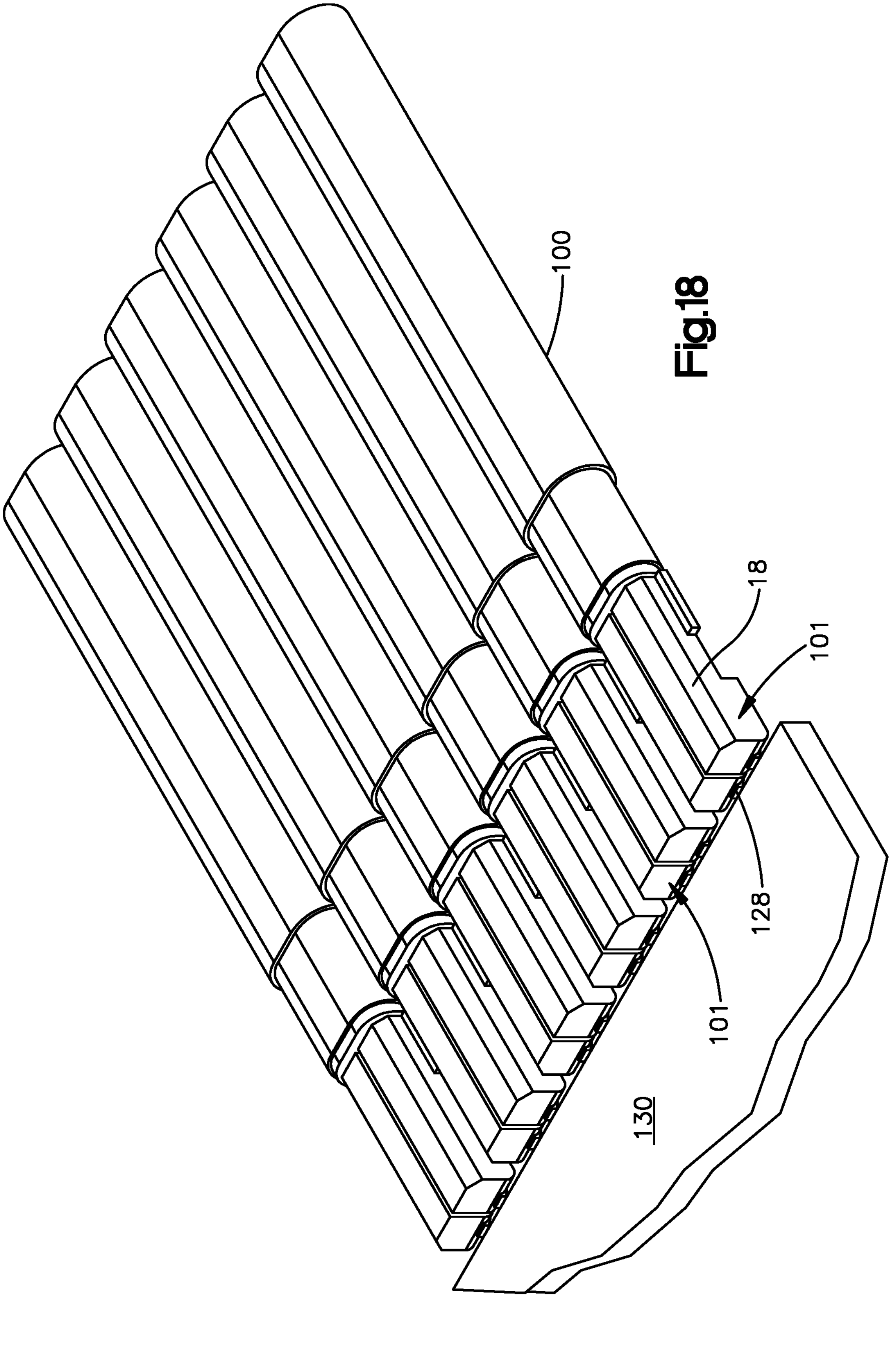
FIG. 18 is a perspective view of a plurality of the electrical connectors illustrated in FIG. 17, shown mated to a respective electrical signal conductor of an electrical cable.

Referring now to FIG. 18, a plurality of electrical connectors 101 can include a corresponding plurality of electrically insulative connector housings 18 and a corresponding plurality of electrical signal contacts 120 (see FIG. 16A) supported by the electrically insulative connector housings 18. Thus, each electrical signal contact 120 can be supported by a respective electrically insulative connector housing 18. The connector housing 18 of each electrical connector 101 can be bifurcated, such that each electrical connector can include first and second electrical signal contacts 120 arranged as a differential signal pair. The signal contacts 120 of a pair of electrical connectors 101 (hidden from view in FIG. 18 by the overmolded connector housing 18) can be mated with respective signal conductors of at least one electrical cable 100 at the cable engagement surface 124. Although obscured by the connector housing 18 in FIG. 18, the twin signal conductors 48 of the at least one electrical cable 100 can be electrically received in respective grooves 126 of a respective signal contact 120, thereby placing the signal conductors in electrical communication with the signal contacts 120. For instance, the signal conductors 48 can be attached to the signal contacts 120 in the respective grooves 126. The grooves 126 can define the cable engagement surface 124.

Figure 19:
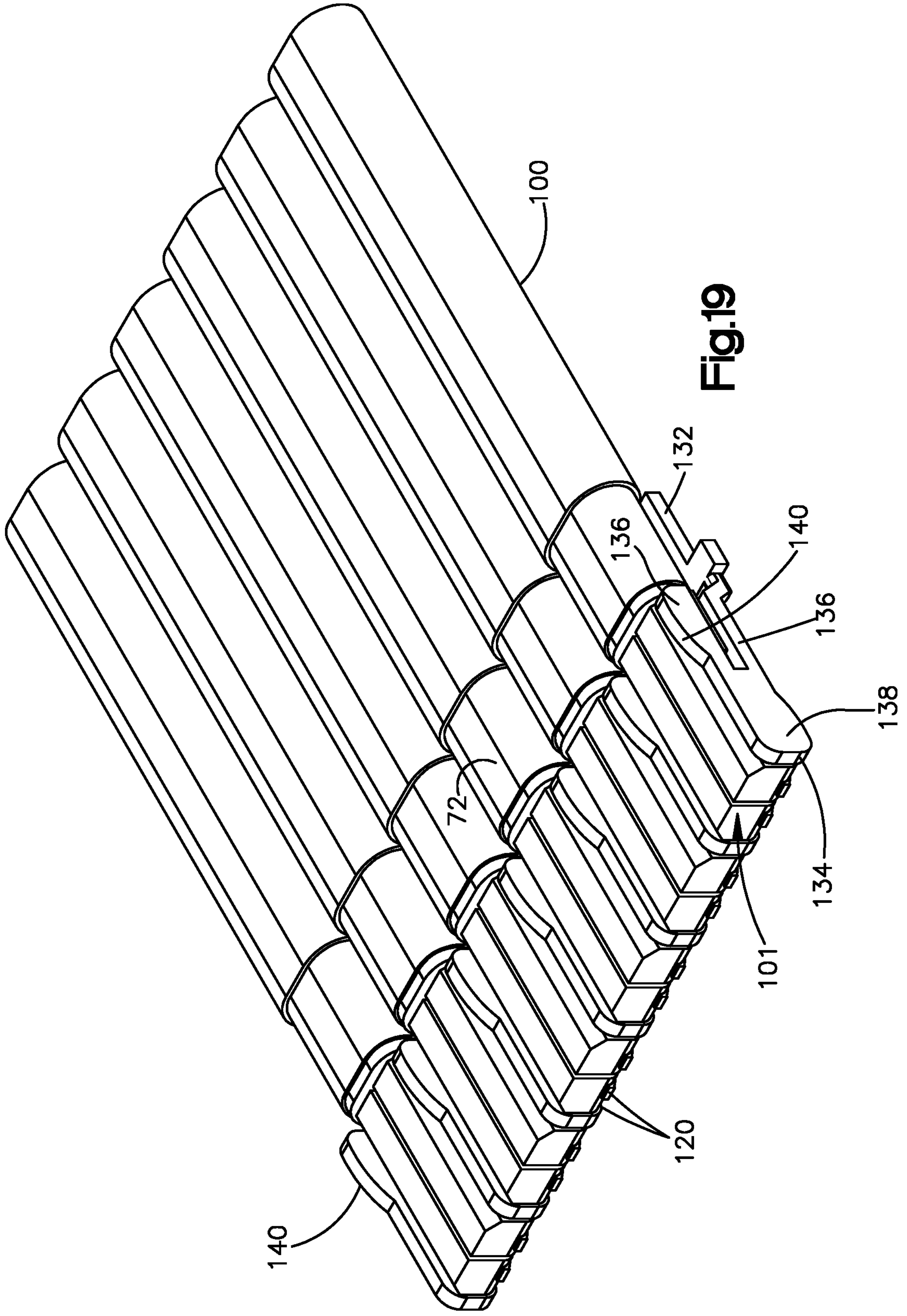
FIG. 19 is a perspective view of the plurality of electrical connectors illustrated in FIG. 17, further including a first cable ground bus.

As shown in FIG. 19, the electrical connector 101 can include a first cable ground bus 132 that electrically connects to, or commons, the ground cable shield wraps or braids 72 of the twin axial cables 100 to each other. The electrical connector 101 can further include electrical ground contacts 134 that are electrically connected to the first cable ground bus 132. Further, the electrical ground contacts 134 can be interspaced between respective pairs of the insert molded signal contacts 120. In one example, the ground contacts 134 can be compressible ground contacts. In one example, each of the compressible ground contacts 134 may be generally C-shaped. The ground contacts 134 can include a base 138 and first and second cantilevered arms 136 that extend from the base 138. Each cantilevered arm 136 can extend in a direction toward the twin axial cable 100. At least one or both of the cantilevered arms 136 can be flexible in a direction toward the first cable ground bus 132.

Figure 20:
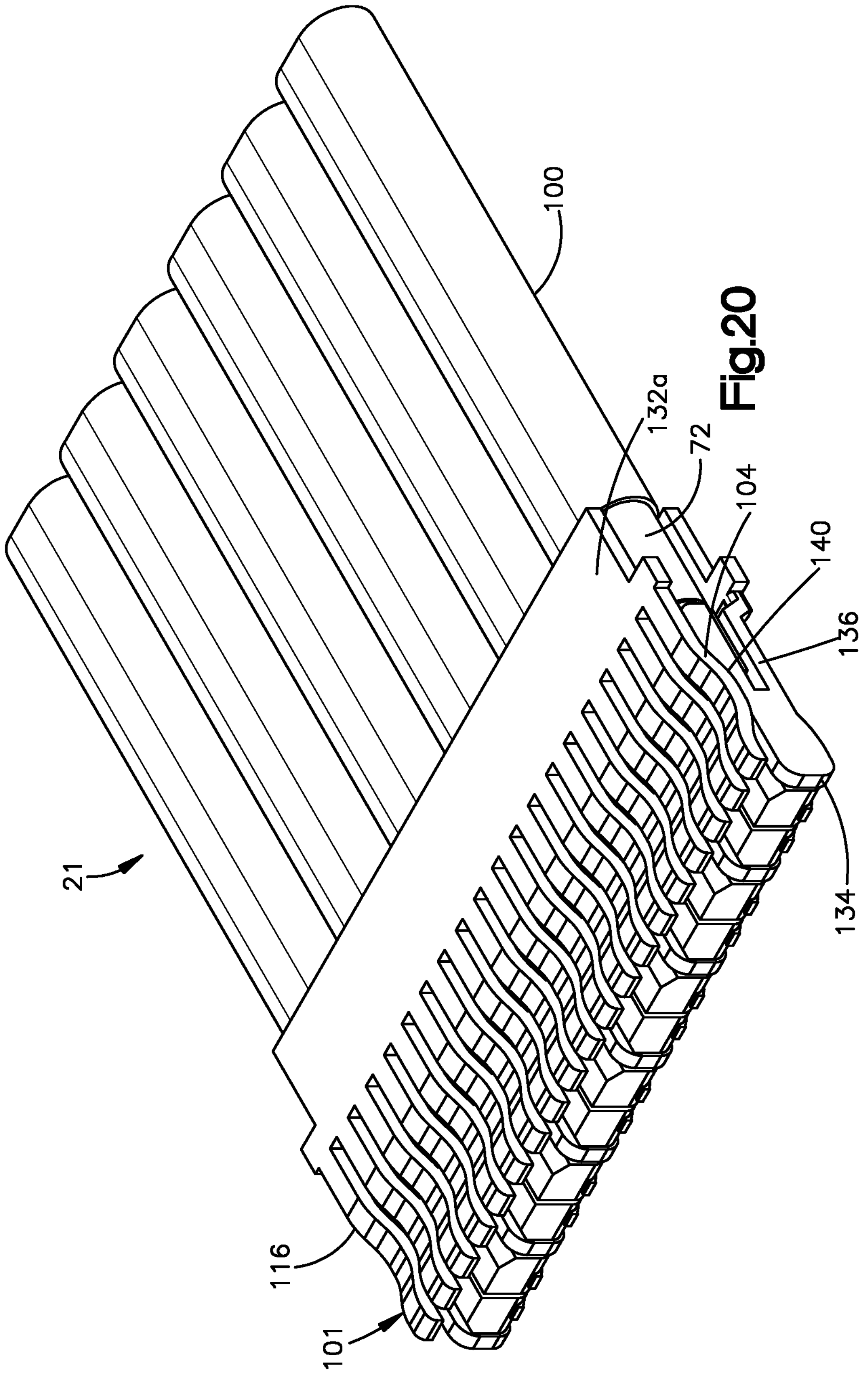
FIG. 20 is a perspective view of the plurality of electrical connectors illustrated in FIG. 19, further including a second cable ground bus.

Referring now also to FIG. 20, at least one or both of the cantilevered arms 136 can include an arm contact surface 140 that faces a second cable ground bus **132*a* of the electrical connector 101. The second cable ground bus 132*a* is configured to electrically connect to, or electrically common, the cable shield wraps or braids 72 of the twin axial cables 100 to each other. The second cable ground bus 132*a* can include one or more spring fingers 104 that each extend in a direction away from the twin axial cables 100. At least some of the spring fingers 104 can be configured to physically or otherwise resiliently electrically contact a corresponding one of the ground contacts 134. In particular, the at least some of the spring fingers is configured to physically or otherwise electrically resiliently contact a corresponding cantilevered arm 136 of the ground contacts 134. In particular, the at least some of the spring fingers 104 can be configured to physically or otherwise electrically contact a corresponding arm contact surface 140 of the one of the cantilevered arms 136 of the ground contacts 134. Alternatively or additionally, at least some of the spring fingers can bear against the connector housing 18 (see FIG. 17**).

It should be appreciated that the electrical connector can define at least one electrical ground cage around the signal contacts 120. For instance, one or more up to all of the ground contact 134, the ground bus 132, and the spring fingers 104 can all be grounded, and can combine so as to define at least one electrical ground cage around the signal contacts 120. The electrical ground cage can be configured as a Faraday cage that provides shielding to the signal contacts 120 and to the interface between the signal contacts 120 and the signal conductors of the electrical cable.

Figure 21:
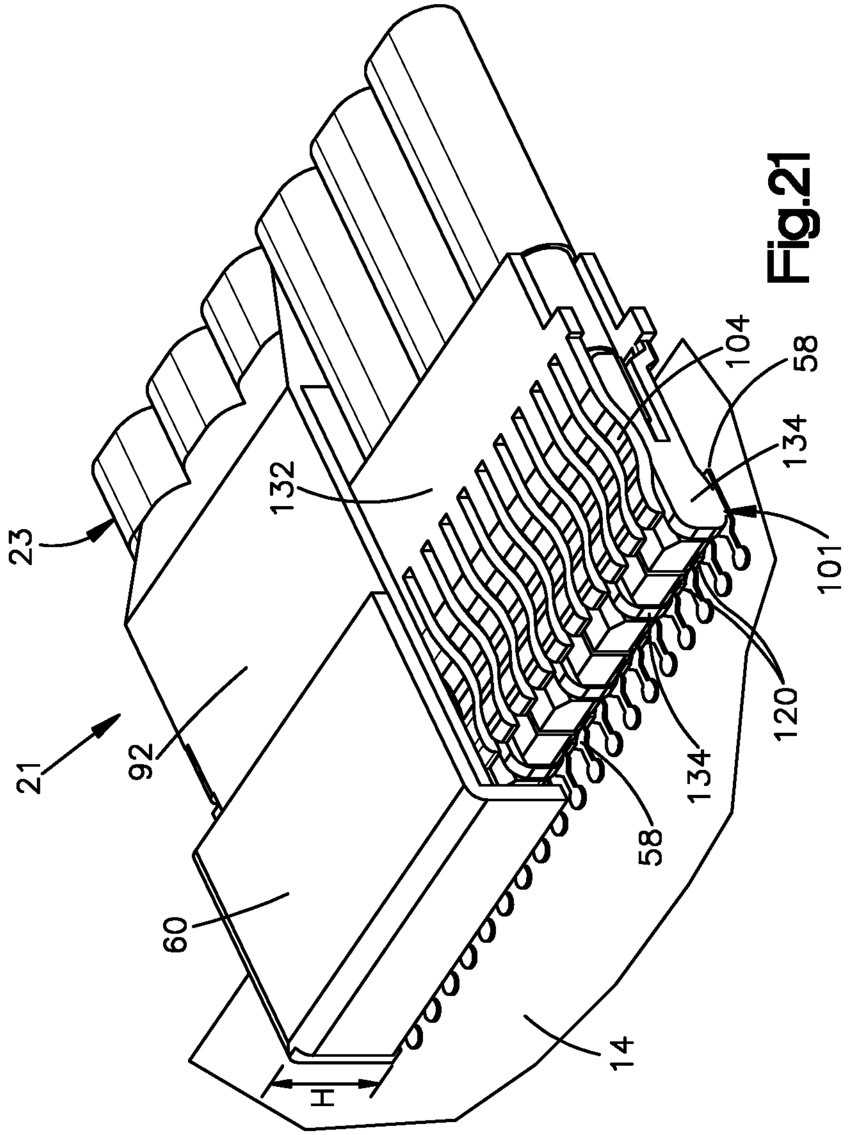
FIG. 21 is a perspective view of the plurality of electrical connectors illustrated in FIG. 20, including a shroud that is configured to engage with a cover.

Referring now to FIG. 21, the low-profile connector 101 can include a cover 92 that at least partially surround the second cable ground bus **132*a* and the biasing member 116. As described above, the force applied by the biasing member 116 can be separate from the signal conductor 48. Further, the biasing member 116 can be elongate along a length that can at least partially overlap the cable 100 in a plane that is defined by the lateral direction and the transverse direction. In one example, a majority of the length of the biasing member 116 can overlap the cable 100. Thus, the length of the biasing member 116 that extends out from the cable 100 is minimized, thereby minimizing the occupied real estate on the substrate 114**.

The cover 92 is configured to mate and releasably lock with the first shroud 60 of the electrical connector 101. The spring fingers 104 of the second cable ground bus 132 can brace against the cover 92 so as to bias the signal pins 120 and the compressible ground contacts 134 against the respective contact members 56 of the underlying substrate 14. The electrical connector can define a height from the uppermost surface of the first shroud 60 and the mounting surface of the substrate 14 that can be at least 0.5 mm and less than 3 mm, such as 2 mm±0.5 mm or any value between 0.5 mm and 3 mm, including 0.5 mm and 3 mm and all 0.5 mm intervals therebetween. Thus, the electrical connector 101 can be mounted to the substrate 14 such that a portion of the electrical connector 101 is disposed in the gap 85 (see FIGS. 22A-22E) as described above.

Referring now to FIGS. 22A-22E in general, the data communication system 71 can include a thermal management system 141 that can be configured to increase thermal cooling of the integrated circuit 75 and other components of the data communication system 71. Thus, an internal thermal management system 141 can be used to increase thermal cooling and decrease the size of the substrate 14 that carries the integrated circuit 75, which leads to lower costs. The data communication system 71 can be supported in a system tray 150 that defines a tray enclosure 160. The system tray 150 can be a one rack unit (1U) tray. In particular, the system tray 150 can include a first or top enclosure wall **148*a* and a second or bottom enclosure wall 148*b* that is opposite the first enclosure wall 148*a* along the transverse direction T and at least partially defines the enclosure 160. The system tray can further include front and rear ends 151 and 153 that are opposite each other along a longitudinal direction L that is perpendicular to the transverse direction T. The longitudinal direction L can further define the insertion direction ID or mating direction of the electrical cables 100 as described above. The front and rear ends 151 and 153 can be porous with respect to airflow, such that a forced fluid, such as forced air, can flow through the system tray 150 along at least one airflow path 158 that extends across the heat dissipation members 81 of the heat sink 79. The heat dissipation members 81 can be configured as pins or fins that are oriented perpendicular to the direction of airflow. Accordingly, the forced air traveling through the at least one airflow path 158 can remove heat produced by the integrated circuit 75. In particular, the at least one airflow path 158 can extend across the heat dissipation members 81, such that forced air traveling through the at least one airflow path 158 can remove heat from the heat dissipation members 81, and thus from the integrated circuit 75**.

Figure 23A:
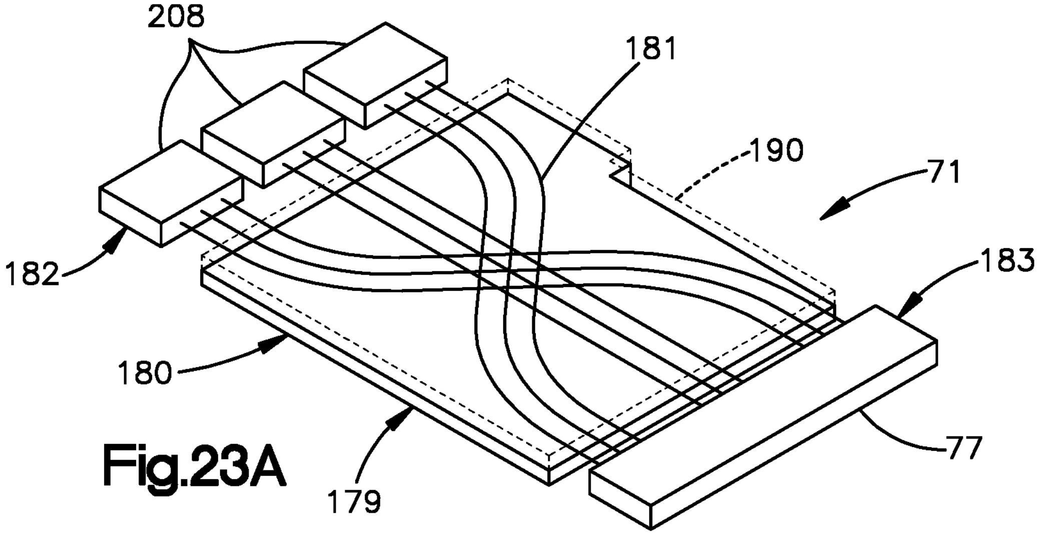
FIG. 23A is a schematic perspective view of an electrical communication system including the cable routing laminate illustrated in FIG. 22D.

Further, the data communication system 71 can further include a heat sink 154 that is in thermal contact, or otherwise in thermal communication, with the transceiver 77 (see FIG. 23A). In particular, the data communication system 71 can include a cage 163 that at least partially surrounds the transceiver 77, and the heat sink 154 can be in contact with the cage 163. The heat sink 154 can include one or more heat dissipation members 156 which can be configured as pins or fins that are oriented along the direction of airflow. The at least one airflow path 158 can further extend across the heat dissipation members 156 of the heat sink 154, such that forced air traveling through the at least one airflow path 158 can remove heat from the transceiver 77. In one example, a first or top transceiver 77 can be mounted to a first or top surface of a substrate 165, which can be configured as a printed circuit board. A second or bottom transceiver 77 can be mounted to a second or bottom surface opposite the first surface of the substrate 165. Each transceiver can be at least partially surrounded by a respective cage 163, and a respective heat sink 154 can be mounted to the respective cage 163, such that the cage 163 is disposed between the heat sink 154 and the substrate 165 along the transverse direction T.

In one example, the thermal management system 141 can include a baffle 144 that at least partially defines the at least one airflow path in combination with at least one wall of the system tray 150. The baffle 144 can be configured to direct airflow through the system tray 150 in a predetermined manner. The baffle can be generally closed with respect to airflow therethrough. In one example, the baffle 144 includes a first or top baffle wall 162*a* and a second or bottom baffle wall 162*b* opposite the first baffle wall 162*a* along the transverse direction T. The first and second baffle walls 162*a* and 162*b* can define a plenum 164 that contains one or more up to all of the substrate 14, the integrated circuit 75, at least one electrical connector 208, a low speed printed circuit board 166. In this regard, it should be appreciated that the substrate 14 can be configured as a high speed printed circuit board, so as to route signals to and from the integrated circuit 75 at high speeds. The low speed printed circuit board 166 of the data communication system 71 can be configured to transmit data at lower speeds to other data communication components that are mounted to the PCB 166. The at least one electrical connector 208 can be configured as the electrical connector 15, the electrical connector 101, the electrical connector 82, or any suitable alternatively constructed low-profile connector.

The at least one electrical connector 208 can be mounted to a respective mounting surface of the substrate 14, as described above. For instance, a first or top plurality of electrical connectors 208 can be mounted to a first or top surface of the substrate 14, such that a respective first or top plurality of electrical cables 100 place respective ones of the first or top plurality of electrical connectors 208 in electrical communication with the first or top transceivers 77. A second or bottom plurality of electrical connectors 208 can be mounted to a second or bottom surface of the substrate 14, such that a respective second or bottom plurality of electrical cables 100 place respective ones of the second or bottom plurality of electrical connectors 208 in electrical communication with the second or bottom transceivers 77. The first plurality of electrical connectors 208 can be arranged along a respective first row that extends along a lateral direction that is perpendicular to each of the longitudinal direction L and the transverse direction T. Similarly, the second plurality of electrical connectors 208 can be arranged along a respective second row that extends along the lateral direction.

A first airflow path 158*a* can be defined between the first baffle wall 162*a* and the first enclosure wall 148*a*. In particular, the first airflow path 158*a* can be defined between an outer surface of the first baffle wall 162*a* and an inner surface of the first enclosure wall 148*a*. At least one or both of the outer surfaces of the first baffle wall 162*a* and the inner surface of the first enclosure wall 148*a* can be polished to reduce frictional forces with the fluid as the fluid flows across the respective surfaces. Further, the outer surface of the first baffle wall 162*a* can define any suitable shape as desired. In one example, the outer surface can have a drag coefficient less than or equal to 0.04 to 1, including any value there between plus/minus 0.01, such as 0.8 and 0.09.

The first airflow path 158*a* can extend across the heat sink 154 of the first transceiver 77, such that forced air traveling through the first airflow path 158*a* can remove heat produced by the first transceiver 77. A second airflow path 158*b* can be defined between the second baffle wall 162*b* and the second enclosure wall 148*b*. In particular, the second airflow path 158*b* can be defined between an outer surface of the second baffle wall 162*b* and an inner surface of the second enclosure wall 148*b*. At least one or both of the outer surfaces of the second baffle wall 162*b* and the inner surface of the second enclosure wall 148*b* can be polished to reduce frictional forces with the fluid as the fluid flows across the respective surfaces. Further, the outer surface of the second baffle wall 162*b* can define any suitable shape as desired. In one example, the outer surface can have a drag coefficient less than or equal to 0.04 to 1, including any value there between plus/minus 0.01, such as 0.8 and 0.09.

Forced air traveling through the second airflow path 158*b* removes heat from the substrate 14. The second airflow path 158*b* can further extend across the heat sink 154 of the second transceiver 77, such that forced air traveling through the second airflow path 158*b* removes heat produced by the second transceiver 77. The heat sink 79 can extend through an aperture 167 of the first baffle wall 162*a* and into the corresponding first airflow path 158*a*. Thus, at least a portion up to an entirety of the heat dissipation members 81 can be disposed in the first airflow path 158*a*. The heat dissipation members 81 can extend toward the respective first enclosure wall 148*a*.

The thermal management system 141 can further include at least one air mover 142 that is in communication with each of the first and second airflow paths 158*a* and 158*b*. The air mover 142 can be housed in an air mover enclosure of the tray enclosure 160. The at least one air mover 142 can be configured to draw or otherwise induce forced air to flow through the enclosure 160 that is bifurcated by the baffle 144. In one example, the at least one air mover 142 can be configured as a fan. The forced air can flow in the first and second airflow paths 158*a* and 158*b* around the baffle 144. The first and second airflow paths can extend generally parallel to each other along the longitudinal direction L. Each airflow path 158*a* and 158*b* can extend between the baffle 144 and opposed top and bottom enclosure walls 148*a* and 148*b*, respectively, of the system tray 150. It should be appreciated that the at least one air mover 142 can be positioned equidistantly between the first and second airflow paths 158*a* and 158*b*.

Alternatively, the at least one air mover can be positioned more in alignment with the first airflow path 158*a*, as the cooling demands in the first airflow path 158 can be greater than those in the second airflow path 158*b*. In particular, as described above, the heat sink 79 of the integrated circuit 75 can extend into the first airflow path 158*a*. Alternatively or additionally, the data communication system 71 can be positioned in the system tray 150 offset with respect to a midline between the first and second enclosure walls 148*a* and 148*b*, such that the first airflow path 158*a* has a greater cross-sectional area than the first airflow path 158*b*.

Further, in some examples, an auxiliary baffle can be positioned in the first airflow path 158*a* that directs the airflow in the first airflow path 158*a* through the heat dissipation members 81. For instance, the auxiliary baffle can be positioned between the heat dissipation members 81 and the first enclosure wall 148*a* to direct forced air through the heat dissipation members 81. In one example, the auxiliary baffle can extend from the heat dissipation members to the first baffle wall 162*a*. The auxiliary baffle can be thermally conductive to assist with heat dissipation from the heat dissipation members 81. Further, the auxiliary baffle can be a compliant structure to absorb forces from the first baffle wall 162*a*, thereby isolating the forces from the heat sink 79. In one example, the auxiliary baffle can be configured as a thermally conductive foam.

Figure 22A:
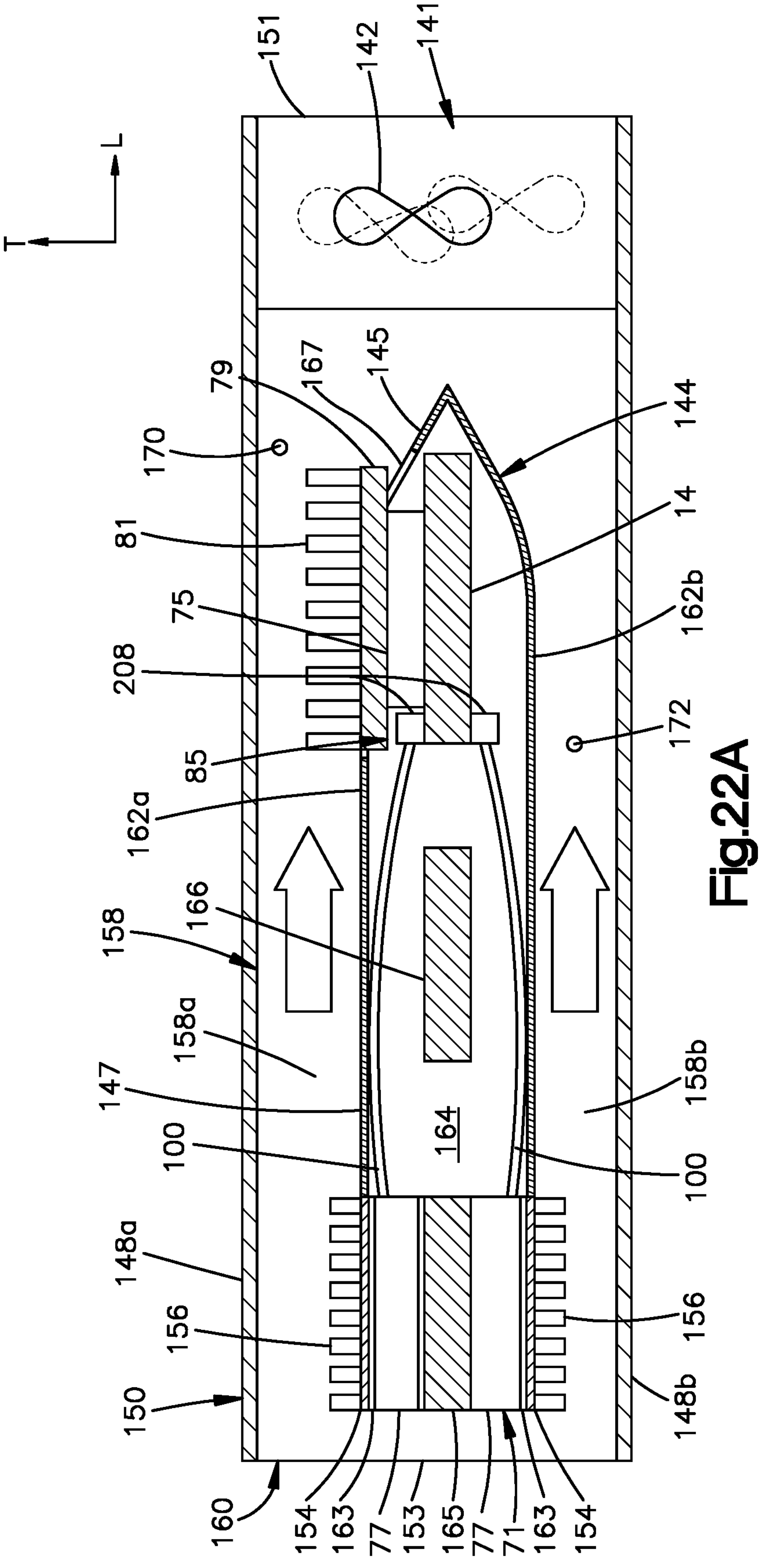
FIG. 22A is a schematic cross-sectional view of a system tray having a baffle that defines airflow channels.
Figure 22B:
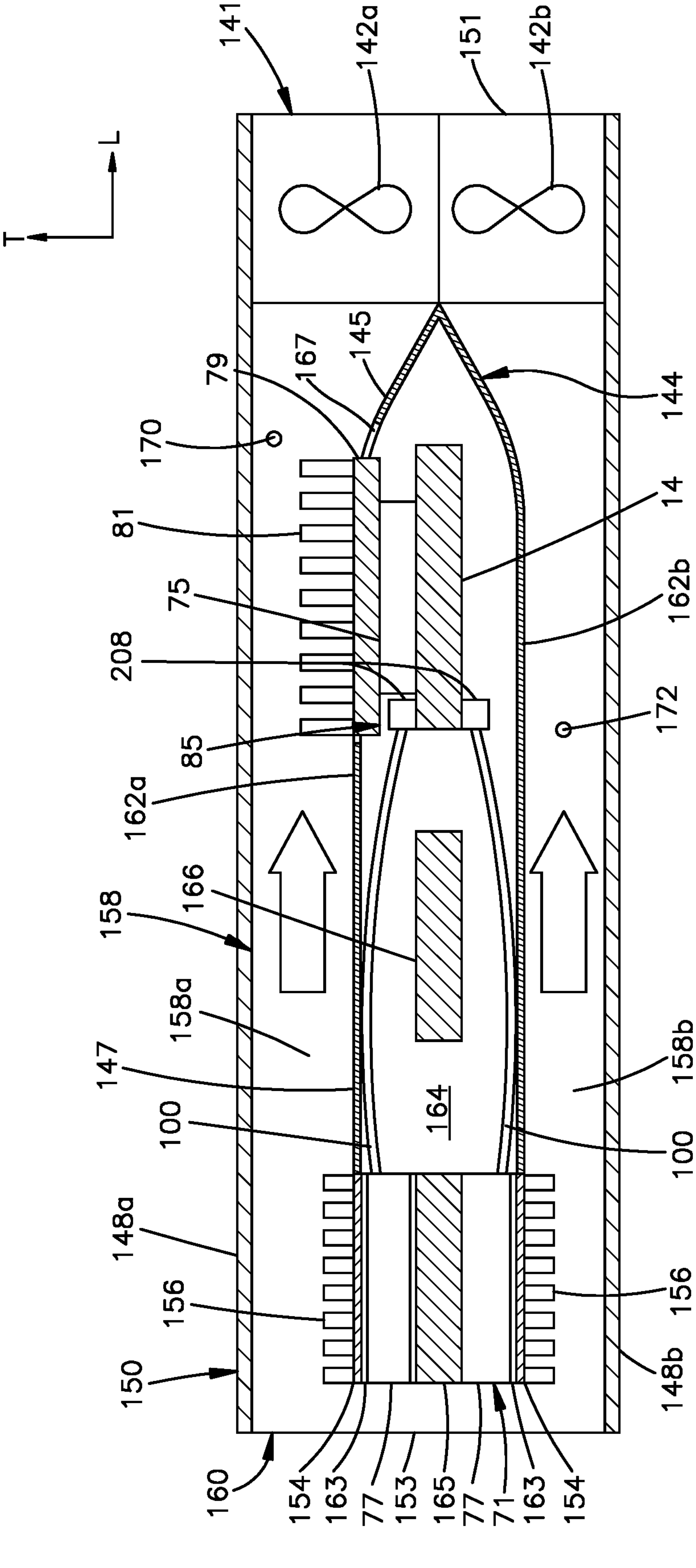
FIG. 22B is a schematic cross-sectional view of the system tray as illustrated in FIG. 22A, but including multiple air movers.

Each of the baffle walls 162_a_ and 162_b_, and thus the baffle 144, can define a first end 145 and a second end 147 opposite the first end 145. The first end 145 can be a tapered end. That is, the first and second baffle walls 162_a_ and 162_b_ can converge toward each other in the direction of airflow of the forced air. The tapered first end can have a shape that is defined by two converging curved lines, each defined be respective ones of the baffle walls 162_a_ and 162_b_. The two converging curved lines can be curved more or less to achieve a desired airflow over and past the tapered end 145. While the first end 145 can be tapered as described above in one example, it should be appreciated that the end 145 can define any suitable alternative shape as desired, so as to adjust the corresponding airflow characteristics as the airflow travels over the first end 145. For instance, the first end 145 can be curved, triangular, rectangular, or can define any suitable alternative shape as desired. As illustrated in FIG. 22A, the end 145 can be spaced from the air mover enclosure along the longitudinal direction L. For instance, the tapered end 145 can be spaced from the air mover enclosure along a direction opposite the direction of airflow through the first and second airflow paths 158_a_ and 158_b_. Alternatively, as illustrated in FIG. 22B, the tapered end 145 can extend to the air mover enclosure. The baffle 144 can be generally closed to moving or forced air. Thus, air is generally unable to flow through the plenum 164 that is defined by the baffle 144.

The second ends 147 of the baffle walls 162_a_ and 162_b_ can abut respective ones of the cages 163 or the transceivers 77 so as to prevent the flow of air into the plenum 164. In this regard, the baffle walls 162_a_ and 162_b_ can be thermally conductive, thereby dissipating heat produced by the transceivers 77, which can be removed as the forced air travels along the baffle walls 162_a_ and 162_b_. Alternatively, the second ends 157 of the baffle walls 162_a_ and 162_b_ can be spaced from the respective ones of the cages 163. It should be appreciated that the baffle walls 162_a_ and 162_b_ can be made of any suitable thermally conductive or nonconductive material as desired.

The at least one air mover 142 can be disposed in a neutral position so as to induce substantially equal volumetric airflow rates through the first and second airflow paths 158_a_ and 158_b_. However, it is recognized that it may be desirable to adjust the volumetric airflow rates of the airflow traveling along the first and second airflow paths 158_a_ and 158_b_ depending on the heat dissipation needs of the data communication system 71. For instance, if it is desired to remove more heat from the first or top components of the data communication system 71 or the second or bottom components of the data communication system 71, the airflow induced by the at least one air mover 142 in the first and second airflow paths 158_a_ and 158_b_ can be adjustable accordingly. For instance, in a first adjusted position, the air mover 142 is more aligned with the first airflow path 158_a_ than the second airflow path 158_b_. Thus, the air mover 142 in the first adjusted position induces greater airflow in the first airflow path 158 than in the second airflow path 158_b_. Alternatively, if it is desired to remove more heat from the second or bottom components of the data communication system 71 as opposed to the first or top components of the data communication system 71, the air mover 142 can move to a second adjusted position that is more aligned with the second airflow path 158_b_ than the first airflow path 158_a_. Thus, the air mover 142 in the first adjusted position induces greater airflow in the first airflow path 158_a_ than in the second airflow path 158_b_. The air mover 142 can be movable in a first direction toward the first position, and a second direction toward the second position. The first and second positions can be opposite each other. Further, the air mover can be positioned anywhere between and including the first and second positions so as to control the ratio of the volumetric air flow between the first and second air flow paths.

The first and second positions can be angulated positions of the at least one air mover 142. That is, the at least one air mover 142 can angulate between the first and second adjusted positions. Alternatively or additionally, the first and second positions can be translated positions of the at least one air mover 142. That is, the at least one air mover 142 can translate between the first and second adjusted positions.

Thus, the data communication system 71 can include at least one temperature sensor that is configured to output an indication of the temperature in the enclosure 160. For instance, at least one first temperature sensor 170 can output an indication of the temperature in the first airflow path 158_a_, of a corresponding at least one of the components of the data communication system in thermal communication with the first airflow path 158_a_, or both. Examples of components of the data communication system 71 in thermal communication with the first airflow path 158_a_ can include the first transceiver 77, the first plurality of electrical connectors 208, the integrated circuit 75, or combinations thereof. The data communication system can further include at least one second temperature sensor 172 that is configured to output an indication of the temperature in the second airflow path 158_b_, of a corresponding at least one of the components of the data communication system 71 in thermal communication with the second airflow path 158_b_, or both. Examples of components of the data communication system 71 in thermal communication with the second airflow path 158_b_ can include the second transceiver 77, the second plurality of electrical connectors 208, the substrate 14, or combinations thereof.

The data communication system 71 can further include a controller that is in communication with the at least one temperature sensor in the enclosure. The controller can be configured to receive an output from the at least one temperature sensor and adjust a volumetric flow rate of the airflow through at least one of the first and second airflow paths based on the output from the at least one temperature sensor. The at least one temperature sensor can include the at least one first temperature sensor 170 and the at least one second temperature sensor 172. The controller is configured to modulate a volumetric flow rate of the airflow through the first and second airflow paths depending on an output from the at least one temperature sensor 172. The data communication system 71 can further include at least one actuator that is in communication with the controller, and configured to urge the corresponding at least one actuator to move between the neutral position, the first adjusted position, and the second adjusted position. When the controller receives inputs from either of the first and second temperature sensors that a sensed temperature is above a first predetermined threshold, the controller can cause the actuator to move the actuator to one of the first and second adjusted positions accordingly. If the controller receives inputs from the first and second temperature sensors that all of the sensed temperatures are below a second predetermined threshold, the controller can reduce the speed of the air mover 142, for instance if the air mover 142 includes a variable speed drive. In this regard, the data communication system 71 can produce energy savings while maintaining the electrical components at desired operating temperatures. The second predetermined threshold can be less than the first predetermined threshold. Alternatively, the second predetermined threshold can be equal to the first predetermined threshold.

Alternatively or additionally, referring to FIG. 22B, the at least one air mover 142 can include first and second air movers 142*a* and 142*b*. The first air mover 142*a* can be aligned with the first airflow path 158*a*, and the second air mover 142*b* can be aligned with the second airflow path 158*b*. The first and second air movers 142*a* and 142*b* can be independently modulated so as to independently control the volumetric airflow rate in each of the first and second airflow paths 158*a* and 158*b*, respectively. Thus, when the sensed temperature from the first temperature sensor 170 is above a respective first predetermined threshold, the speed of the first air mover 142*a* can be increased, thereby increasing the volumetric flow rate of the airflow in the first airflow path 158*a*. Conversely, when the when the sensed temperature from the first temperature sensor 170 is below the respective first predetermined threshold, the speed of the first air mover 142*a* can be decreased, thereby decreasing the volumetric flow rate of the airflow in the first airflow path 158*a*. Similarly, when the sensed temperature from the second temperature sensor 172 is above a respective first predetermined threshold, the speed of the second air mover 142*b* can be increased, thereby increasing the volumetric flow rate of the airflow in the second airflow path 158*b*. Conversely, when the when the sensed temperature from the second temperature sensor 172 is below the respective second predetermined threshold, the speed of the second air mover 142*b* can be decreased, decreasing the volumetric flow rate of the airflow in the second airflow path 158*b*. In alternative embodiments, the temperature sensors may be integrated into transceivers 77, which are cooled by air flow path 158*a* and 158*b*. It should be appreciated that the temperature thresholds described herein can define specific temperatures or temperature ranges as desired.

Figure 22C:
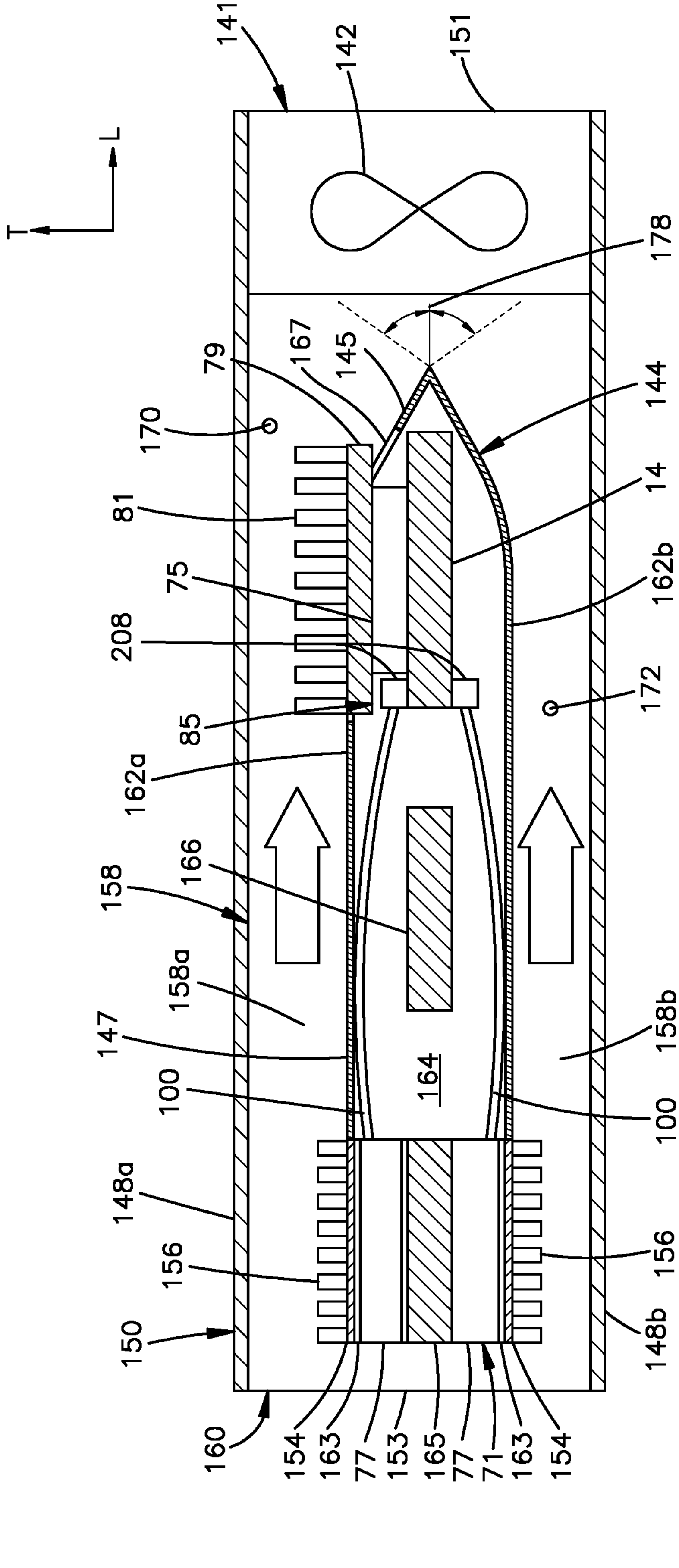
FIG. 22C is a schematic cross-sectional view of the system tray as illustrated in FIG. 22A, but including a movable baffle.

Alternatively or additionally still, referring now to FIG. 22C, the baffle 144 can include a front baffle arm 178 that can be positionally adjustable so as to selectively alter the airflow characteristics in the first and second airflow paths 158*a* and 158*b*. For instance, the front baffle arm 178 can be movable between a first adjusted position and a second adjusted position. In one example, the front baffle arm 178 can be angularly adjustable between the first and second adjusted positions. Thus, the front baffle arm 178 can move in a first direction toward the first position, and a second direction toward the second position. The first and second directions of the front baffle arm 178 can be opposite each other. It should be appreciated that the front baffle arm can be positioned at any location between and including the first and second positions as desired, thereby controlling the ratio of the volumetric air flow between the first and second air flow paths.

When the adjustable baffle arm 178 is in the first position, the baffle arm 178 can define a necked-down region in the second airflow path 158*b*. Alternatively or additionally, when the adjustable baffle arm 178 is in the first position, the baffle arm 178 can induce turbulence in the airflow of the second airflow path 158*b*. Thus, a majority of the airflow induced by the air mover 142 will flow through the first airflow path 158*a* when the baffle arm 178 is in the first position. When the temperature in the first airflow path 158*a* is above a respective first predetermined threshold, the adjustable baffle arm 178 can be moved to the first position.

When the adjustable baffle arm 178 is in the second position, the baffle arm 178 can define a necked-down region in the first airflow path 158*a*. Alternatively or additionally, when the adjustable baffle arm 178 is in the second position, the baffle arm 178 can induce turbulence in the airflow of the first airflow path 158*a*. Thus, a majority of the airflow induced by the air mover 142 will flow through the second airflow path 158*b* when the baffle arm 178 is in the second position. When the temperature in the second airflow path 158*b* is above a respective second predetermined threshold, the adjustable baffle arm 178 can be moved to the second position. The adjustable baffle arm 178 can be in a neutral position between the first and second positions, whereby the baffle arm 178 does not affect either of the first and second airflow paths 158*a* and 158*b* relative to the other of the first and second airflow paths 158*a* and 158*b*.

It should be appreciated that while the data communication system 71 has been described as including various examples of systems and methods that are configured to modulate the volumetric airflow rates in the first and second airflow paths 158*a* and 158*b*, the described systems ad methods are not exhaustive. It is recognized, however, that the systems and methods can include any suitable alternative system or method for modulating the volumetric airflow rates through one or both of the airflow paths 158*a* and 158*b*.

Referring now to FIGS. 22D-23D, the data communication system 71 can include a cable management system 180 that can be configured to route the electrical cables 100 from the respective electrical connector 208 to the transceiver 77 as desired. It should be appreciated, of course, that the electrical cables 100 can alternatively be configured as optical cables. In this regard, the cables can be referred to as data communication cables 181 that can be configured as the electrical cables 100 or as optical cables. Further, the cable management system 180 can route the cables from any suitable first data communication device 182 to any suitable second data communication device 183. The first and second data communication devices 182 and 183, respectively, can be configured as electrical connectors, optical transceivers, electrical transceivers, any suitable alternative data communication device, or combinations thereof. For instance, the first data communication devices 182 can be configured as the electrical connectors 208, and the second data communication devices can be configured as the transceivers 77.

Figure 23B:
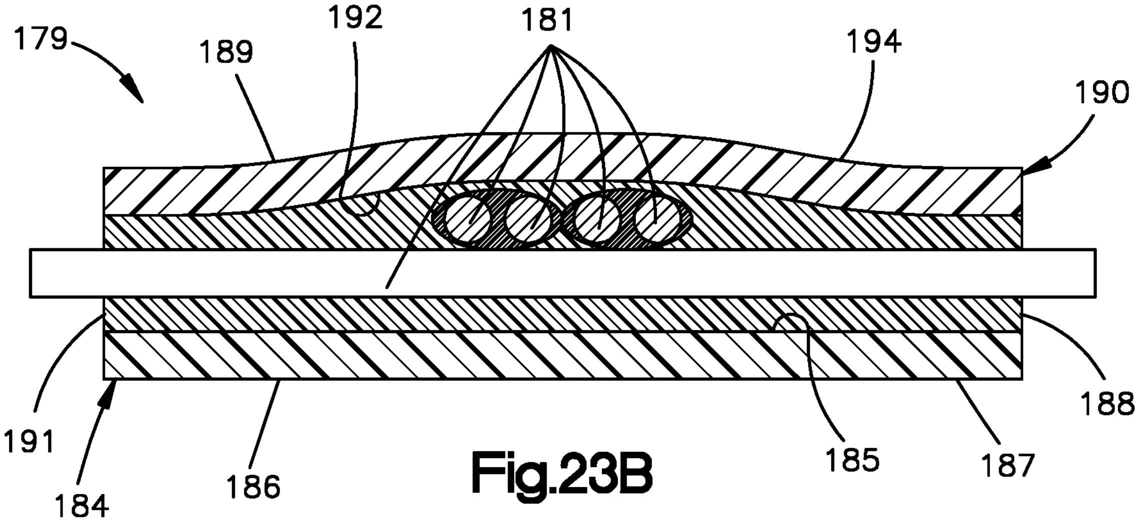
FIG. 23B is a schematic cross-sectional view of the cable routing laminate illustrated in FIG. 23A.

Referring now to FIG. 23A-23B in particular, the cable management system 180 in one example can be configured as at least one cable management laminate 179 that includes a first substrate 184 having a first attachment surface 185 and a second outer surface 186 opposite the first attachment surface 185. The laminate 179 can further include an adhesive 188 that is applied to the attachment surface 185 of the substrate 184. Alternatively, the adhesive can be applied to the cables 181. The adhesive 188 can be a curable adhesive. The first substrate 184 can be any suitable substrate that has adequate bonding properties with the adhesive. In one example, the first substrate 184 can be flexible. The first substrate 184 can be a fabric, such as a mesh fabric, or any suitable alternative material as desired. For instance, the first substrate 184 can alternatively be configured as a polyimide sheet, such as Kapton®. The curable adhesive 188 can be an epoxy or the like.

The data communication cables 181 can be routed along a predetermined path between the first and second data communication devices 182 and 183, respectively, and placed in the uncured adhesive 188. The adhesive can then be allowed to cure, thereby fixing the position of the data communication cables 181 that extend through the adhesive 188. In this regard, the adhesive is configured to adhere to both the first and second substrates 184 and 192, and can further adhere to an outermost dielectric insulator of the data communication cables 81. The data communication cables

181 that extend through the adhesive 188 are thereby positionally fixed with respect to each other. Advantageously, the data communication cables 181 can be routed as desired and then permanently fixed in the laminate 179. The cured adhesive 188 prevents a user from unintentionally removing or repositioning the data communication cables 181, as the cured adhesive 188 is bonded to both the first substrate 184 and the data communication cables 181. The data communication cables 181 extending through the adhesive 188 can be spaced from each other as desired. Alternatively, the data communication cables 181 can intersect each other in the adhesive 188.

The second outer surface 186 of the substrate 184 can define a first outer surface 187 of the laminate 179. Accordingly, the first outer surface 187 of the laminate 179 can be flexible before the adhesive is cured. The first outer surface 187 of the laminate 179 can be rigid after the adhesive 188 has cured. It should be appreciated, of course, that the laminate 179 can be flexible or rigid before curing, and flexible or rigid after curing depending on the desired end application. In this regard, the cured adhesive 188 can be rigid after it has been cured. Alternatively, the adhesive 188 can be flexible after it has been cured. The cured adhesive 188 can at least partially define a second outer surface 189 of the laminate 179 that is opposite the first surface. In one example illustrated in FIG. 23D, the data communication cables 181 that extend through the adhesive 188 can be entirely embedded in the adhesive 188, such that the adhesive 188 can define an entirety of the second outer surface 189 of the laminate. Alternatively, in another example, a first portion of the outer perimeter of at least one of the data communication cables 181 can be embedded in the adhesive, and a second portion of the outer perimeter of at least one of the data communication cables 181 can extend out from the adhesive, such that the adhesive and the second portion of the at least one of the data communication cables 181 can define the second outer surface 189 of the laminate 179.

Alternatively, referring to FIGS. 23A-23B, the laminate can further include a second substrate 190 having a respective first attachment surface 192 and a respective second outer surface 194 opposite the respective first attachment surface 192. As described above with respect to the first substrate 184, the second substrate 190 can be a fabric, such as a mesh fabric, or any suitable alternatively material as desired. For instance, the second substrate 190 can be configured as a polyimide sheet such as Kapton®. The first attachment surface 192 of the second substrate 190 can bond with the adhesive 188, thereby capturing the adhesive 188 and the adhered electrical cables between the first and second substrates 184 and 190. Thus, the laminate 179 can include at least one substrate. The at least one substrate can include the first substrate 184. Additionally, the at least one substrate can include the second substrate 190.

Figure 23C:
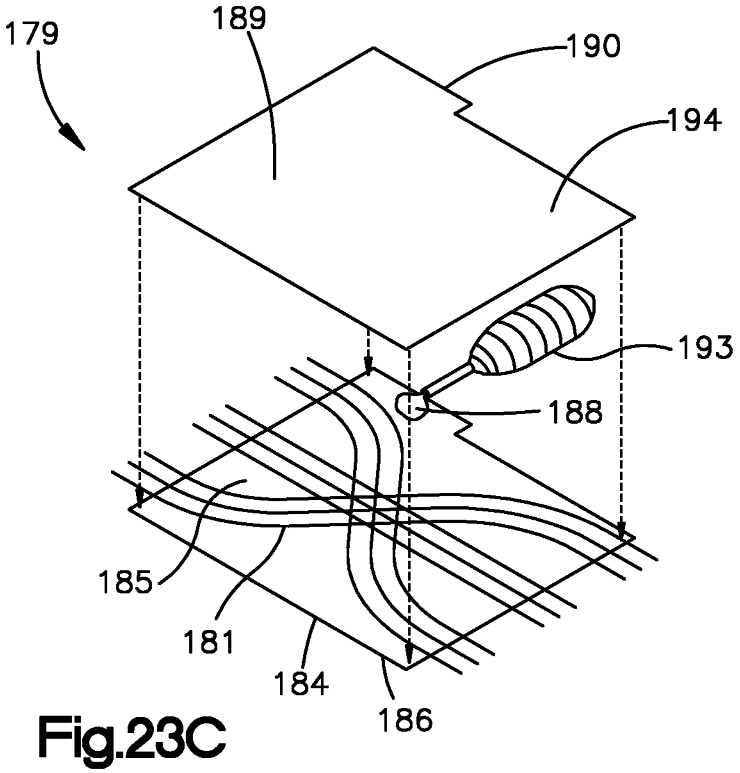
FIG. 23C is an exploded perspective view of the cable routing laminate illustrated in FIG. 23A.
Figure 23D:
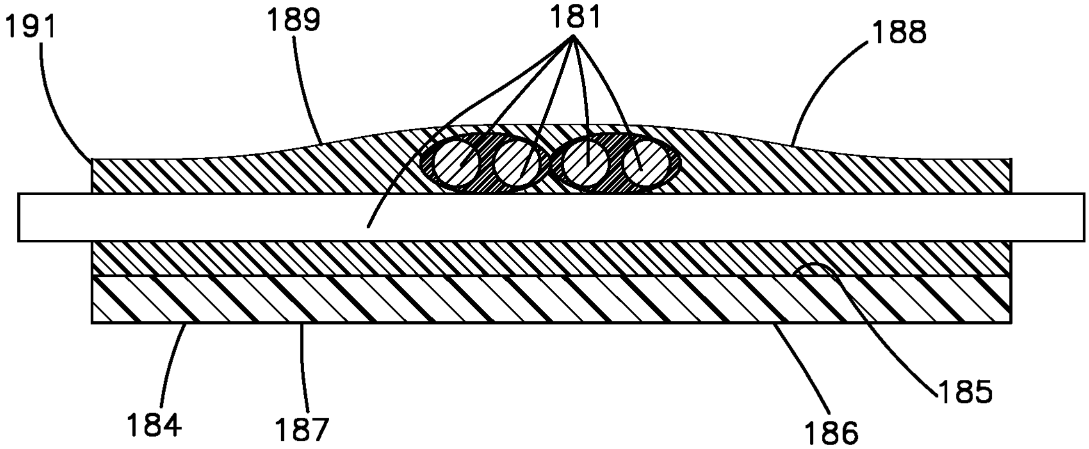
FIG. 23D is a schematic cross-sectional view of the cable routing laminate illustrated similar to FIG. 23B, but showing the cable routing laminate constructed in accordance with an alternative embodiment.

Referring now to FIG. 23C, a method for preparing the laminate 179 can include a first step of planning a geometry of the at least one substrate, identifying the locations of the first and second data communication devices 182 and 183, respectively, and routing of the data communication cables 181 therebetween. For instance, a stock substrate material can be cut to define a desired size and shape of the at least one substrate. It should be appreciated that a plurality of first substrates 184, and additionally second substrates 192 as desired, can be cut from one or more stock substrate materials.

Next, the first substrate 184 can be positioned on a support surface, such that the first attachment surface 185 is exposed. In this regard, it should be appreciated that the first attachment surface 185 and the second outer surface 186 can be monolithic with each other, and thus made of the same material. Thus, the first attachment surface 185 can be defined by whichever of the surfaces of the first substrate 184 is exposed. Alternatively, the first attachment surface 185 can be pretreated with a bonding agent that can increase the adherence to the adhesive 188.

Next, a first portion of a layer 191 of uncured adhesive 188 can be applied to the first attachment surface 185 of the first substrate 184. For instance, the uncured adhesive 188 can be expelled from a dispenser 193 onto the first substrate 184. Next, the cables 181 can be routed onto the first substrate 184 along respective routing paths. Thus, the cables can be at least partially embedded in the first layer of adhesive 188 as they extend along the first substrate 184. The cables 181 can be routed manually or with a cable routing machine. Next, a second portion of the layer 191 of uncured adhesive 188 can be applied to the cables 181 so as to embed a greater portion of the cables 181, which can include a portion up to an entirety of the outer perimeter of the cables 181. Alternatively, a single application of adhesive 188 can be applied before or after the cables 181 are placed along the first substrate 184 on their respective routing paths.

Next, the adhesive 188 can be allowed to cure, thereby defining the laminate 179. Alternatively, the second substrate 190 can be applied to the adhesive 188 prior to the curing step. In particular, the first attachment surface 192 of the second substrate 190 can engage against the adhesive 188. In this regard, it should be appreciated that the first attachment surface 192 and the second outer surface 194 can be monolithic with each other, and thus made of the same material. Thus, the first attachment surface 192 can be defined by whichever of the surfaces of the second substrate 194 is placed against the adhesive 188. Alternatively, the first attachment surface 192 can be pretreated with a bonding agent that can increase the adherence to the adhesive 188. Thus, it should be appreciated that the same adhesive 188 that bonds to the first substrate 184 also bonds to the second substrate 190.

Next, the adhesive 188 can be allowed to cure, thereby solidifying the adhesive 188 around at least a portion of the cables 181 and fixing the cables 181 in place, and also bonding the first and second substrates to each other. In one example, the assembly of the first and second substrates 184 and 190, adhesive 188, and cables can be laminated in a vacuum, thereby removing air bubbles before the adhesive cures 188. In this regard, if one or both of the first and second substrates 184 and 190 is a mesh fabric, the porosity of the mesh fabric can allow air to escape therethrough, assisting in the removal of air bubbles. The adhesive 188 can be allowed to cure. Next, the opposed first and second ends of the cables 181 can be prepared for termination, such that the respective signal conductors and drain wire, if applicable, are exposed and configured to be attached to the first and second data communication devices 182 and 183, respectively. Finally, the first ends of each cable 181 can be attached to a respective first one of the first and second data communication devices 182 and 183, and the second end of each cable 181 can be attached to a respective second one of the first and second data communication devices 182 and 183.

It should be appreciated that the cables 181 can be bent both in-plane with respect to the at least one substrate and out of plane with respect to the at least one substrate when the cables 181 are routed. The flexibility of the at least one substrate before the adhesive has cured can allow the at least one substrate to conform to the bent cables 181 that are routed according to their desired routing path. Once the adhesive 188 has cured, the laminate 179 can have the structural rigidity of a rigid or flexible printed circuit board, but can also have the signal performance of the cables 181. The rigid at least one substrate can have a predetermined shape that corresponds to the respective routing paths of the cables 181. The routing paths of the cables 181 can be the same as each other or different than each other. For instance, the cables 181 can extend parallel with each other through the laminate 179 along a common routing path. Alternatively, the cables 181 can extend in different directions so as to define respective different routing paths. Further, the routing paths cables 181 can be individually adjustable through the laminate 179 prior to curing of the adhesive. In on example, one or more of the cables 181 can cross over one or more others of the cables 181 in the laminate 179 as the cables extend along their respective routing paths. In examples where the laminate 179 is rigid, the routing paths of the respective cables 181 can be fixed. In examples where the laminate is flexible, the routing paths of the respective cables can be fixed with respect to either or both of the substrates 184 and 192. Thus, a routing path as described herein can be fixed when the laminate 179 is rigid, such that the cables are not movable in the laminate 179. A routing path as described herein can also be fixed when the laminate is flexible, and the routing path is fixed with respect to either or both of the first and second substrates 184 and 190. In some example, when the laminate 179 is flexible after the adhesive 188 has cured, the laminate 179 can be bendable such that the routing paths of at least one or more of the cables 181 is constant relative to the routing path of at least one or more other ones of the cables. Further, respective middle portions of the cables 181 can extend through the laminate 179, such that opposed lengths of the cables 181 extend from the laminate toward the respective communication devices that electrically connect with their opposed respective terminations. Alternatively, the laminate 179 can extend to one or both of the communication devices that electrically connect with the opposed respective terminations of the cables 181.

Figure 22D:
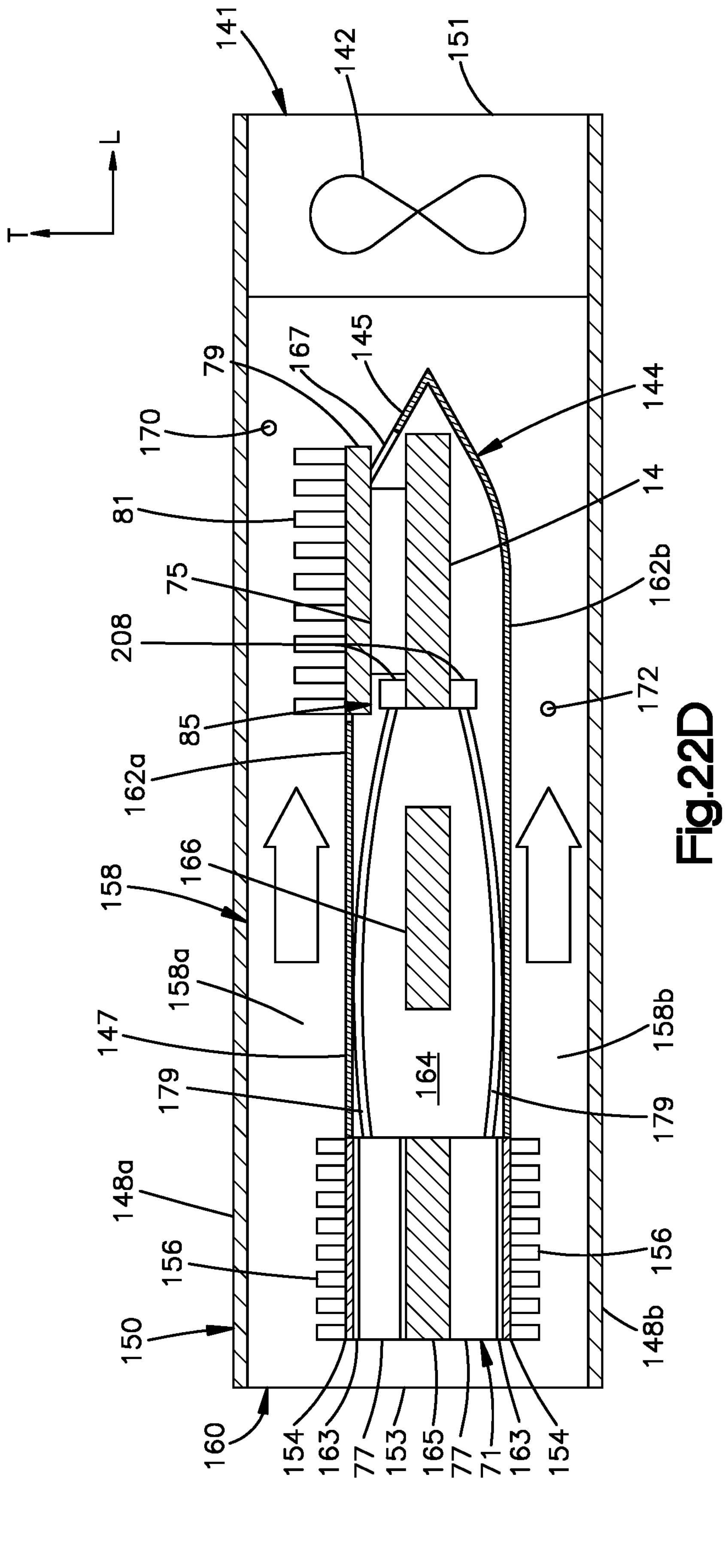
FIG. 22D is a schematic cross-sectional view the system tray as illustrated in FIG. 22A, but including a cable routing laminate.

As illustrated in FIG. 22D, the laminate 179 can be advantageously positioned in the system tray 150 so as to minimize disruptions of the airflow. Loose cables 181, on the other hand, can migrate during use, and are otherwise difficult to organize to minimize airflow disruptions. While printed circuit boards can possess structural rigidity and thereby provide adequate routing of electrical signals along corresponding electrical traces, they tend to suffer from signal degradation, particularly at high data transfer speeds. In one example, the electrical signals can be transferred at data transfer speeds of up to and is some cases exceeding 50 gigabits per second.

It should be appreciated that the laminate 179 can include any number of substrates as desired that are stacked on top of each other and attached to each other by an adhesive, wherein at least one data communication cable 181 is routed through the adhesive in the manner described above. Further, it should be appreciated that a plurality of laminates can be arranged in series with each other. Thus, the laminates can extend along different respective lengths of at least one cable 181. The laminates 179 arranged in series with each other can define air gaps therebetween. Thus, the at least one cable 181 can be routed through a plurality of different laminates 179 in the manner described above. The at least one data communication cable 181 can include a plurality of data communication cables 181 in the manner described above.

Figure 22E:
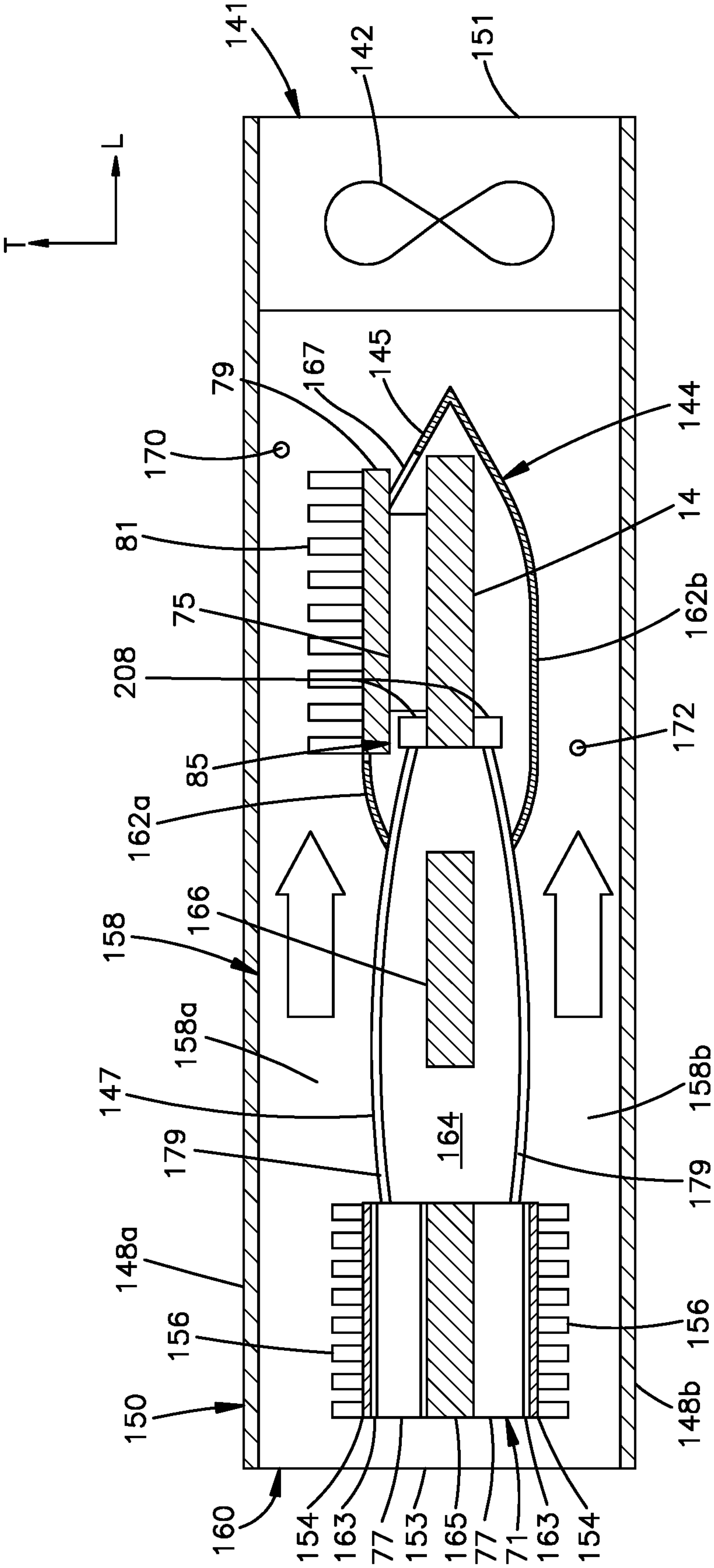
FIG. 22E is a schematic cross-sectional view of the system tray as illustrated in FIG. 22F, wherein the baffle is constructed in accordance with an alternative embodiment.

Referring now to FIG. 22E, it is recognized that the structurally rigid laminate 179 can also be aligned with one of the first and second baffle walls 162*a* and 162*b*. For instance, a first laminate 179 can be substantially aligned with the first baffle wall 162*a* along the longitudinal direction L. A second laminate 179 can be substantially aligned with the second baffle wall 162*b* along the longitudinal direction L. Thus, respective portions of the baffle walls 162*a* and 162*b* can be removed and replaced by the laminates 179, such that the laminates 179 are substantially inline with the baffle walls 162*a* and 162*b*. Further, the at least one substrate of the laminates 179 can be bent so as to conform with the curvature of the baffle walls. It should thus be appreciated that the forced fluid, such as forced air, can flow over at least one of the outer surfaces of the laminate 179, which can be rigid of flexible as described above. Further, the at least one of the outer surfaces of the laminate 179 can be polished to reduce frictional forces with the fluid as the fluid flows across the at least one outer surface. Further, the at least one of the outer surfaces of the laminate 179 can define an external shape that has a drag coefficient less than or equal to 0.04 to 1, including any value there between plus/minus 0.01, such as 0.8 and 0.09. Further, the laminate 179, either alone or in combination with other laminates 179, can define a tapered and as described above with respect to the first end 145 of the baffle 144.

Figure 24:
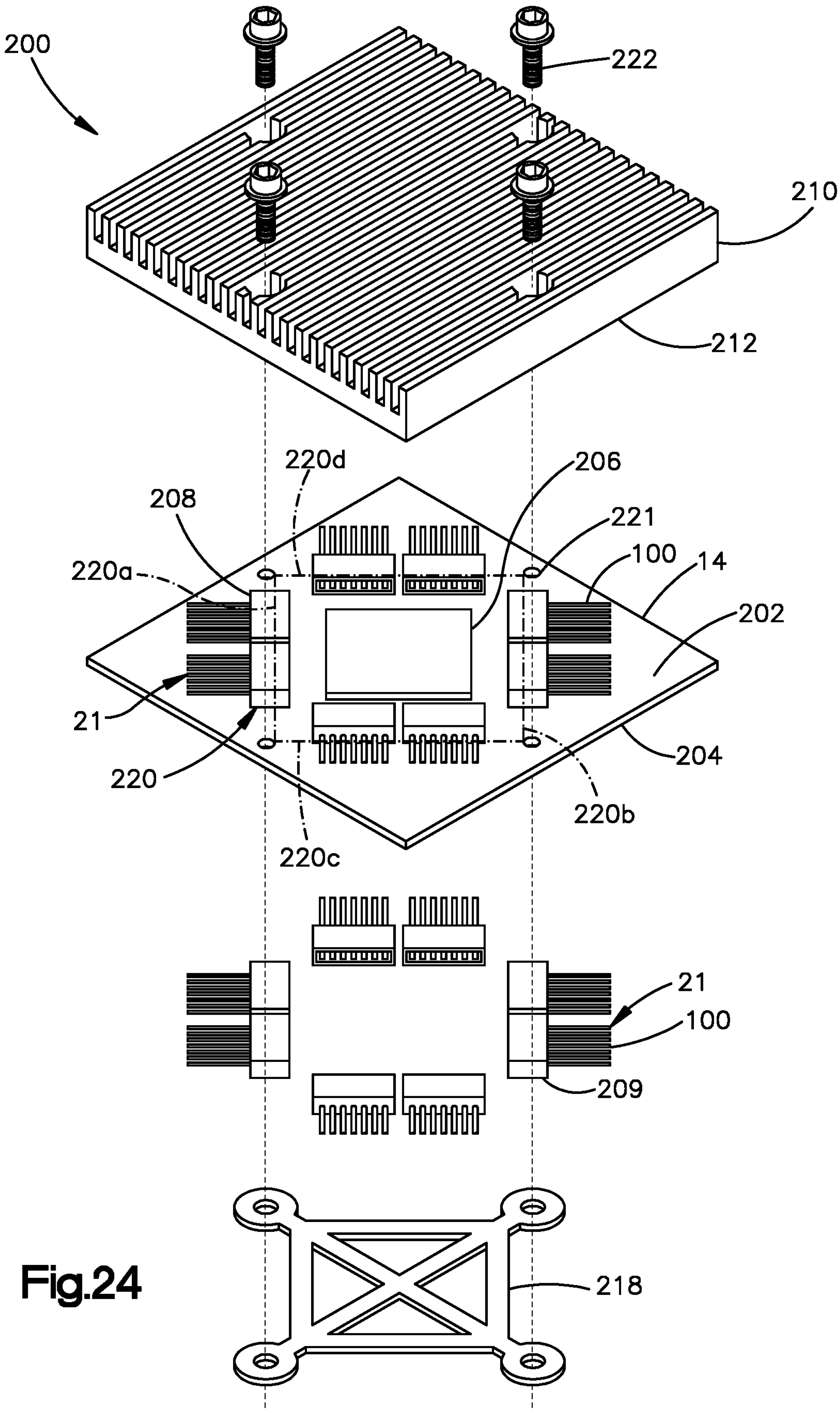
FIG. 24 is an exploded perspective view of an electrical component including a substrate, a plurality of electrical connectors and an integrated circuit mounted to the substrate, a heat sink configured to be placed in thermal communication with the integrated circuit, and a connection bracket.
Figure 25:
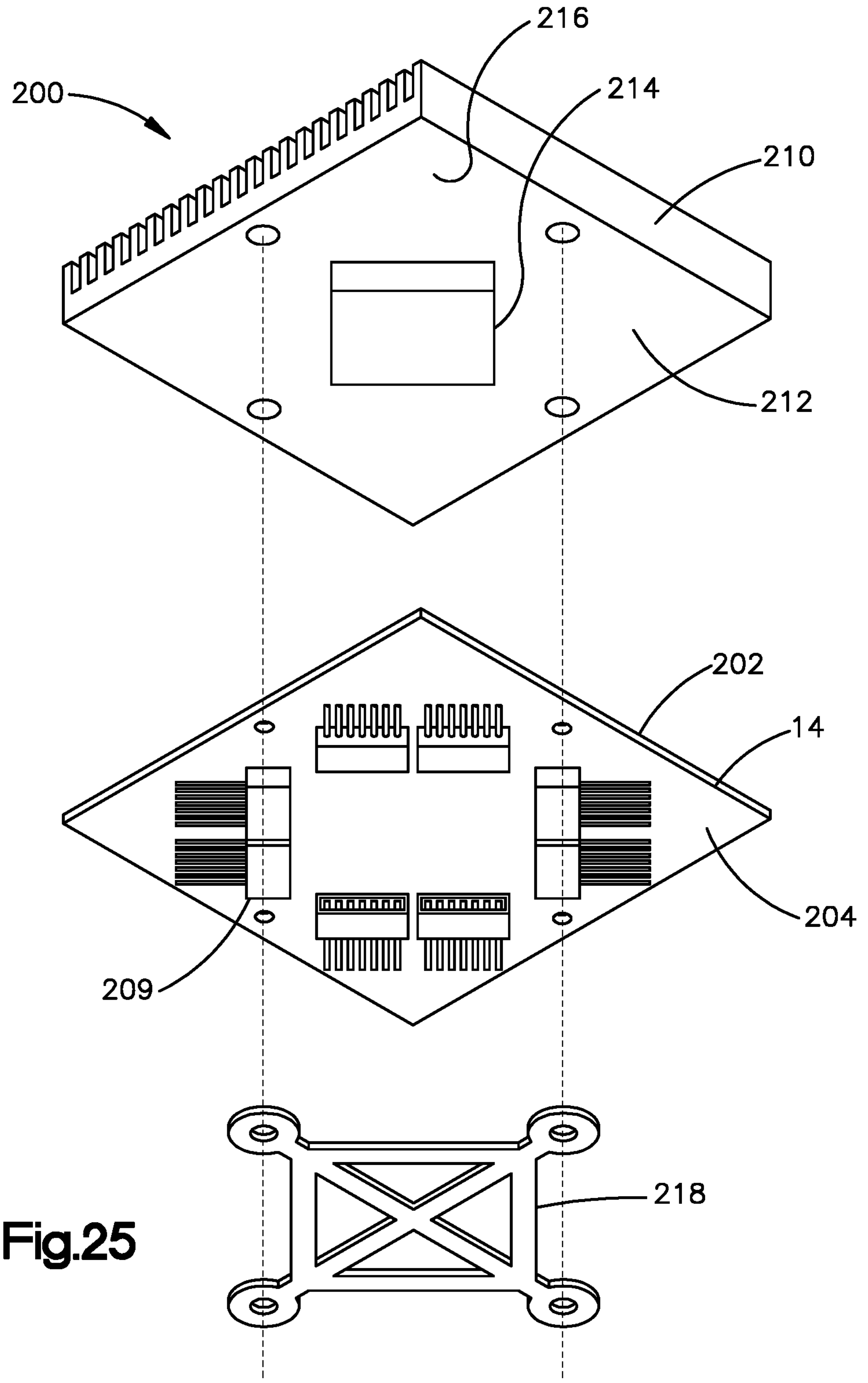
FIG. 25 is another exploded perspective view of the electrical component illustrated in FIG. 24.
Figure 26:
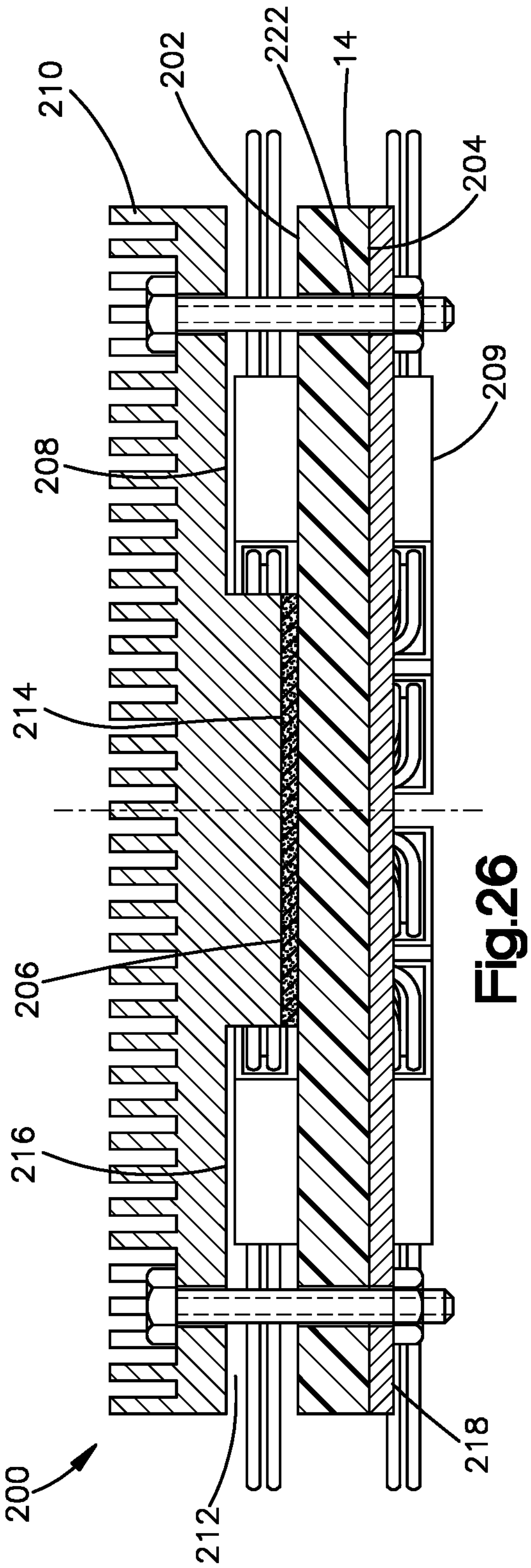
FIG. 26 is a sectional side elevation view of the electrical component illustrated in FIG. 24.

Referring now to FIGS. 24-26, an electrical component 200 of the data communication system 71 can include the substrate 14 that can be configured as a printed circuit board. The substrate 14 has a first surface 202 and a second surface 204, wherein the first surface is opposite the second surface in a select direction. The electrical component can further include a heat-producing electrical device mounted to the substrate 14. The electrical device can be configured as an integrated circuit 206 that is mounted to the substrate 14. In one example, the integrated circuit 206 can be configured as an ASIC that is mounted to the first surface 202 of the substrate 14. The electrical component 200 can further include the plurality of electrical connectors 208 that are mounted to the substrate 14 and in electrical communication with the integrated circuit 206. In particular the electrical connectors can be mounted to the first surface 202 of the substrate 14.

The electrical connectors 208 can be configured as cable connector assemblies 21. Thus, the electrical connectors 208 can include an electrically insulative connector housing, and a plurality of electrical contacts supported by the connector housing. The electrical contacts can be placed in electrical communication with the integrated circuit 206. The electrical contacts can further be placed in electrical communication with at least one electrical cable in any suitable manner as desired, including any manner described herein, such as a plurality of electrical cables that extend out from the connector housing. The electrical connectors 208 can be mounted to the first surface 202 of the substrate 14. The electrical connectors 208 can further be arranged so as to surround that integrated circuit 206 along a plane that is oriented normal to the select direction. In one example, the electrical connectors 208 can be configured identical to each other. It should be appreciated, of course, that the electrical connectors 208 can be alternatively configured in accordance with any suitable embodiment as desired.

When the electrical connectors 208 are mounted to the first surface 202 of the substrate 14, the electrical connectors 208 can be arranged in a plurality of rows 220. Some of the rows 220 can intersect one or more others of the rows 220. The rows 220 can be linear along a direction that is perpendicular to the select direction. Alternatively, the rows 220 can be curved along a plane that is perpendicular to the select direction. The rows 220 can include a first row 220*a* and a second row 220*b* that are opposite each other along a first direction that is perpendicular to the select direction. The rows 220 can further include a third row 220*c* and a fourth row 220*d* that are opposite each other along a second direction that is perpendicular to each of the select direction and the first direction.

The rows 220*a*-220*d* can be arranged along respective lines that intersect the lines of respective others of the rows at respective intersections 221. For instance, the line defined by the first row 220*a* can intersect the lines defined by the third and fourth rows 220*c-d*. The line defined by the second row 220*b* can also intersect the lines defined by the third and fourth rows 220*c-d*. The line defined by the third row 220*c* can intersect the lines defined by the first and second rows 220*a-b*. Similarly, the line defined by the fourth row 220*cd* can intersect the lines defined by the first and second rows 220*a-b*. The integrated circuit 206 can be centrally disposed with respect to the rows 220 (and thus the lines that are defined by the rows 220) in a respective plane that is perpendicular to the select direction. The lines can define any suitable geometric shape as desired. For instance, in one example, the lines can define a square.

The electrical component 200 can further include a second plurality of electrical connectors 209 that are mounted to the second surface 204 of the substrate 14. The second plurality of electrical connectors 209 can be configured as the electrical connector 15, the electrical connector 101, the electrical connector 82, or any suitably constructed low-profile connector. The second plurality of electrical connectors 209 can be in electrical communication with the integrated circuit 206 in the manner described above with respect to the electrical connectors 208. The electrical connectors 208 can be referred to as a first plurality of electrical connectors. The second electrical connectors 209 can be constructed identical to each other and to the electrical connectors 208. Thus, the second electrical connectors 209 can be configured as electrical cable connectors. The second electrical connectors 209 can be mounted to the second surface 204 of the substrate 14. Further, the electrical connectors 208 can be aligned with respective ones of the second electrical connectors 209 along the select direction. It should be appreciated, of course, that the electrical connectors 208 can be alternatively configured in accordance with any suitable embodiment as desired.

It is recognized that the integrated circuit 206 can generate heat during operation, and that it can be desirable to dissipate the generated heat from the electrical component 200. Thus, the electrical component 200 can include a heat sink 210 that is configured to be placed in thermal communication with the integrated circuit 206 so as to dissipate heat from the electrical component. The heat sink 210 can comprise any suitable thermally conductive material. For instance, the heat sink 210 can be metallic. Further, the heat sink 210 can include a plurality of fins that project outward in the select direction. In one example, the heat sink 210 can be placed in conductive thermal communication with the integrated circuit 206. For instance, the heat sink 210 can be placed in physical contact with the integrated circuit 206. Alternatively, the heat sink 210 can be placed in conductive thermal communication with the integrated circuit 206 through an intermediate structure that is disposed between the integrated circuit 206 and the heat sink 210 in the select direction.

In one example, the heat sink 210 can define a surface 212 that faces an opposed direction that is opposite the first direction. Thus, the surface 212 can face one or both of the substrate 14 and the integrated circuit 206. The heat sink 210 can define a first region 214 that is configured to be placed in thermal communication with the integrated circuit 206, and a second region 216 that is both offset from the first region 214 along a direction perpendicular to the select direction, and recessed from the first region 214 in the select direction. Respective portions of the surface 212 can be defined by both the first region 214 and the second region 216. In particular, the first region 214 can transfer heat from the integrated circuit 206 to the heat sink 210 by way of thermal conduction. The first region 214 can be configured to transfer heat by way of thermal conduction from a surface of the integrated circuit 206 that faces the select direction. In one example, the first region 214 can be configured to physically contact the surface of the integrated circuit 206. Alternatively, the first region 214 can be configured to physically contact an intermediate structure that, in turn, physically contacts the integrated circuit 206. The surface 212 at each of the first and second regions 214 and 216, respectively, can be substantially planar. For instance, the surface 212 at each of the first and second regions 214 and 216, respectively, can be oriented along respective planes that are substantially perpendicular to the select direction. The plane defined by the surface 212 at the second region 216 can be offset with respect to the plane defined by the surface 212 at the first region 214 in the select direction. The term "substantially" as used herein can reflect manufacturing tolerances, otherwise reflect measurements within 10%, or both.

The second region 216 of the heat sink 210 can be spaced from the first surface 202 of the substrate 14 in the select direction when the first region 214 is in thermal communication with the integrated circuit 206. For instance, in one example, the second region 216 can rest against at least one or more of the electrical connectors 208. Alternatively, the second region 216 can be spaced from the electrical connectors 208 in the select direction. In one example, as described in more detail below, the second region 216 can define channels that receive respective ones of the electrical connectors 208. For instance, the channels can receive respective rows of the electrical connectors 208. The second region 216 can continuously surround an entirety of an outer perimeter of the first region 214 with respect to a plane that is normal to the select direction. In one example, the second region 216 can be substantially planar along the plane that is normal to the select direction.

The heat sink 210 can be configured to be secured relative to the substrate 14 such that the heat sink 210 is in thermal communication with the integrated circuit 206 in the manner described above. When the heat sink 210 is secured relative to the substrate 14, the heat sink 210 can be secured with respect to movement relative to the substrate 14. In one example, the electrical component 200 can include a bracket 218 that is configured to mechanically fasten to the heat sink 210 so as to secure the heat sink 210 to the substrate 14. The bracket 218 can be positioned such that the substrate 14 is disposed between the bracket 218 and the heat sink 210 in the select direction. Thus, the substrate 14 can be captured between the heat sink 210 and the bracket 218. The electrical component 200 can further include a plurality of mechanical fasteners 222 that extend from the heat sink 210 to the bracket 218 so as to mechanically secure the heat sink 210 relative to the substrate 14 such that the first region 214 is in thermal communication with the integrated circuit 206. For instance, the mechanical fasteners 222 can be configured as screws that extend from the heat sink 210 through the substrate 14 and threadedly mate with the bracket 218. In one example, the mechanical fasteners 222 can extend through the substrate 14 at the intersections 221. Thus, the substrate 14 can define through holes at the intersections 221, the through holes sized to receive respective ones of the fasteners 222.

It should be appreciated that the present disclosure includes methods for constructing the electrical component 200, including the step of securing the heat sink 210 relative to the substrate 14, such that the first region 214 is in thermal communication with the integrated circuit 206, and the second region 216 is spaced from the substrate 14 in the select direction. The present disclosure further includes methods for dissipating heat from the integrated circuit 206 through the heat sink 210.

Figure 28:
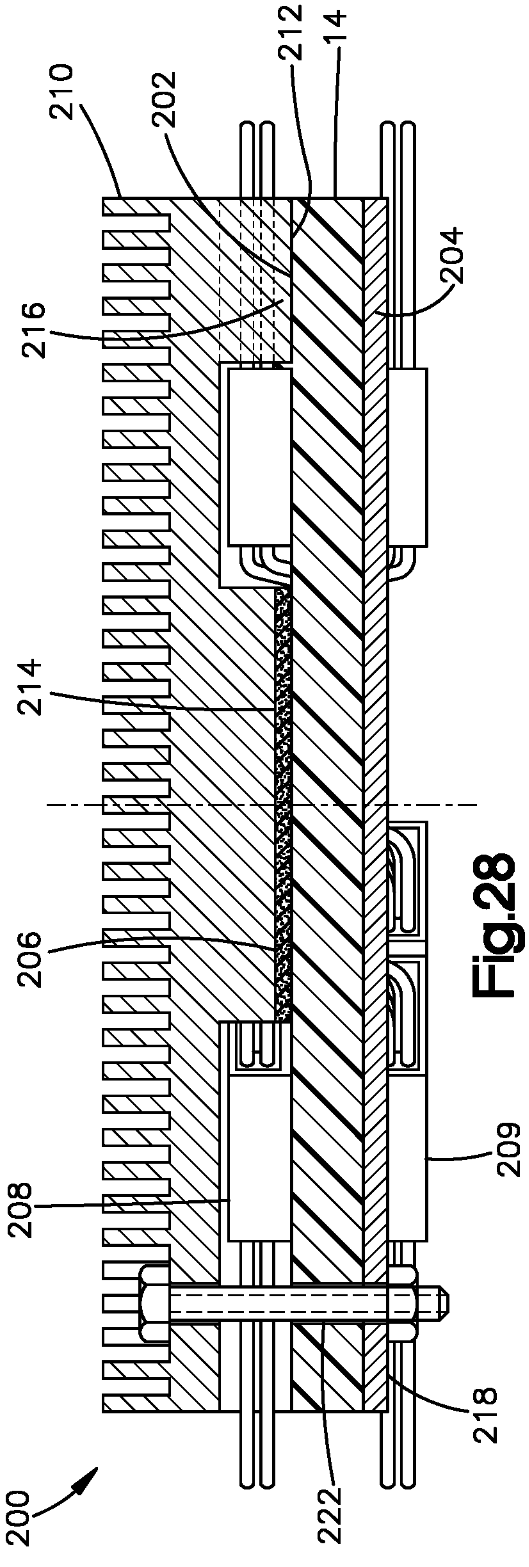
FIG. 28 is a sectional side elevation view of the electrical component illustrated in FIG. 24, but including the heat sink of FIG. 27.
Figure 27:
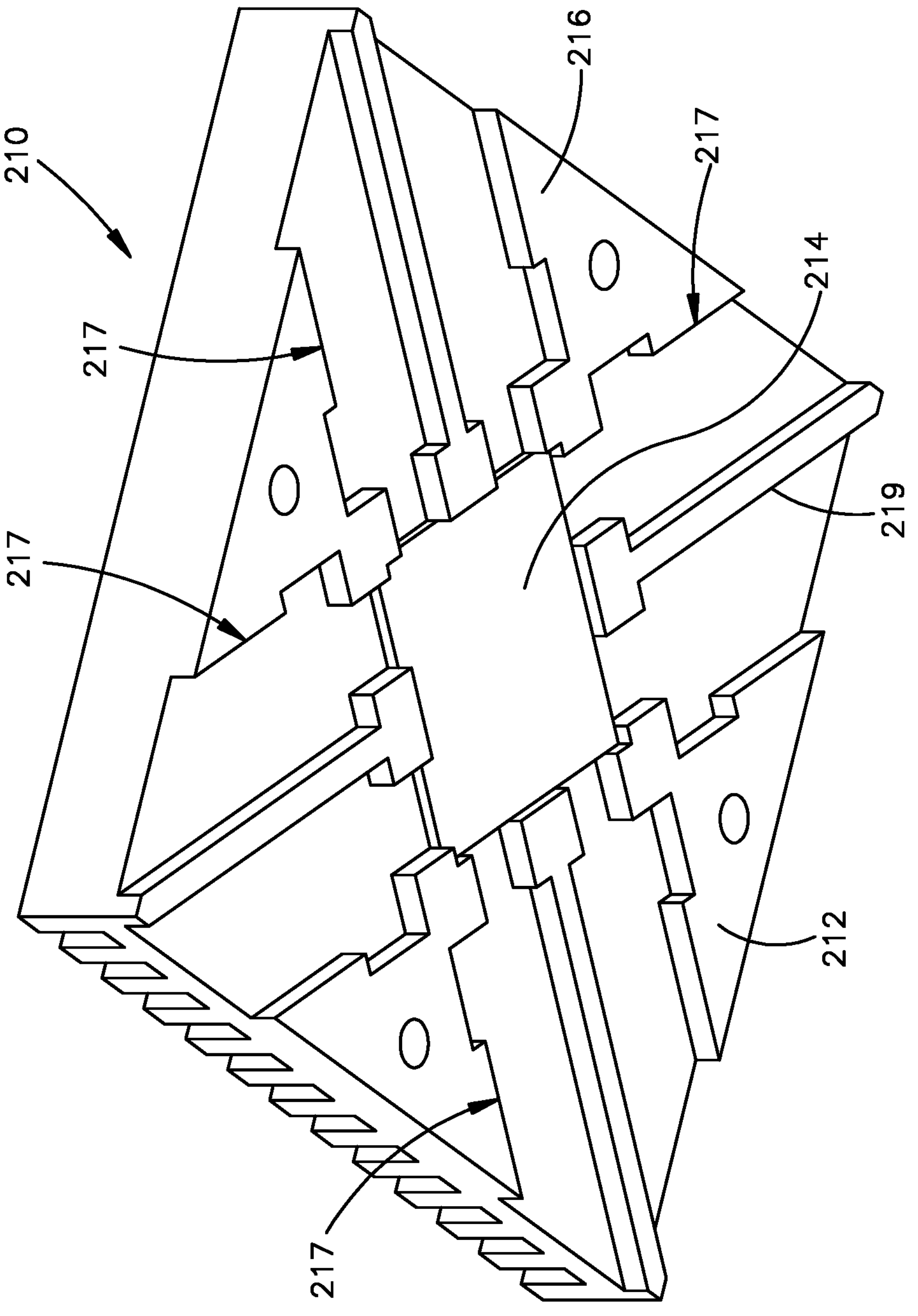
FIG. 27 is a perspective view of the heat sink of the electrical component illustrated in FIG. 24 constructed in accordance with an alternative embodiment.

Referring now to FIGS. 27-28, the heat sink 210 of the electrical component 200 can be constructed with any suitable alternative embodiment. For instance, the first region 214 can be configured to be placed in thermal communication with the integrated circuit 206 in the manner described above. The second region 216 can be both offset from the first region 214 along a direction perpendicular to the select direction, and can be configured to abut the first surface 202 of the substrate 14 when the first region 214 is in thermal communication with the integrated circuit 206. In particular, the surface 212 at the second region 216 can be configured to abut the first surface 202. In one example, the surface 212 at the second region 216 can abut the first surface 202 directly. Thus, the first region 214 can be offset with respect to the second region 216 in the select direction. Thus, the plane defined by the surface 212 at the first region 214 can be offset with respect to the plane defined by the surface 212 at the second region 216 in the select direction. Alternatively, the surface 212 at the second region 216 can abut an intermediate structure that, in turn, abuts the first surface 202.

The second region 216 can define a plurality of channels 217 that are configured to receive respective ones of the electrical connectors when the first region 214 is in thermal communication with the integrated circuit 206, and the second region 216 abuts the first surface 202 of the substrate 14. Further, the channels 217 can receive at least a portion of a length of cables that extend out from the respective electrical connectors 208 that are received by respective ones of the channels 217. The channels 217 can extend into the surface 212 at the second region 216 in the select direction. In one example, the channels 217 terminate in the heat sink 210 without extending through the heat sink 210 in the select direction. In one example, the heat sink 210 can include a number of channels that is equal to the number of rows defined by the electrical connectors 208. The heat sink 210 can further include at least one divider wall 219 disposed in the channels 217 that separate respective adjacent ones of the electrical connectors 208 along the respective row. During operation, when the fasteners are attached to the bracket 218, the surface 212 of the heat sink 210 at the second region 216 can bear against the first surface 202 of the substrate 14 while the bracket 218 bears against the second surface 204 of the substrate 14, thereby reducing or minimizing warping of the substrate 14 under forces provided by the fasteners. Further, in one example, the divider walls 219 can bear against the first surface 202 of the substrate 14 when the heat sink 210 is secured relative to the substrate 14.

It will thus be appreciated that the method of constructing the electrical component 200 can include the step of securing the heat sink 210 relative to the substrate 14, such that the first region 214 is in thermal communication with the integrated circuit 206, and the second region 216 abuts the substrate 14.

Although there has been shown and described the preferred embodiment of the present disclosure, it will be readily apparent to those skilled in the art that modifications may be made thereto which do not exceed the scope of the appended claims. The embodiments described in connection with the illustrated embodiments have been presented by way of illustration, and the present invention is therefore not intended to be limited to the disclosed embodiments. Furthermore, the structure and features of each the embodiments described above can be applied to the other embodiments described herein. Accordingly, those skilled in the art will realize that the invention is intended to encompass all modifications and alternative arrangements included within the spirit and scope of the invention, as set forth by the appended claims.

We claim:

1. An electrical connector comprising:

an electrically insulative connector housing;

at least one electrical signal contact supported by the connector housing, wherein the electrical signal contact defines a mating end, and a mounting end configured to be compressed against an electrical contact member of a printed circuit board so as to mount the electrical connector to the printed circuit board; and an electrical cable that extends into the connector housing and is mating to the mating end of the electrical signal contact, such that the electrical cable extends away from the printed circuit board, wherein at least a portion of the electrical connector is configured to fit in a gap that is up to substantially 5 mm as defined along a select direction from the printed circuit board to an overhang of a heat sink that is disposed on an integrated circuit, such that the electrical connector is spaced from the heat sink along the select direction when the electrical connector is mounted to the printed circuit board and the heat sink is disposed on the integrated circuit.

2. The electrical connector as recited in claim 1, further comprising a shroud that extends over the connector housing, and the height of the electrical connector is measured from a lower most surface of the mounting end to an uppermost surface of the shroud.

3. The electrical connector as recited in claim 1, further comprising a shroud, wherein the height of the electrical connector is measured from the printed circuit board to an uppermost surface of the shroud when the electrical connector is mounted to the printed circuit board.

4. The electrical connector as recited in claim 1, wherein the height of the electrical connector is substantially 1 mm.

5. The electrical connector as recited in claim 1, wherein an entirety of the electrical connector is sized to fit in the gap.

6. The electrical connector as recited in claim 1, wherein the at least one signal contact comprises first and second signal contacts that define a differential signal pair.

7. The electrical connector as recited in claim 6, wherein the first and second signal contacts are arranged in a single row, and the electrical connector includes no other rows of electrical contacts.

8. The electrical connector as recited in claim 1, wherein the height of the electrical connector is more than substantially 3 mm.

9. The electrical connector of claim 1, wherein the electrical connector defines a height of no more than substantially 3.5 mm.

10. A data communication system comprising:

a printed circuit board;

an integrated circuited mounted to the printed circuit board;

the electrical connector of claim 1, mounted to the first surface of the printed circuit board such that the mounting end of the at least one electrical signal contact is compressed against an electrical contact member at a surface printed circuit board; and a heat sink in thermal communication with the integrated circuit to dissipate heat from the integrated circuit, wherein the electrical connector fits in the gap.

11. The electrical connector of claim 1, further comprising an electrical cable with a signal conductor electrically connected to the mating end of the electrical signal contact.

12. The electrical connector of claim 1, further comprising a spring finger that biases the electrical signal contact toward the printed circuit board.

13. The electrical connector of claim 1, wherein the at least one electrical signal contact includes a first electrical signal contact and a second electrical signal contact, each of the first and second electrical signal contacts having a broadside configured to be compressed against the electrical contact member of the printed circuit board and an edge transverse to the broadside.

14. The electrical connector of claim 13, wherein the first and second electrical signal contacts positioned such that the edge of the first electrical signal contact faces the edge of the second electrical signal contact.

15. A data communication system comprising:

a printed circuit board having a first surface and a second surface opposite the first surface;

an application specific integrated circuit (ASIC) mounted directly to the first surface of the printed circuit board;

a first electrical cable connector assembly including an electrical connector directly mounted to the first surface of the printed circuit board, and an electrical cable in electrical communication with the electrical connector, the electrical connector including:

an electrically insulative connector housing;

at least one electrical signal contact supported by the connector housing, wherein the electrical signal contact defines a mating end in electrical communication with a respective signal conductor of the electrical cable, and a mounting end configured to be compressed against an electrical contact member at the first surface of the printed circuit board so as to directly mount the electrical connector to the printed circuit board; and a second electrical cable connector assembly mounted to the second surface of the printed circuit board.

16. The data communication system as recited in claim 15, further comprising a heat sink that is in thermal communication with the ASIC.

17. The data communication system as recited in claim 16, wherein the heat sink defines an overhang that projects out from the ASIC so as to define a gap that extends from the overhang to the substrate, and at least a portion of the electrical connector is disposed in the gap.

18. The data communication system as recited in claim 17, wherein the gap is between substantially 1 mm and substantially 5 mm.

19. The data communication system as recited in claim 15, wherein the first and second electrical cable connector assemblies are in electrical communication with the ASIC.

20. The data communication system as recited in claim 19, wherein the first electrical cable connector assembly comprises a first plurality of electrical connector assemblies arranged about the ASIC.

21. The data communication system as recited in claim 20, wherein the second electrical cable connector assembly comprises a second plurality of electrical cable connector assemblies arranged about the ASIC.

22. A data communication system comprising:

a printed circuit board having a first surface and a second surface opposite the first surface;

an application specific integrated circuit (ASIC) mounted directly to the first surface of the printed circuit board;

a first electrical cable connector assembly including an electrical connector directly mounted to the first surface of the printed circuit board and in electrical communication with the ASIC, and an electrical cable in electrical communication with the electrical connector, the electrical connector including:

an electrically insulative connector housing; and at least one electrical signal contact supported by the connector housing, wherein the electrical signal contact defines a mating end configured to contact a respective signal conductor of the electrical cable, and a mounting end configured to be compressed against an electrical contact member at the first surface of the printed circuit board so as to directly mount the electrical connector to the printed circuit board;

a heat sink in thermal communication with the ASIC to dissipate heat from the ASIC, wherein the heat sink defines a gap with respect to the first surface of the printed circuit board along a select direction, and at least a portion of the first electrical cable connector assembly is disposed in the gap under the heat sink, such that electrical connector is spaced from the heat sink along the select direction.

23. The data communication system of claim 22, wherein an entirety of the electrical connector is disposed in the gap.

24. The data communication system as recited in claim 22, wherein the first electrical cable connector assembly comprises a first plurality of electrical cable connector assemblies.

25. The data communication system as recited in claim 24, wherein the first plurality of electrical cable connector assemblies are arranged about the ASIC.

26. The data communication system as recited in claim 25, wherein the second surface of the printed circuit board is opposite the first surface of the printed circuit board along a select direction, and the first plurality of electrical cable connector assemblies are arranged in a first row, a second row opposite the first row in a first direction perpendicular to the select direction, a third row, and a fourth row opposite the third row in a second direction perpendicular to the select direction and the first direction.

27. The data communication system as recited in claim 26, wherein the first row is arranged along a first straight line, the second row is arranged along a second straight line, the third row is arranged along a third straight line, the fourth row is arranged along a fourth straight line, and the first and second straight lines intersect the third and fourth straight lines.

28. The data communication system as recited in claim 27, wherein the ASIC is centrally disposed with respect to the first, second, third, and fourth rows.

29. The data communication system as recited in claim 28, wherein the rows define a square.

30. The data communication system as recited in claim 25, wherein the first plurality of electrical cable connector assemblies surround the ASIC.

31. The data communication system as recited in claim 30, wherein the ASIC defines four sides, and the data communication system comprises two of the plurality of first electrical cable connector assemblies arranged along each of the four sides.

32. The data communication system of claim 22, wherein the electrical connector includes a spring finger that biases the electrical signal contact toward the printed circuit board.

33. The data communication system of claim 22, wherein the at least one electrical signal contact includes a first electrical signal contact and a second electrical signal contact, each of the first and second electrical signal contacts having a broadside configured to be compressed against the electrical contact member of the printed circuit board and an edge transverse to the broadside.

34. The electrical connector of claim 33, wherein the first and second electrical signal contacts positioned such that the edge of the first electrical signal contact faces the edge of the second electrical signal contact.

35. A data communication system comprising:

a printed circuit board having a first surface and a second surface opposite the first surface along a select direction;

an application specific integrated circuit (ASIC) mounted to the first surface of the printed circuit board;

a first electrical cable connector assembly directly mounted to the first surface of the printed circuit board and in electrical communication with the ASIC, wherein the first electrical cable connector assembly comprises a first plurality of electrical cable connector assemblies arranged about the ASIC in a first row, a second row opposite the first row in a first direction perpendicular to the select direction, a third row, and a fourth row opposite the third row in a second direction perpendicular to the select direction and the first direction; and a heat sink in thermal communication with the ASIC to dissipate heat from the ASIC, wherein the heat sink defines a gap of no more than 3.5 mm with respect to the first surface of the printed circuit board, and at least a portion of the first electrical cable connector assembly is disposed in the gap under the heat sink.

36. The data communication system as recited in claim 35, wherein the first row is arranged along a first straight line, the second row is arranged along a second straight line, the third row is arranged along a third straight line, the fourth row is arranged along a fourth straight line, and the first and second straight lines intersect the third and fourth straight lines.

37. The data communication system as recited in claim 36, wherein the ASIC is centrally disposed with respect to the first, second, third, and fourth rows.

38. The data communication system as recited in claim 37, wherein the rows define a square.

39. A data communication system comprising:

a printed circuit board having a first surface and a second surface opposite the first surface;

an application specific integrated circuit (ASIC) mounted directly to the first surface of the printed circuit board;

a first plurality of electrical cable connector assemblies directly mounted to the first surface of the printed circuit board and in electrical communication with the ASIC, wherein the first plurality of electrical cable connector assemblies comprises a first plurality of electrical cable assemblies arranged about the ASIC such that the first plurality of electrical cable connector assemblies surround the ASIC; and a heat sink in thermal communication with the ASIC to dissipate heat from the ASIC, wherein the heat sink defines a gap of no more than 3.5 mm with respect to the first surface of the printed circuit board, and at least a portion of the first plurality of electrical cable connector assemblies is disposed in the gap under the heat sink.

40. The data communication system as recited in claim 39, wherein the ASIC defines four sides, and the data communication system comprises two of the plurality of first electrical cable connector assemblies arranged along each of the four sides.

* * * * *